United States Patent
Mori et al.

(10) Patent No.: US 10,685,614 B2
(45) Date of Patent: Jun. 16, 2020

(54) DISPLAY DEVICE, DISPLAY MODULE, AND ELECTRONIC DEVICE

(71) Applicant: Semiconductor Energy Laboratory Co., Ltd., Atsugi-shi, Kanagawa-ken (JP)

(72) Inventors: Hidenori Mori, Tochigi (JP); Hironori Matsumoto, Tochigi (JP); Takahiro Fukutome, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 465 days.

(21) Appl. No.: 15/450,292

(22) Filed: Mar. 6, 2017

(65) Prior Publication Data

US 2017/0270882 A1 Sep. 21, 2017

(30) Foreign Application Priority Data

Mar. 17, 2016 (JP) ................................. 2016-053724

(51) Int. Cl.
*G06F 3/041* (2006.01)
*G09G 3/36* (2006.01)
*G09G 3/3233* (2016.01)

(52) U.S. Cl.
CPC ......... *G09G 3/3677* (2013.01); *G06F 3/0412* (2013.01); *G09G 3/3648* (2013.01);
(Continued)

(58) Field of Classification Search
CPC .......... G06F 3/0412; G09G 2300/0426; G09G 2300/0809; G09G 2300/0842;
(Continued)

(56) References Cited

U.S. PATENT DOCUMENTS 6,380,919 B1 4/2002 Koyama et al.
8,531,618 B2 9/2013 Koyama et al.
(Continued)

FOREIGN PATENT DOCUMENTS

JP 2008-310266 A 12/2008
JP 2009-103914 A 5/2009
(Continued)

OTHER PUBLICATIONS

Tsuda.K et al., "Ultra Low Power Consumption Technologies for Mobile TFT-LCDs", IDW '02 : Proceedings of the 9th International Display Workshops, Dec. 4, 2002, pp. 295-298.

*Primary Examiner* — Insa Sadio
(74) *Attorney, Agent, or Firm* — Fish & Richardson P.C.

(57) ABSTRACT

A display device or the like with a novel structure which can ensure a sufficiently long period for writing data signals in pixels is provided. A display device or the like with a novel structure which can display an image of one frame without greatly degrading display quality is provided. The display device includes a gate driver and a pixel portion. The pixel portion includes a plurality of pixels. The gate driver is configured to output a first scan signal to a first gate line in a first frame period. The gate driver is configured to output a second scan signal to a second gate line in a second frame period. The second gate line is a gate line next to the first gate line. The pixels are configured to hold data signals, which are written in the pixels in the first frame period, in the first frame period and the second frame period.

18 Claims, 44 Drawing Sheets

(52) U.S. Cl.
CPC ... *G09G 3/3233* (2013.01); *G09G 2300/0426* (2013.01); *G09G 2300/0809* (2013.01); *G09G 2300/0842* (2013.01); *G09G 2310/0213* (2013.01); *G09G 2320/103* (2013.01); *G09G 2340/0435* (2013.01)

(58) Field of Classification Search
CPC ..... G09G 2310/0213; G09G 2320/103; G09G 2340/0435; G09G 3/3233; G09G 3/3648; G09G 3/3677
See application file for complete search history.

(56) References Cited

U.S. PATENT DOCUMENTS

| | | | |
|---|---|---|---|
| 9,275,587 | B2 | 3/2016 | Sakai |
| 2006/0066555 | A1 | 3/2006 | Miyagawa |
| 2011/0216043 | A1* | 9/2011 | Tamura ................ G06F 1/3203 345/175 |
| 2012/0327065 | A1* | 12/2012 | Nam .................... G09G 3/3233 345/212 |
| 2013/0127694 | A1* | 5/2013 | Kim .................. H01L 29/78618 345/82 |
| 2014/0002516 | A1 | 1/2014 | Koyama et al. |
| 2014/0184484 | A1 | 7/2014 | Miyake et al. |
| 2014/0192037 | A1* | 7/2014 | Chung ................ G09G 3/2022 345/212 |
| 2015/0302814 | A1 | 10/2015 | Shiomi |
| 2015/0380472 | A1* | 12/2015 | Yamazaki ......... H01L 27/14623 257/40 |
| 2016/0260396 | A1 | 9/2016 | Miyake et al. |
| 2017/0186365 | A1 | 6/2017 | Yoneda |

FOREIGN PATENT DOCUMENTS

| | | |
|---|---|---|
| WO | WO-2012/157724 | 11/2012 |
| WO | WO-2014/104193 | 7/2014 |

\* cited by examiner

FIG. 36A
FIG. 36B
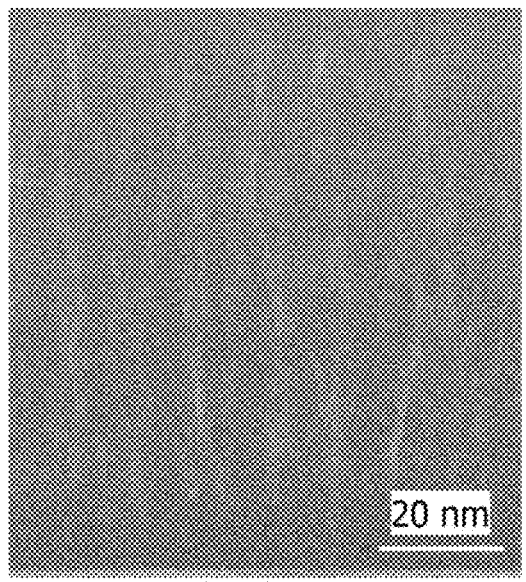
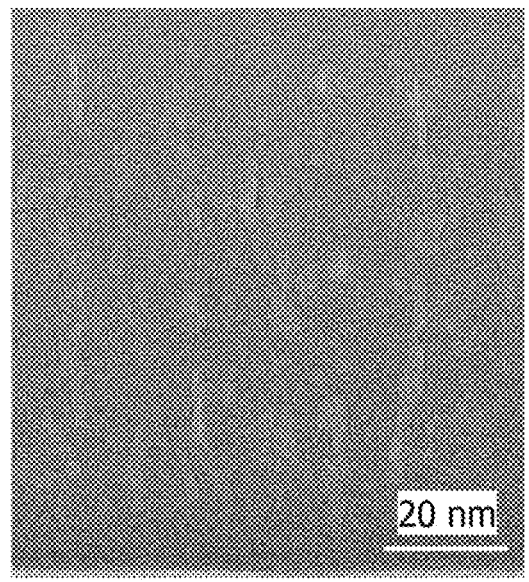

9100

9200

9101

9201

9102

9201

9201

DISPLAY DEVICE, DISPLAY MODULE, AND ELECTRONIC DEVICE

BACKGROUND OF THE INVENTION

1. Field of the Invention

One embodiment of the present invention relates to a display device, a display module, and an electronic device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. In particular, one embodiment of the present invention relates to a semiconductor device, a display device, a light-emitting device, a power storage device, a storage device, a driving method thereof, and a manufacturing method thereof.

2. Description of the Related Art

Display devices displaying ultra-high-definition images with a digital video format of 4K or 8K as one of the means for increasing an added value of the display device have been actively developed (e.g., see Patent Documents 1 and 2).

A technique for reducing power consumption of a display device by switching a frame rate between a period for displaying a moving image and a period for displaying a still image is proposed (e.g., see Non-Patent Document 1).

REFERENCE

Patent Document

[Patent Document 1] PCT International Publication No. 2012/157724
[Patent Document 2] PCT International Publication No. 2014/104193

Non-Patent Document

[Non-Patent Document 1] Kazuhiko Tsuda et al., IDW'02, pp. 295-298

SUMMARY OF THE INVENTION

In a display device, the numbers of gate lines and signal lines are increased in accordance with an increase in the number of pixels. The number of gate lines selected in one frame period is increased; therefore, a period for selecting a gate line in one row becomes shorter. When the period for selecting a gate line in one row is short, a period for writing data signals in pixels cannot be ensured; thus, display quality is largely degraded.

In the case where a frame rate is reduced, the period for selecting a gate line in one row can be lengthened. Therefore, the period for writing data signals in pixels can be ensured. However, a period for displaying an image of one frame becomes longer, and display quality is largely degraded particularly in a period for displaying a moving image.

In view of the above problem, an object of one embodiment of the present invention is to provide a display device or the like with a novel structure which can suppress degradation of display quality.

Another object of one embodiment of the present invention is to provide a display device or the like with a novel structure which can ensure a sufficiently long period for writing data signals in pixels. Another object of one embodiment of the present invention is to provide a display device or the like with a novel structure which can display an image of one frame without greatly degrading display quality.

Note that the objects of one embodiment of the present invention are not limited to the above objects. The objects described above do not disturb the existence of other objects. The other objects are the ones that are not described above and will be described below. The other objects will be apparent from and can be derived from the description of the specification, the drawings, and the like by those skilled in the art. One embodiment of the present invention is to solve at least one of the aforementioned objects and the other objects.

One embodiment of the present invention is a display device including a gate driver and a pixel portion. The pixel portion includes a plurality of pixels. The gate driver is configured to output a first scan signal to a first gate line in a first frame period. The gate driver is configured to output a second scan signal to a second gate line in a second frame period. The second gate line is a gate line next to the first gate line. The pixels are configured to hold data signals, which are written in the pixels in the first frame period, in the first frame period and the second frame period.

Another embodiment of the present invention is a display device including a gate driver and a pixel portion. The pixel portion includes a plurality of pixels, a first display region, and a second display region. The first display region is a region where a first scan signal is output to a first gate line and a second scan signal is output to a second gate line. The second display region is a region where a third scan signal is output to a third gate line and a fourth scan signal is output to a fourth gate line. The gate driver is configured to output the first scan signal, the third scan signal, and the fourth scan signal in a first frame period. The gate driver is configured to output the second scan signal, the third scan signal, and the fourth scan signal in a second frame period. The second gate line is a gate line next to the first gate line. The third gate line is a gate line next to the second gate line. The fourth gate line is a gate line next to the third gate line. The pixels included in the first display region are configured to hold data signals, which are written in the pixels in the first frame period, in the first frame period and the second frame period.

In one embodiment of the present invention, the display device in which the pixels each include a transistor and the transistor includes an oxide semiconductor in a channel formation region is preferable.

Note that other embodiments of the present invention will be described in the following embodiments with reference to the drawings.

One embodiment of the present invention can provide a display device or the like with a novel structure which can suppress degradation of display quality. Alternatively, one embodiment of the present invention can provide a display device or the like with a novel structure which can ensure a sufficiently long period for writing data signals in pixels. Alternatively, one embodiment of the present invention can provide a display device or the like with a novel structure which can display an image of one frame without greatly degrading display quality.

Note that the effects of one embodiment of the present invention are not limited to the above effects. The effects described above do not disturb the existence of other effects. The other effects are the ones that are not described above and will be described below. The other effects will be apparent from and can be derived from the description of the specification, the drawings, and the like by those skilled in the art. One embodiment of the present invention is to have at least one of the aforementioned effects and the other effects. Accordingly, one embodiment of the present invention does not have the aforementioned effects in some cases.

BRIEF DESCRIPTION OF THE DRAWINGS

FIGS. 36A and 36B show cross-sectional TEM images of an a-like OS.

DETAILED DESCRIPTION OF THE INVENTION

Figure 1A:
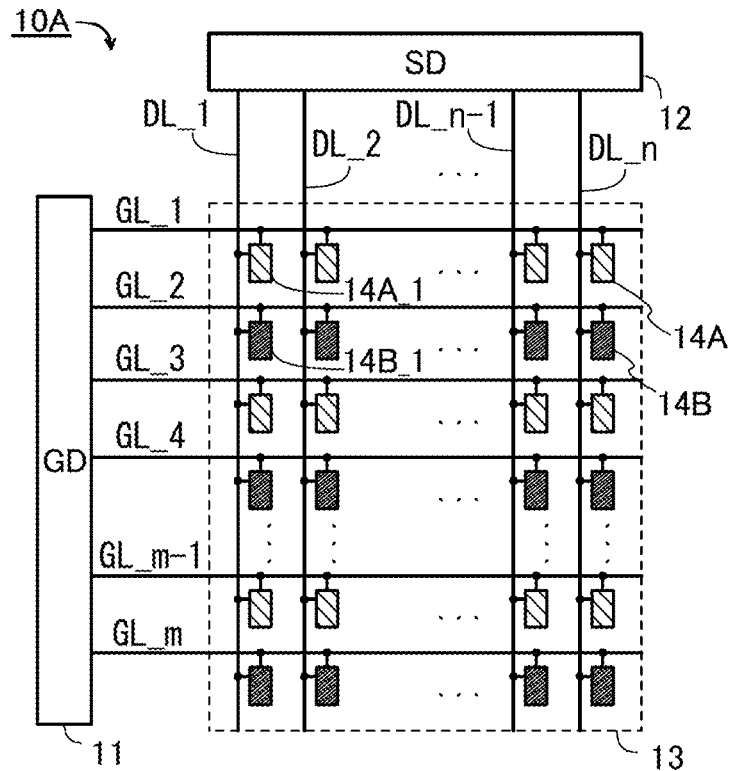
FIGS. 1A and 1B illustrate the structure and the operation of a display device.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments.

In the drawings, the size, the layer thickness, or the region is exaggerated for clarity in some cases. Therefore, embodiments of the present invention are not limited to such a scale. Note that the drawings are schematic views showing ideal examples, and embodiments of the present invention are not limited to shapes or values shown in the drawings.

Note that in this specification, ordinal numbers such as "first", "second", and "third" are used in order to avoid confusion among components, and the terms do not limit the components numerically.

Note that in this specification and the like, terms for describing arrangement, such as "over", "above", "under", and "below", are used for convenience in describing a positional relation between components with reference to drawings. Furthermore, the positional relation between components is changed as appropriate in accordance with a direction in which each component is described. Thus, there is no limitation on terms used in this specification, and description can be made appropriately depending on the situation.

In this specification and the like, a transistor is an element having at least three terminals of a gate, a drain, and a source. In addition, the transistor has a channel region between a drain (a drain terminal, a drain region, or a drain electrode) and a source (a source terminal, a source region, or a source electrode), and current can flow between the source and the drain through the channel region. Note that in this specification and the like, a channel region refers to a region through which current mainly flows.

Furthermore, functions of a source and a drain might be switched when transistors having different polarities are employed or a direction of current flow is changed in circuit operation, for example. Therefore, the terms "source" and "drain" can be switched in this specification and the like.

Note that in this specification and the like, the expression "electrically connected" includes the case where components are connected through an "object having any electric function". There is no particular limitation on an "object having any electric function" as long as electric signals can be transmitted and received between components that are connected through the object. Examples of an "object having any electric function" are a switching element such as a transistor, a resistor, an inductor, a capacitor, and elements with a variety of functions as well as an electrode and a wiring.

In this specification and the like, the term "parallel" indicates that the angle formed between two straight lines is greater than or equal to −10° and less than or equal to 10°, and accordingly also includes the case where the angle is greater than or equal to −5° and less than or equal to 5°. In addition, the term "perpendicular" indicates that the angle formed between two straight lines is greater than or equal to 80° and less than or equal to 100° and accordingly also includes the case where the angle is greater than or equal to 85° and less than or equal to 95°.

In this specification and the like, the terms "film" and "layer" can be interchanged with each other. For example, the term "conductive layer" can be changed into the term "conductive film" in some cases. Furthermore, the term "insulating film" can be changed into the term "insulating layer" in some cases.

Unless otherwise specified, the off-state current in this specification and the like refers to a drain current of a transistor in the off state (also referred to as non-conduction state and cutoff state). Unless otherwise specified, the off state of an n-channel transistor means that the voltage between its gate and source (Vgs: gate-source voltage) is lower than the threshold voltage Vth, and the off state of a p-channel transistor means that the gate-source voltage Vgs is higher than the threshold voltage Vth. For example, the off-state current of an n-channel transistor sometimes refers to a drain current that flows when the gate-source voltage Vgs is lower than the threshold voltage Vth.

The off-state current of a transistor depends on Vgs in some cases. For this reason, when there is Vgs at which the off-state current of a transistor is lower than or equal to I, it may be said that the off-state current of the transistor is lower than or equal to I. The off-state current of a transistor may refer to an off-state current at given Vgs, an off-state current at Vgs in a given range, or an off-state current at Vgs at which a sufficiently low off-state current is obtained.

As an example, the assumption is made of an n-channel transistor where the threshold voltage Vth is 0.5 V and the drain current is $1\times10^{-9}$ A at Vgs of 0.5 V, $1\times10^{-13}$ A at Vgs of 0.1 V, $1\times10^{-19}$ A at Vgs of −0.5 V, and $1\times10^{-22}$ A at Vgs of −0.8 V. The drain current of the transistor is $1\times10^{-19}$ A or lower at Vgs of −0.5 V or at Vgs in the range of −0.8 V to −0.5 V; therefore, it can be said that the off-state current of the transistor is $1\times10^{-19}$ A or lower. Since there is Vgs at which the drain current of the transistor is $1\times10^{-22}$ A or lower, it may be said that the off-state current of the transistor is $1\times10^{-22}$ A or lower.

In this specification and the like, the off-state current of a transistor with a channel width W is sometimes represented by a current value in relation to the channel width W or by a current value per given channel width (e.g., 1 µm). In the latter case, the unit of an off-state current may be represented by current per length (e.g., A/µm).

The off-state current of a transistor depends on temperature in some cases. Unless otherwise specified, the off-state current in this specification may be an off-state current at room temperature, 60° C., 85° C., 95° C., or 125° C. Alternatively, the off-state current may be an off-state current at a temperature at which the reliability required for the transistor is ensured or a temperature at which the transistor or the like is used (e.g., temperature in the range of 5° C. to 35° C.). When there is Vgs at which the off-state current of a transistor at room temperature, 60° C., 85° C., 95° C., 125° C., a temperature at which the reliability required for the transistor is ensured, or a temperature at which the transistor is used (e.g., temperature in the range of 5° C. to 35° C.) is lower than or equal to I, it may be said that the off-state current of the transistor is lower than or equal to I.

The off-state current of a transistor depends on voltage Vds between its drain and source in some cases. Unless otherwise specified, the off-state current in this specification and the like may be an off-state current at Vds of 0.1 V, 0.8 V, 1 V, 1.2 V, 1.8 V, 2.5 V, 3 V, 3.3 V, 10 V, 12 V, 16 V, or 20 V. Alternatively, the off-state current may be an off-state current at Vds at which the reliability required for the transistor is ensured or Vds used in the transistor. When there is Vgs at which the off-state current of a transistor at Vds of 0.1 V, 0.8 V, 1 V, 1.2 V, 1.8 V, 2.5 V, 3 V, 3.3 V, 10 V, 12 V, 16 V, or 20 V, at Vds at which the reliability required for the transistor is ensured, or at Vds at which the transistor is used is lower than or equal to I, it may be said that the off-state current of the transistor is lower than or equal to I.

In the above description of an off-state current, a drain may be replaced with a source. That is, the off-state current sometimes refers to current that flows through a source of a transistor in the off state.

In this specification and the like, the term "leakage current" sometimes expresses the same meaning as an off-state current. In this specification and the like, the off-state current sometimes refers to current that flows between a source and a drain when a transistor is off, for example.

Embodiment 1

In this embodiment, structure examples of a display device which can ensure a sufficiently long period for writing data signals in pixels and displaying an image of one frame without greatly degrading display quality and structure examples of a transistor included in a pixel will be described with reference to FIGS. 1A and 1B, FIGS. 2A and 2B, FIGS. 3A to 3C, FIG. 4, FIGS. 5A to 5D, FIGS. 6A and 6B, FIG. 7, FIG. 8, FIGS. 9A to 9D, FIGS. 10A and 10B, FIGS. 11A and 11B, FIGS. 12A and 12B, FIGS. 13A and 13B, FIG. 14, FIG. 15, FIG. 16, FIG. 17, FIGS. 18A and 18B, FIGS. 19A and 19B, FIGS. 20A to 20C, FIG. 21, FIGS. 22A to 22C, FIGS. 23A to 23C, FIGS. 24A to 24C, FIGS. 25A and 25B, FIGS. 26A and 26B, FIGS. 27A and 27B, FIGS. 28A and 28B, FIGS. 29A and 29D, FIGS. 30A to 30D, FIGS. 31A to 31D, and FIGS. 32A and 32B.

1-1. Structure Example 1 of Display Device

A structure example of a display device will be described with reference to FIGS. 1A and 1B, FIGS. 2A and 2B, FIGS. 3A to 3C, FIG. 4, FIGS. 5A to 5D, FIGS. 6A and 6B, FIG. 7, FIG. 8, FIGS. 9A to 9D, FIGS. 10A and 10B, FIGS. 11A and 11B, and FIGS. 12A and 12B.

FIG. 1A is a block diagram of a display device 10A. The display device 10A includes a gate driver 11, a source driver 12, and a pixel portion 13. The pixel portion 13 includes a plurality of pixels.

FIG. 1A illustrates pixels arranged in m rows and n columns (m and n are each an integer of 2 or more). Each pixel is a smallest unit that can control the grayscale.

In FIG. 1A, the pixels in odd-numbered rows and the pixels in even-numbered rows are illustrated as pixels 14A and pixels 14B, respectively. In FIG. 1A, the pixel in the first row and the first column is illustrated as a pixel 14A_1, and the pixel in the second row and the first column is illustrated as a pixel 14B_1.

The pixels 14A and 14B each include a transistor. A gate of the transistor of each of the pixels 14A and 14B is connected to any one of gate lines GL_1 to GL_m. One of a source and a drain of the transistor of each of the pixels 14A and 14B is connected to any one of signal lines DL_1 to DL_n.

The transistor of each of the pixels 14A and 14B has an extremely low leakage current that flows in an off state (an off-state current). A transistor with an extremely low off-state current can be achieved with a transistor including an oxide semiconductor in a semiconductor layer. When the transistor having an extremely low off-state current in each of the pixels 14A and 14B is turned off, data signals written in the pixels can be held. The transistor including an oxide semiconductor will be described later in detail.

The following explanation is provided for the cases where the transistor of each of the pixels 14A and 14B is an n-channel transistor unless otherwise specified. The transistor of each of the pixels 14A and 14B is brought into an on state and an off state by applying an H-level voltage and an L-level voltage to the gate, respectively.

In the case of performing color display in the pixel portion 13, the pixels included in the pixel portion 13 correspond to sub-pixels for color display. In that case, a display unit obtained by combining a plurality of sub-pixels may be referred to as a picture element.

The gate driver 11 supplies scan signals to the gate lines GL_1 to GL_m. The scan signal is a signal for turning on the transistor connected to the signal line.

The source driver 12 supplies data signals to the signal lines DL_1 to DL_n. The data signal is a signal for making a display element included in a pixel perform display in accordance with a desired grayscale.

Figure 1B:
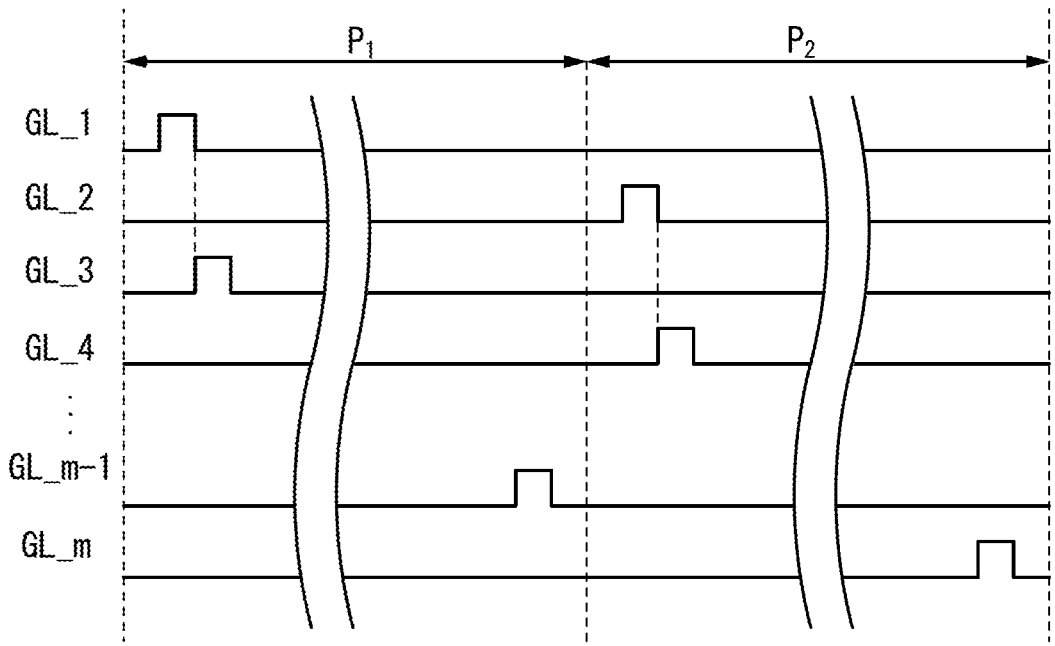

FIG. 1B is a timing chart for explaining the operation of the display device 10A.

In FIG. 1B, a first frame period $P_1$ and a second frame period $P_2$ are illustrated. As illustrated, the second frame period $P_2$ is a successive frame period after the first frame period $P_1$.

In the first frame period $P_1$, the gate driver 11 supplies scan signals to the pixels in odd-numbered rows. In the first frame period $P_1$, the gate driver 11 does not supply scan signals to the pixels in even-numbered rows.

In the second frame period $P_2$, the gate driver 11 supplies scan signals to the pixels in the even-numbered rows. In the second frame period $P_2$, the gate driver 11 does not supply scan signals to the pixels in the odd-numbered rows.

As described above, each pixel of the display device 10A can hold the written data signal by turning off the transistor. The data signal written in the pixel in the first frame period $P_1$ can be held not only in the first frame period $P_1$ but also in the second frame period $P_2$. The data signal written in the pixel in the second frame period $P_2$ can be held not only in the second frame period $P_2$ but also in the following first frame period $P_1$.

In the operation of the display device 10A in FIG. 1B, display is performed with a reduction in the number of gate lines selected in one frame period. Therefore, a period for selecting a gate line in one row per unit time can be sufficiently lengthened. Since the period for selecting a gate line in one row can be lengthened, a period for writing data signals in pixels can be ensured; thus, display quality can be greatly improved.

The operation of the display device 10A in FIG. 1B is effective particularly in a display device. In the display device, there are numbers of gate lines and signal lines in accordance with an increase in the number of pixels and thus the period for selecting a gate line in one row is shortened. With the operation of the display device 10A in FIG. 1B, the period for selecting a gate line in one row can be lengthened and data signals written in the previous frame period can be held, so that the pixels in which data signals are not written in the following frame period can have a state in which the data signals are held and thus display can be performed without causing degradation of display quality.

In the operation of the display device 10A in FIG. 1B, data signals are written in every other row, and the data signals are held in a frame period in which the data signals are written and the following frame period. Therefore, display can be achieved by an interlace method in which display quality does not degrade even when a frame rate of each pixel is reduced to half. Additionally, a period taken to display one image can be shortened as compared with the case where one image is displayed by writing data signals into pixels row-by-row. The structure is particularly effective in a period for displaying a still image in which data signals are less frequently rewritten.

Figure 2A:
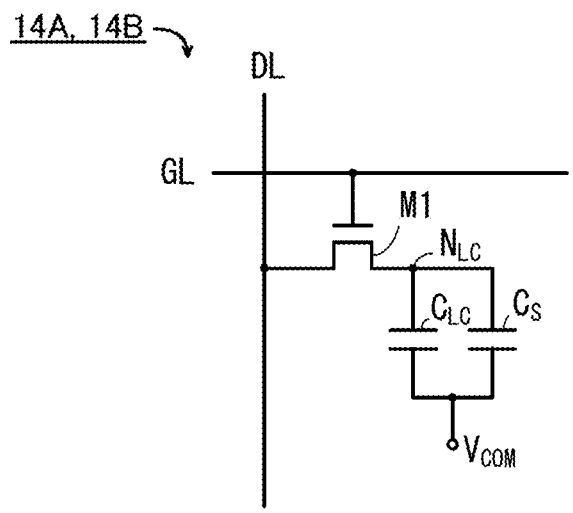
FIGS. 2A and 2B illustrate the structure and the operation of a display device.

FIG. 2A illustrates an example of a circuit diagram of the pixels 14A and 14B. The pixels 14A and 14B illustrated in FIG. 2A each include a liquid crystal element as a display element.

FIG. 2A illustrates a node $N_{LC}$ in which a data signal is held in addition to a transistor M1, a liquid crystal element $C_{LC}$, and a storage capacitor $C_S$. In addition, a terminal supplied with a common voltage $V_{COM}$, a signal line DL, and a gate line GL are illustrated in FIG. 2A.

Figure 2B:
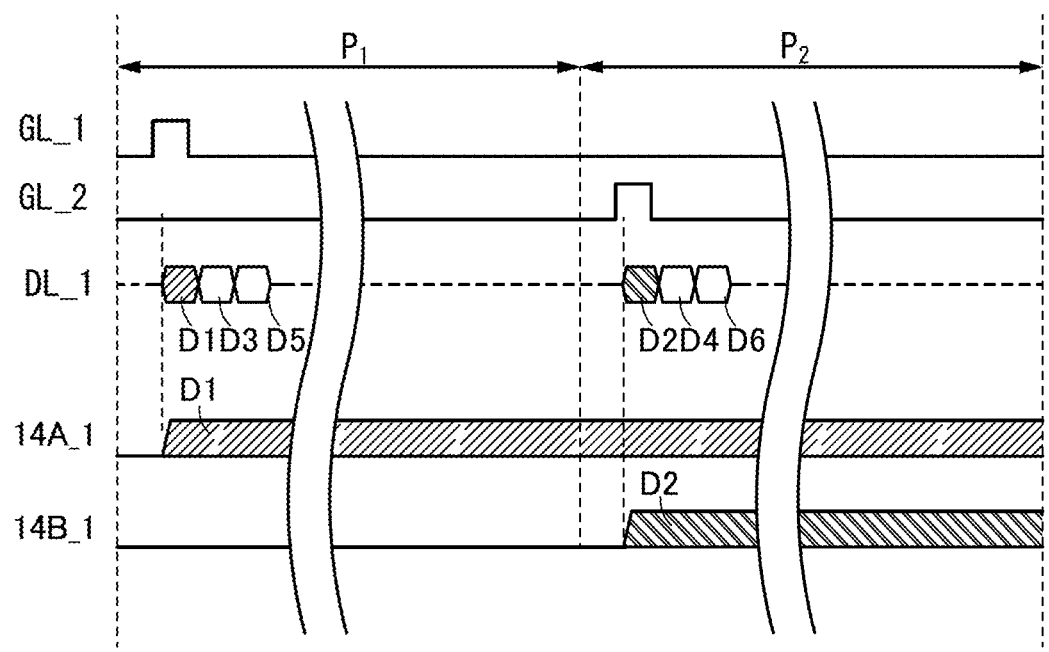

FIG. 2B is a timing chart illustrating an example of the operation for writing data signals in the case where the pixel 14A and the pixel 14B in FIG. 2A are the pixel 14A_1 in the first row and the first column and the pixel 14B_1 in the second row and the first column, respectively. FIG. 2B illustrates waveforms of the gate line GL_1 in the first row, the gate line GL_2 in the second row, and the signal line DL_1 in the first column in the first frame period $P_1$ and the second frame period $P_2$. In addition, in FIG. 2B, the data signals in the pixel 14A_1 in the first row and the first column and the pixel 14B_1 in the second row and the first column, which are held in the node $N_{LC}$, are illustrated. In FIG. 2B, as the data signals supplied to the signal line DL_1 in the first column, data signals D1 to D6 supplied to the pixels in the first to sixth rows are illustrated.

As illustrated in FIG. 2B, in the first frame period $P_1$, the gate line GL_1 in the first row is set at H level and the data signal D1 of the signal line DL_1 in the first column is written in the node $N_{LC}$ of the pixel 14A_1. Then, in the second frame period $P_2$, the gate line GL_2 in the second row is set at H level and the data signal D2 of the signal line DL_1 in the first column is written in the node $N_{LC}$ of the pixel 14B_1. In the second frame period $P_2$, the gate line GL_1 in the first row is set at L level to hold the data signal D1 written in the first frame period $P_1$.

As described above, the off-state current of the transistor of each of the pixels 14A_1 and 14B_1 is extremely small. Therefore, it is possible to employ a structure in which display is performed by what is called an interlace method, in which data signals are written in every other row, and the data signals are held in a frame period in which the data signals are written and the following frame period. Thus, a frame rate of each pixel can be reduced to half without causing degradation of display quality.

Note that one embodiment of the present invention is not limited to the circuit configuration of the pixels illustrated in FIG. 2A. Examples of a circuit configuration of the pixels which is different from the circuit configuration in FIG. 2A are illustrated in FIGS. 3A to 3C.

Figure 3A:
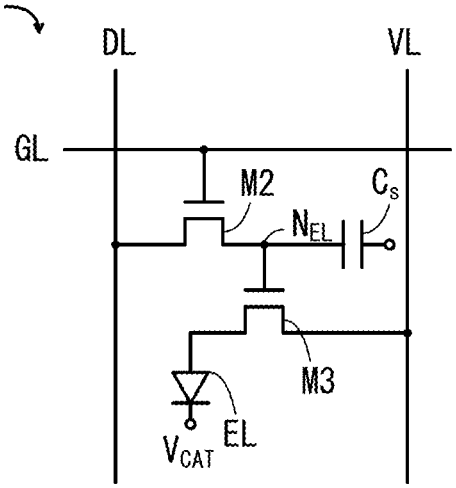
FIGS. 3A to 3C each illustrate the structure of a display device.

FIG. 3A illustrates a pixel including a light-emitting element like an electroluminescent (EL) element as a display element included in each of the pixels. A transistor M2, a capacitor $C_S$, a transistor M3, and a light-emitting element EL are illustrated in the pixels 14A and 14B in FIG. 3A. In addition, a terminal supplied with a cathode voltage $V_{CAT}$, the signal line DL, the gate line GL, and a current supply line VL are illustrated in FIG. 3A.

Figure 3B:
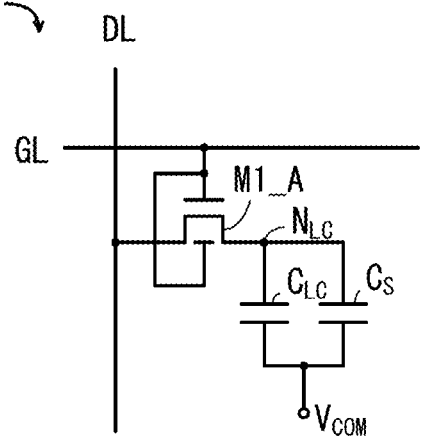

FIG. 3B illustrates a pixel provided with a transistor including a back gate electrode as a transistor of the pixel. The pixels 14A and 14B in FIG. 3B each include a transistor M1_A, the liquid crystal element $C_{LC}$, and the storage capacitor $C_S$. The node $N_{LC}$ in which a data signal is held is illustrated in FIG. 3B. In addition, the terminal supplied with a common voltage $V_{COM}$, the signal line DL, and the gate line GL are illustrated in FIG. 3B. The transistor M1_A can have a device structure of a transistor in which an oxide semiconductor film where a channel region is formed is electrically surrounded by electric fields of a gate electrode (first gate electrode) and a back gate electrode (second gate electrode). Such a device structure is referred to as a surrounded channel (s-channel) structure. Note that the structure of the transistor M1_A can also be applied to the transistor M3 in FIG. 3A.

Figure 3C:
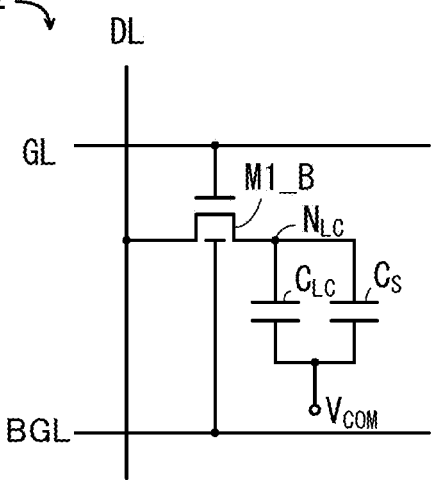

FIG. 3C illustrates a pixel provided with a transistor capable of applying different voltages to a gate electrode and a back gate electrode as the transistor of the pixel. The pixels 14A and 14B in FIG. 3C each include a transistor M1_B, the liquid crystal element $C_{LC}$, and the storage capacitor $C_S$. The node $N_{LC}$ in which a data signal is held is illustrated in FIG. 3C. In addition, the terminal supplied with the common voltage $V_{COM}$, the signal line DL, the gate line GL, and a back gate voltage control line BGL are illustrated in FIG. 3C. The transistor M1_B can control a threshold voltage by controlling a voltage supplied to the back gate voltage control line BGL. Note that the structure of the transistor M1_B can also be applied to the transistor M3 in FIG. 3A.

Figure 4:
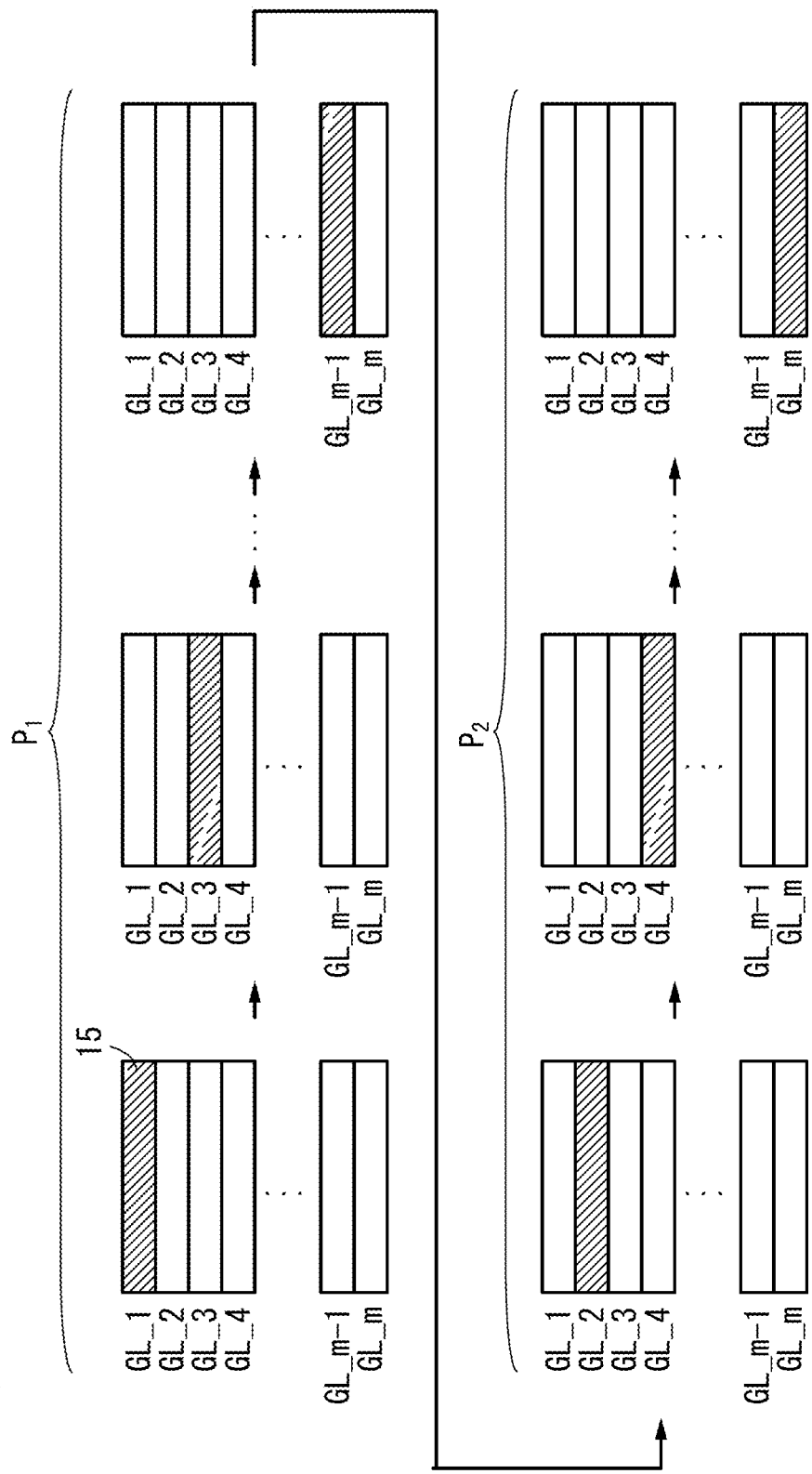
FIG. 4 illustrates the operation of a display device.

FIG. 4 schematically illustrates how a scan signal is supplied to a gate line of each row of the display device 10A in FIG. 1A in the first frame period $P_1$ and the second frame period $P_2$.

Gate lines GL_1 to GL_m in FIG. 4 correspond to the gate lines GL_1 to GL_m of the display device 10A in FIG. 1A. Writing regions 15 are illustrated in FIG. 4 as regions for writing data signals.

As described above, in the display device of this embodiment, in the first frame period $P_1$, scan signals are supplied to the gate lines in the odd-numbered rows to write data signals in the pixels. During the first frame period $P_1$, scan signals are not supplied to the gate lines in the even-numbered rows and data signals are not written in the pixels. Then, in the second frame period $P_2$, scan signals are supplied to the gate lines in the even-numbered rows to write data signals in the pixels. During the second frame period $P_2$, scan signals are not supplied to the gate lines in the odd-numbered rows and data signals are not written in the pixels. During the second frame period $P_2$, the pixels in the odd-numbered rows can hold the data signals written in the first frame period $P_1$. Therefore, it is possible to employ a structure in which display is performed by an interlace method and the written data signals are held also in the following frame period. Thus, a frame rate of each pixel can be reduced to half without causing degradation of display quality.

The operation explained in FIG. 4 will be described specifically in FIGS. 5A to 5D. In FIGS. 5A to 5D, a pixel portion in eight rows and nine columns is used for description. Note that a binary image of white and black is to be displayed. That is, a data signal written in a pixel is binary data.

Figure 5A:
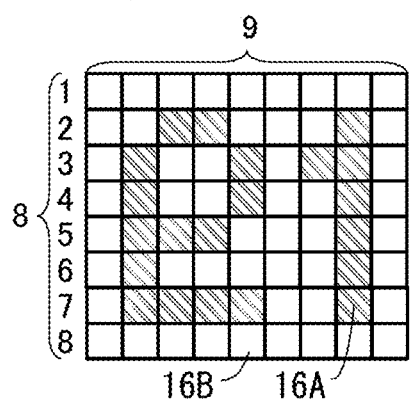
FIGS. 5A to 5D each illustrate the operation of a display device.

FIG. 5A schematically illustrates the pixel portion in the eight rows and the nine columns. Pixels in FIG. 5A are roughly divided into regions 16A for writing black data and regions 16B for writing white data.

Figure 5B:
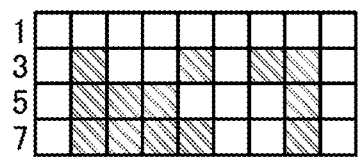

FIG. 5B illustrates pixels in which data signals are written by supplying scan signals to the gate lines in the odd-numbered rows in the first frame period $P_1$. In FIG. 5B, pixels in the first, third, fifth, and seventh rows are illustrated.

Figure 5C:
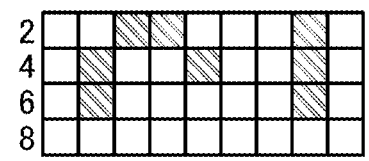

FIG. 5C illustrates pixels in which data signals are written by supplying scan signals to the gate lines in the even-numbered rows in the second frame period $P_2$. In FIG. 5C, pixels in the second, fourth, sixth, and eighth rows are illustrated.

As described above, in the display device of this embodiment, display is performed by an interlace method in each frame period. Therefore, the size of data of the data signals written in one frame period can be reduced; thus, access times to a frame memory can be reduced to half. In addition, the power consumption and the noise in an interface portion can be reduced because the size of data transmitted from an external circuit gets smaller.

Figure 5D:
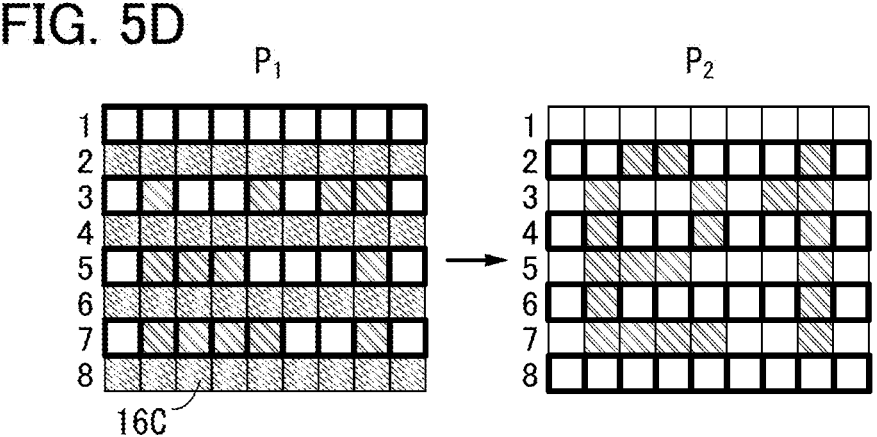

The pixels in FIG. 5B in which the data signals are written can be shown as in FIG. 5D in a schematic diagram of the pixel portion in the eight rows and the nine columns. Note that in FIG. 5D, regions where data signals are not written are illustrated as non-writing regions 16C. In FIG. 5D, the data signals are written by supplying the scan signals to the gate lines in the odd-numbered rows in the first frame period $P_1$. During the first frame period $P_1$, scan signals are not supplied to the gate lines in the even-numbered rows and data signals are not written. Then, the data signals are written by supplying the scan signals to the gate lines in the even-numbered rows in the second frame period $P_2$. During the second frame period $P_2$, the pixels in the odd-numbered rows can hold the data signals written in the first frame period $P_1$. A frame rate of each pixel can be reduced to half without causing degradation of display quality because the written data signals can also be held in the following frame period.

Figure 6A:
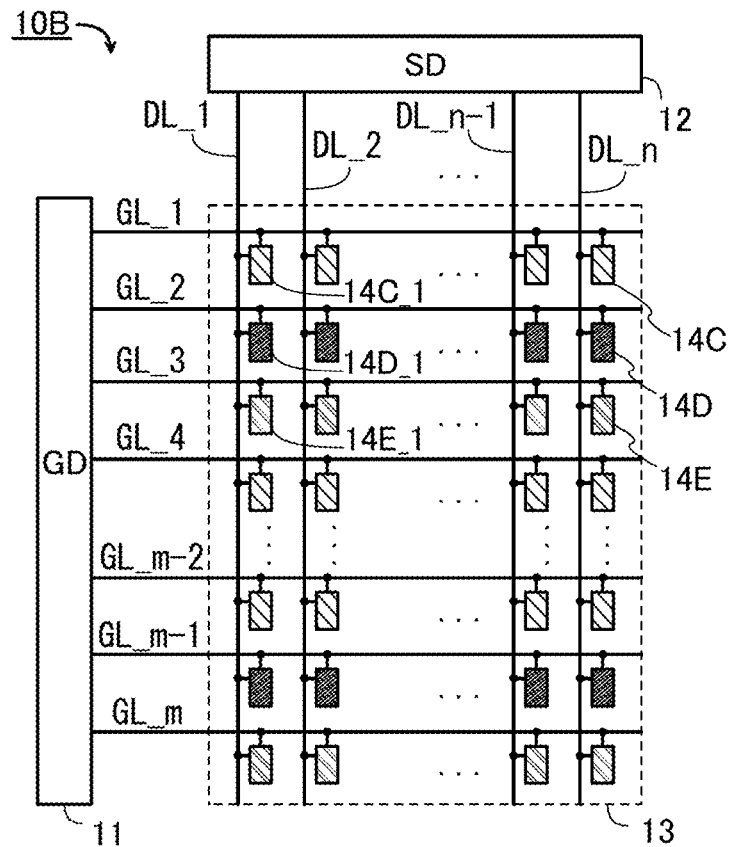
FIGS. 6A and 6B illustrate the structure and the operation of a display device.

FIG. 6A is a block diagram of a display device 10B which is different from the display device 10A in FIG. 1A. The display device 10B in FIG. 6A is different from the display device 10A in FIG. 1A in that pixels in a k-th (k is an integer of 1 or more) row are each illustrated as a pixel 14C, pixels in a (k+1)-th row are each illustrated as a pixel 14D, and pixels in a (k+2)-th row are each illustrated as a pixel 14E. In FIG. 6A, a pixel in the first row and the first column is illustrated as a pixel 14C_1, a pixel in the second row and the first column is illustrated as a pixel 14D_1, and a pixel in the third row and the first column is illustrated as a pixel 14E_1.

The pixels 14C, 14D, and 14E each include a transistor. A gate of the transistor of each of the pixels 14C, 14D, and 14E is connected to any one of the gate lines GL_1 to GL_m.

One of a source and a drain of the transistor of each of the pixels 14C, 14D, and 14E is connected to any one of the signal lines DL_1 to DL_n.

Similar to the transistor of each of the pixels 14A and 14B, the transistor of each of the pixels 14C, 14D, and 14E has an extremely low off-state current. Therefore, the pixels 14C, 14D, and 14E each can hold data signals written therein by turning off the transistor.

Figure 6B:
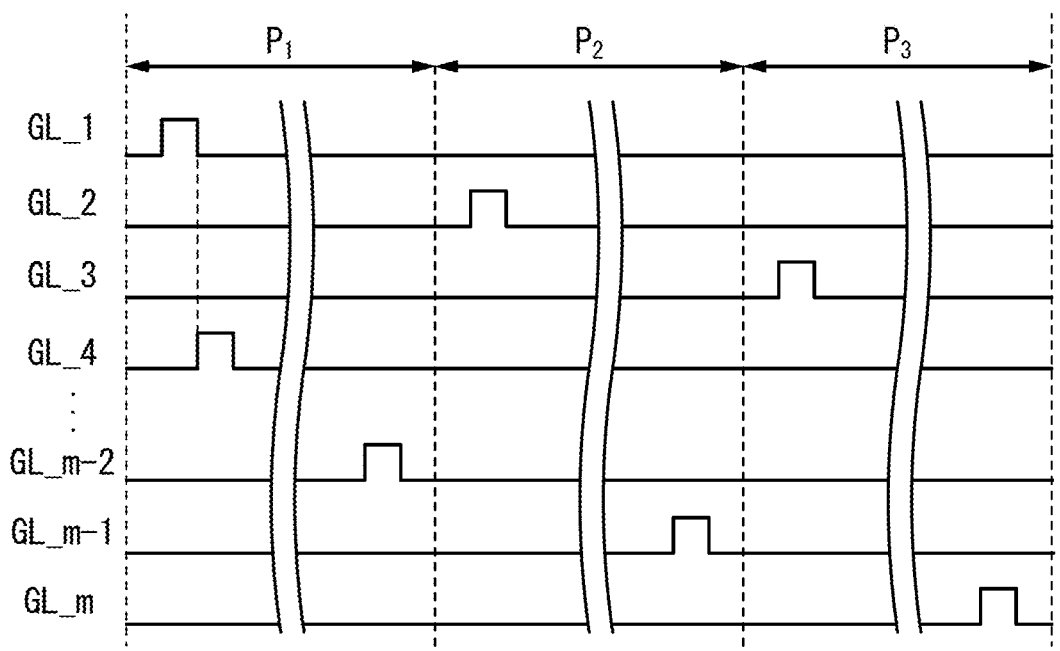

FIG. 6B is a timing chart for explaining the operation of the display device 10B.

In FIG. 6B, the first frame period $P_1$, the second frame period $P_2$, and a third frame period $P_3$ are illustrated. As illustrated, the second frame period $P_2$ is a successive frame period after the first frame period $P_1$. The third frame period $P_3$ is a successive frame period after the second frame period $P_2$.

In the first frame period $P_1$, the gate driver 11 supplies scan signals to the pixels in the k-th row. In the first frame period $P_1$, the gate driver 11 does not supply scan signals to the pixels in the (k+1)-th row and the (k+2)-th row.

In the second frame period $P_2$, the gate driver 11 supplies scan signals to the pixels in the (k+1)-th row. In the second frame period $P_2$, the gate driver 11 does not supply scan signals to the pixels in the k-th row and the (k+2)-th row.

In the third frame period $P_3$, the gate driver 11 supplies scan signals to the pixels in the (k+2)-th row. In the third frame period $P_3$, the gate driver 11 does not supply scan signals to the pixels in the k-th row and the (k+1)-th row.

As described above, each pixel of the display device 10B can hold the written data signal by turning off the transistor. The data signal written in the pixel in the first frame period $P_1$ can be held not only in the first frame period $P_1$ but also in the second frame period $P_2$ and the third frame period $P_3$. The data signal written in the pixel in the second frame period $P_2$ can be held not only in the second frame period $P_2$ but also in the third frame period $P_3$ and the following first frame period $P_1$. The data signal written in the pixel in the third frame period $P_3$ can be held not only in the third frame period $P_3$ but also in the following first frame period $P_1$ and second frame period $P_2$.

In the operation of the display device 10B in FIG. 6B, which is similar to the operation of the display device 10A in FIG. 1B, display is performed with a reduction in the number of gate lines selected in one frame period. Therefore, a period for selecting a gate line in one row per unit time can be sufficiently lengthened. Since the period for selecting a gate line in one row can be lengthened, a period for writing data signals in pixels can be ensured; thus, display quality can be greatly improved.

The operation of the display device 10B in FIG. 6B is effective particularly in a display device. In the display device, there are numbers of gate lines and signal lines in accordance with an increase in the number of pixels and thus the period for selecting a gate line in one row is shortened. With the operation of the display device 10B in FIG. 6B, the period for selecting a gate line in one row can be lengthened more than the period with the operation of the display device 10A in FIG. 1B and data signals written in the previous frame period can be held, so that the pixels in which data signals are not written in the following frame period can have a state in which the data signals are held and thus display can be performed without causing degradation of display quality.

In the operation of the display device 10B in FIG. 6B, data signals are written in every three rows, and the data signals are held in a frame period in which the data signals are written and the following frame period. Therefore, a frame rate of each pixel is reduced to one-third. Additionally, a period taken to display one image can be shortened as compared with the case where one image is displayed by writing data signals into pixels row-by-row. The structure is particularly effective in a period for displaying a still image in which data signals are less frequently rewritten.

Note that the configurations of the pixels 14C, 14D, and 14E are similar to those of the pixels 14A and 14B. That is, the circuit configurations in FIG. 2A and FIGS. 3A to 3C can be employed.

Figure 7:
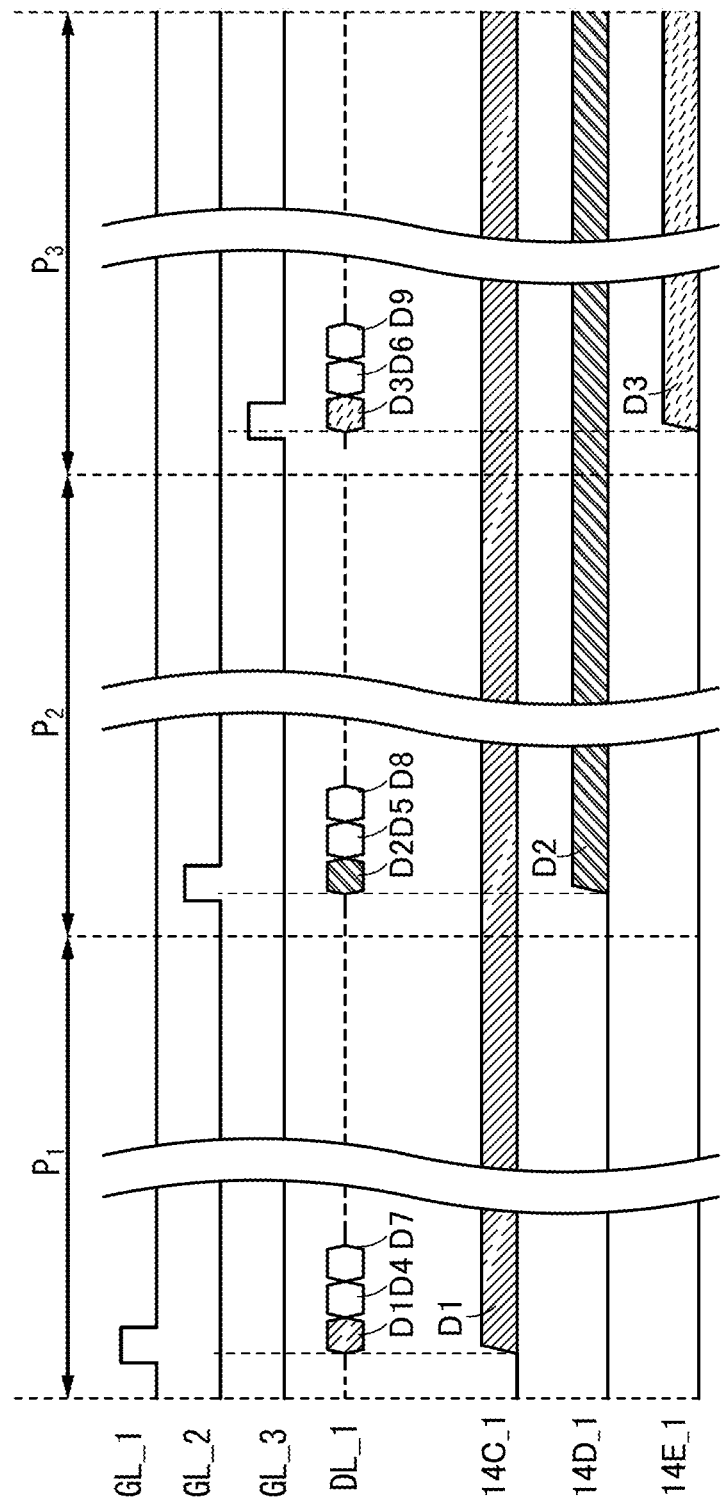
FIG. 7 illustrates the operation of a display device.

FIG. 7 is a timing chart illustrating an example of the operation for writing data signals in the pixel 14C_1 in the first row and the first column, the pixel 14D_1 in the second row and the first column, and the pixel 14E_1 in the third row and the first column in the display device 10B in FIG. 6A. FIG. 7 illustrates waveforms of the gate line GL_1 in the first row, the gate line GL_2 in the second row, the gate line GL_3 in the third row, and the signal line DL_1 in the first column in the first frame period $P_1$, the second frame period $P_2$, and the third frame period $P_3$. In addition, in FIG. 7, the data signals in the pixel 14C_1 in the first row and the first column, the pixel 14D_1 in the second row and the first column, and the pixel 14E_1 in the third row and the first column, which are held in the node $N_{LC}$, are illustrated. In FIG. 7, as the data signals supplied to the signal line DL_1 in the first column, data signals D1 to D9 supplied to the pixels in the first to ninth rows are illustrated.

As illustrated in FIG. 7, in the first frame period $P_1$, the gate line GL_1 in the first row is set at H level and the data signal D1 of the signal line DL_1 in the first column is written in the node $N_{LC}$ of the pixel 14C_1. Then, in the second frame period $P_2$, the gate line GL_2 in the second row is set at H level and the data signal D2 of the signal line DL_1 in the first column is written in the node $N_{LC}$ of the pixel 14D_1. In the second frame period $P_2$, the gate line GL_1 in the first row is set at L level to hold the data signal D1 written in the first frame period $P_1$. Then, in the third frame period $P_3$, the gate line GL_3 in the third row is set at H level and the data signal D3 of the signal line DL_1 in the first column is written in the node $N_{LC}$ of the pixel 14E_1. In the third frame period $P_3$, the gate line GL_1 in the first row and the gate line GL_2 in the second row are each set at L level to hold the data signal D1 and the data signal D2 written in the first frame period $P_1$ and the second frame period $P_2$, respectively.

As described above, the off-state current of the transistor of each of the pixels 14C_1, 14D_1, and 14E_1 is extremely small. Therefore, it is possible to employ a structure in which display is performed by writing data signals in every three rows, and the data signals are held from a frame period in which the data signals are written to a frame period in which next writing is performed. Thus, the writing interval of a data signal of each pixel can be lengthened without causing degradation of display quality.

Figure 8:
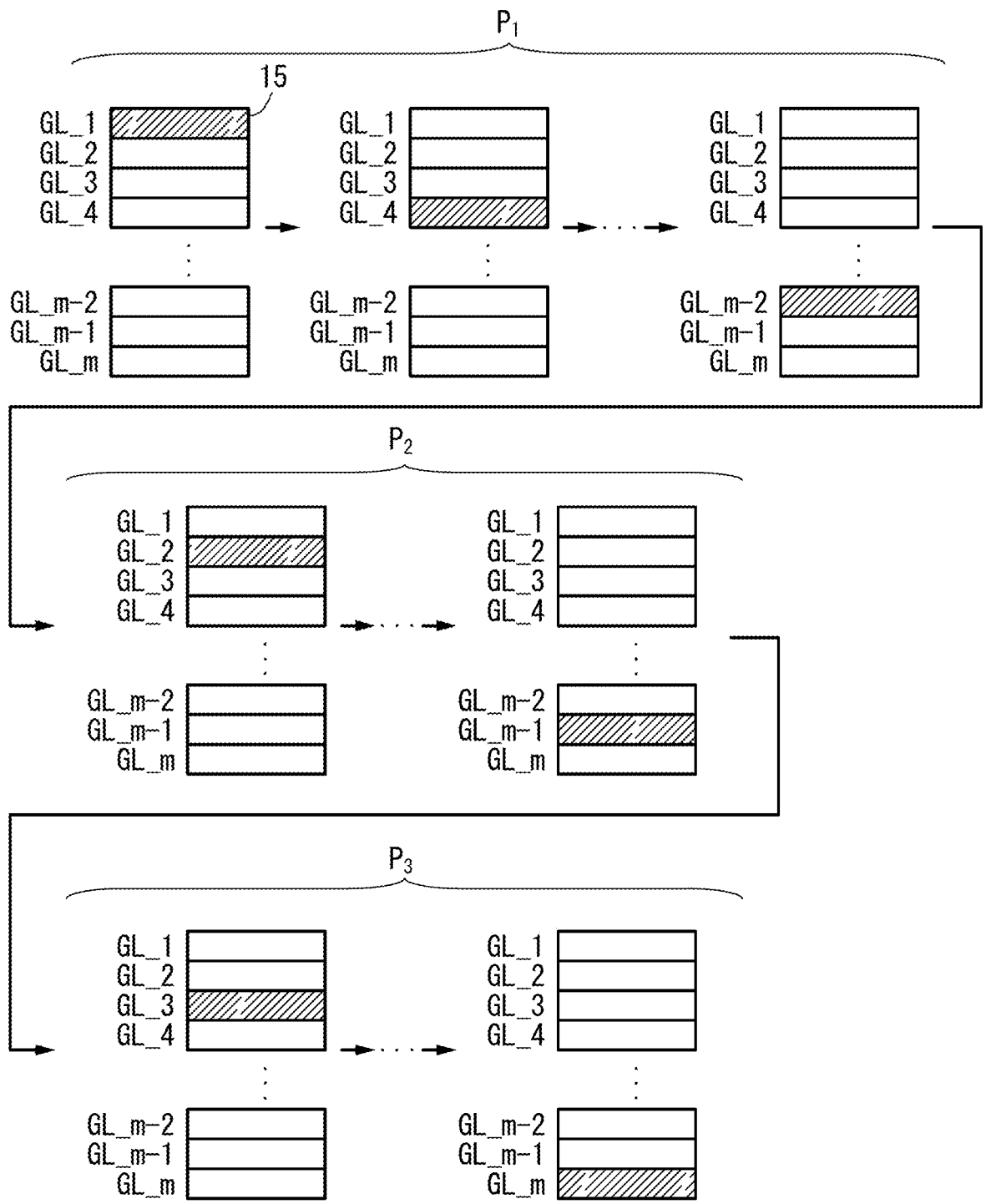
FIG. 8 illustrates the operation of a display device.

FIG. 8 schematically illustrates how a scan signal is supplied to a gate line of each row of the display device 10B in FIG. 6A in the first frame period $P_1$, the second frame period $P_2$, and the third frame period $P_3$.

Gate lines GL_1 to GL_m in FIG. 8 correspond to the gate lines GL_1 to GL_m of the display device 10B in FIG. 6A. The writing regions 15 are illustrated in FIG. 8 as regions for writing data signals.

As described above, in the display device of this embodiment, in the first frame period $P_1$, the scan signal is supplied to the gate line in the k-th row to write data signals. During the first frame period $P_1$, scan signals are not supplied to the gate lines in the (k+1) row and the (k+2) rows and data signals are not written. In a similar manner, data signals are written by supplying the scan signals to the gate lines in the (k+1) row and the (k+2) row in the second frame period $P_2$ and the third frame period $P_3$, respectively. The pixels to which scan signals are not supplied and in which data signals are not written can hold the data signals written in the previous frame period. Thus, the writing interval of a data signal of each pixel can be lengthened without causing degradation of display quality.

Figure 9A:
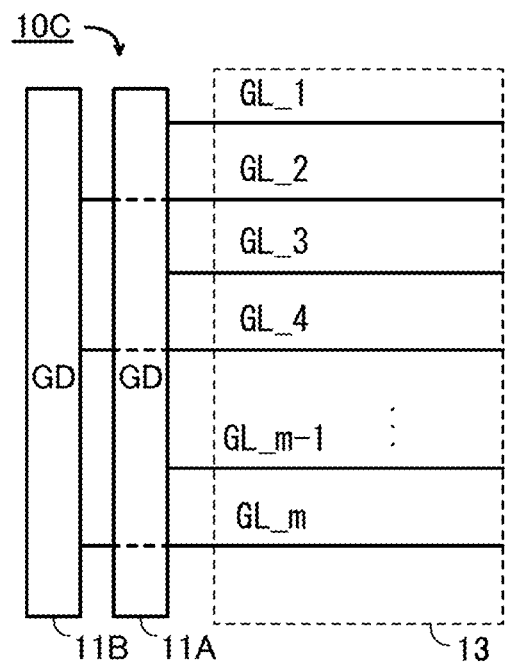
FIGS. 9A to 9D each illustrate the structure of a display device.
Figure 9B:
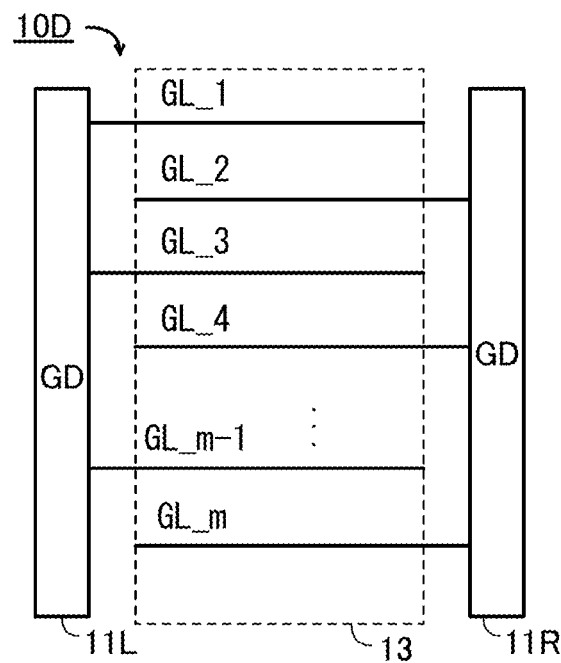
Figure 9C:
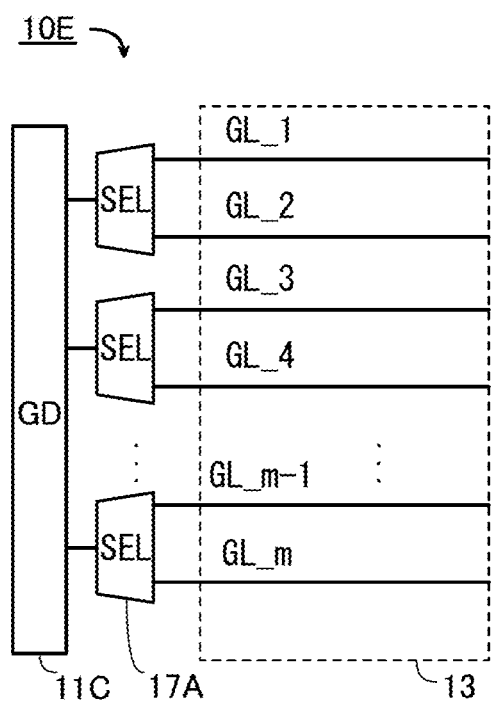
Figure 9D:
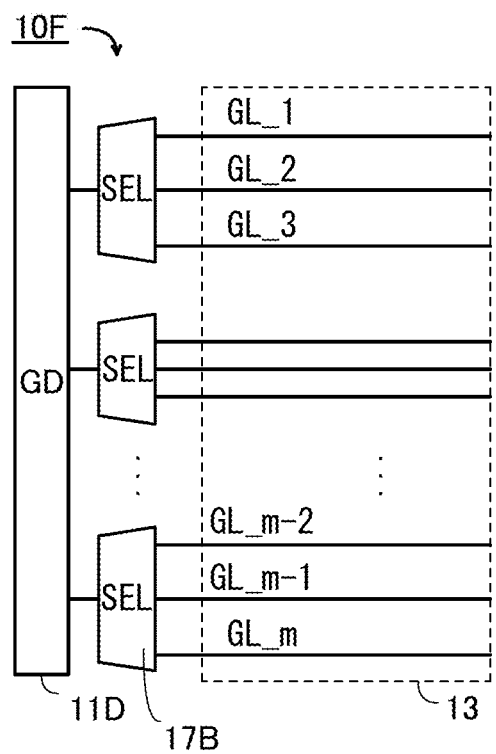

FIGS. 9A to 9C illustrate structure examples of the gate driver that can be applied to the display device 10A. FIG. 9D illustrates a structure example of the gate driver that can be applied to the display device 10B.

A display device 10C in FIG. 9A includes a gate driver 11A and a gate driver 11B. The gate driver 11A supplies scan signals to gate lines in the odd-numbered rows, and the gate driver 11B supplies scan signals to gate lines in the even-numbered rows.

A display device 10D in FIG. 9B includes a gate driver 11L and a gate driver 11R. The gate driver 11L and the gate driver 11R are provided on the left and right of the pixel portion 13. With the structure, the degree of wiring congestion can be reduced. The gate driver 11L supplies scan signals to gate lines in the odd-numbered rows, and the gate driver 11R supplies scan signals to gate lines in the even-numbered rows.

A display device 10E in FIG. 9C includes a gate driver 11C and a plurality of switching circuits 17A. The plurality of switching circuits 17A can switch scan signals output from the gate driver 11C between the gate lines in the odd-numbered rows and the gate lines in the even-numbered rows to be output. With the structure, the number of scan signals output from the gate driver 11C can be reduced.

A display device 10F in FIG. 9D includes a gate driver 11D and a plurality of switching circuits 17B. The plurality of switching circuits 17B can switch scan signals output from the gate driver 11D between the gate lines in the k-th rows, the gate lines in the (k+1) rows, and the gate lines in the (k+2) rows to be output. With the structure, the number of scan signals output from the gate driver 11D can be reduced.

Figure 10A:
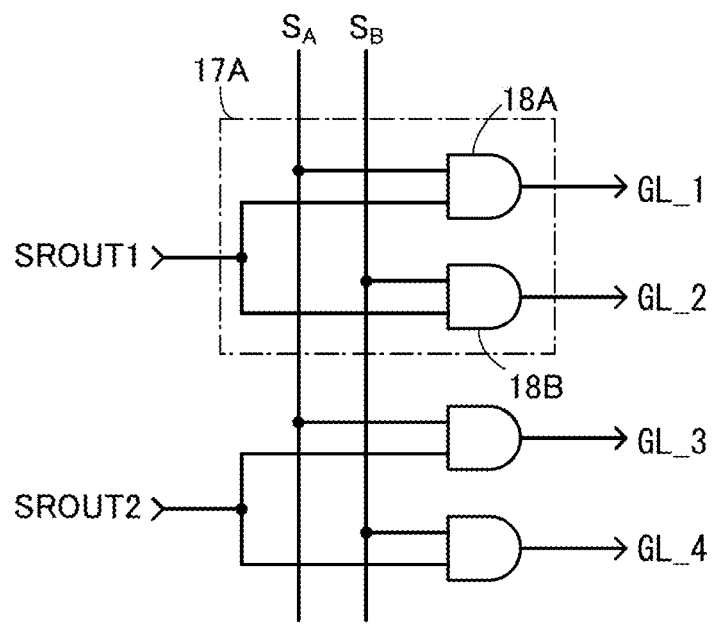
FIGS. 10A and 10B illustrate the structure and the operation of a display device.

FIG. 10A illustrates an example of a circuit configuration that can be applied to the switching circuit 17A. A pulse signal SROUT1 and a pulse signal SROUT2 are output from the gate driver 11C. A switching signal $S_A$ and a switching signal $S_B$ are signals for switching between the pulse signal SROUT1 and the pulse signal SROUT2 which are output to the gate lines in the odd-numbered rows or the gate lines in the even-numbered rows. The switching circuit 17A includes AND circuits 18A and 18B which are logic circuits. Depending on the input switching signal $S_A$ or $S_B$, the AND circuits 18A and 18B select whether an output destination of the pulse signal SROUT1 is determined to be the gate line GL_1 or the gate line GL_2 and whether an output destination of the pulse signal SROUT2 is determined to be the gate line GL_3 or the gate line GL_4.

Figure 10B:
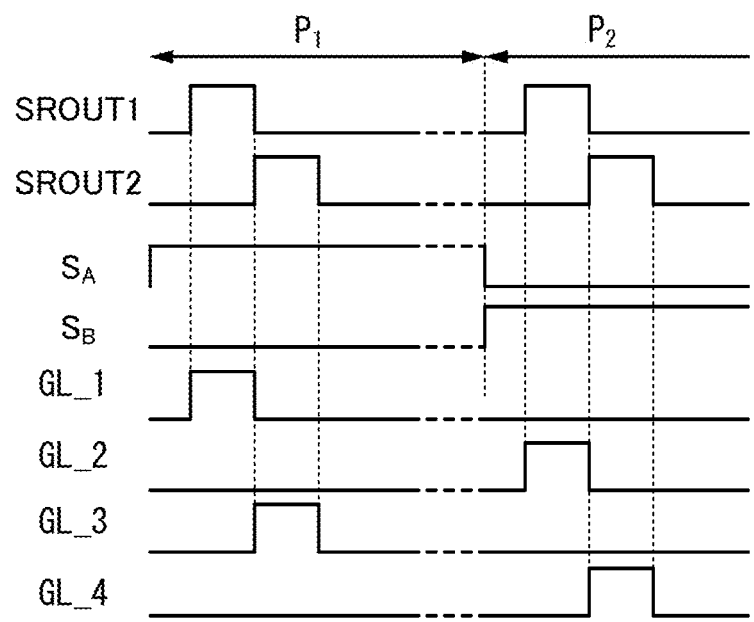

FIG. 10B is a timing chart illustrating an example of the operation of the switching circuit 17A in FIG. 10A. The pulse signal SROUT1 and the pulse signal SROUT2 can be output to the rows switched in the periods in which the switching signals $S_A$ and $S_B$ are at H level.

Figure 11A:
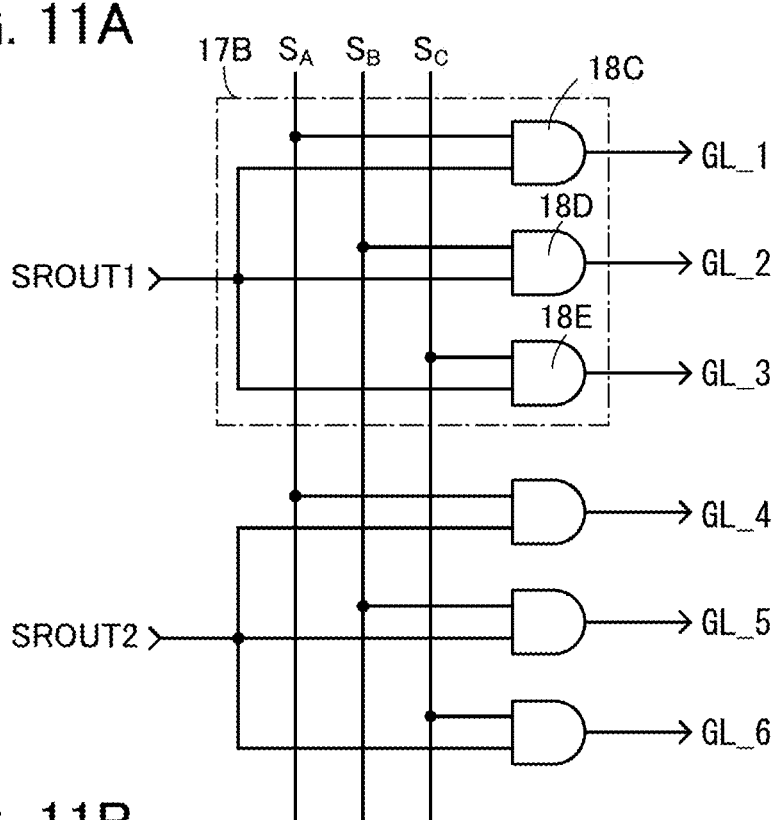
FIGS. 11A and 11B illustrate the structure and the operation of a display device.

FIG. 11A illustrates an example of a circuit configuration that can be applied to the switching circuit 17B. A pulse signal SROUT1 and a pulse signal SROUT2 are output from the gate driver 11D. The switching signal $S_A$, the switching signal $S_B$, and a switching signal $S_C$ are signals for switching between the pulse signal SROUT1 and the pulse signal SROUT2 which are output to the gate lines in the k-th rows, the gate lines in the (k+1) rows, or the gate lines in the (k+2) rows. The switching circuit 17B includes AND circuits 18C, 18D, and 18E which are logic circuits. Depending on the input switching signal $S_A$, $S_B$, or $S_C$, the AND circuits 18C, 18D, and 18E select whether an output destination of the pulse signal SROUT1 is determined to be the gate line GL_1, the gate line GL_2, or the gate line GL_3 and whether an output destination of the pulse signal SROUT2 is determined to be the gate line GL_4, the gate line GL_5, or the gate line GL_6.

Figure 11B:
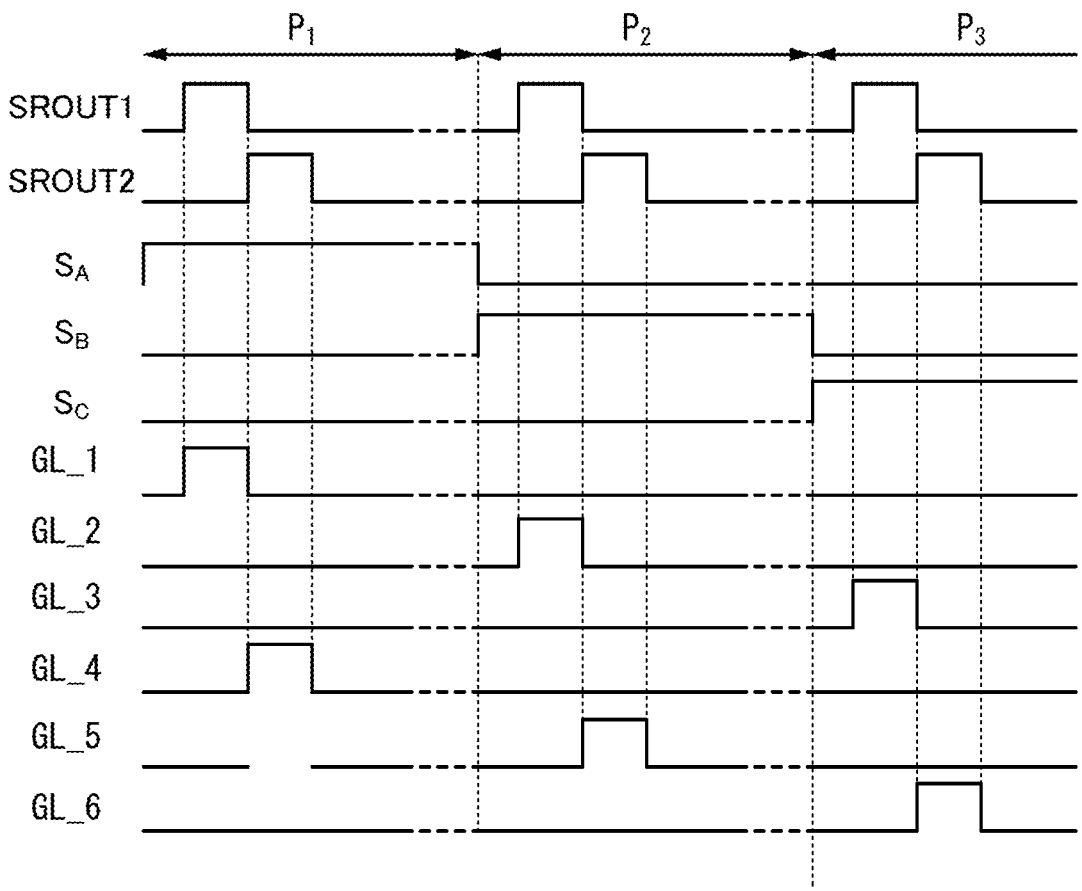

FIG. 11B is a timing chart illustrating an example of the operation of the switching circuit 17B in FIG. 11A. The pulse signal SROUT1 and the pulse signal SROUT2 can be output to the rows switched in the periods in which the switching signals $S_A$, $S_B$, and $S_C$ are at H level.

Figure 12A:
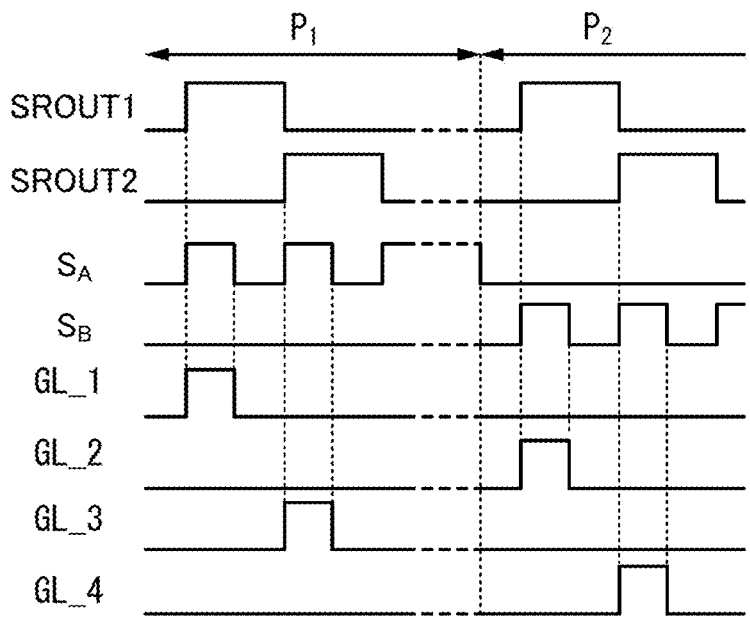
FIGS. 12A and 12B illustrate the operations of a display device.

FIG. 12A is a timing chart illustrating an operation example which is different from the example in FIG. 10B. Scan signals can be output to selected rows of the gate lines at timing at which both the pulse signal SROUT1 (pulse signal SROUT2) and the switching signal $S_A$ or $S_B$ are at H level.

Figure 12B:
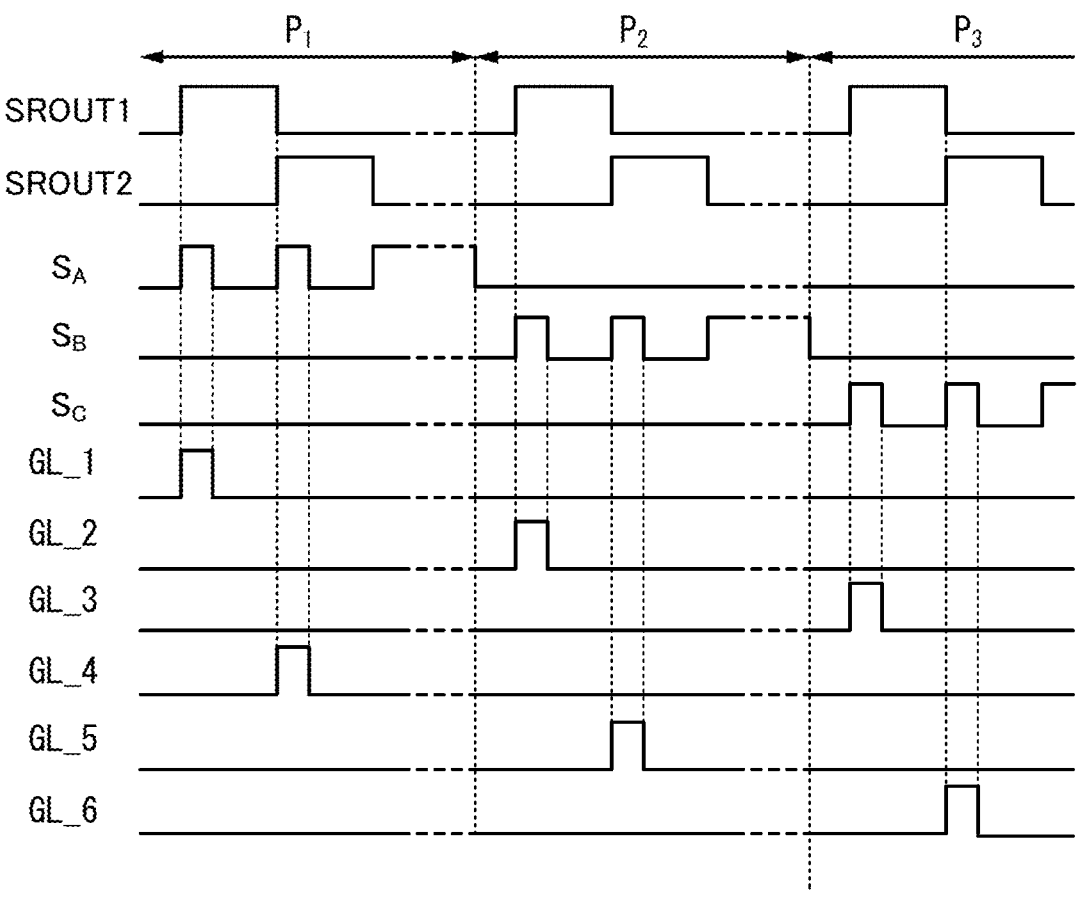

FIG. 12B is a timing chart illustrating an operation example which is different from the example in FIG. 11B. Scan signals can be output to selected rows of the gate lines at timing at which both the pulse signal SROUT1 (pulse signal SROUT2) and the switching signal $S_A$, $S_B$, or $S_C$ are at H level.

With the structures in FIGS. 12A and 12B, signals which are needed can be generated even without operating the gate driver at high speed. The frequency of a clock signal required for the operation can be reduced in the gate driver. Therefore, the power consumption of the display device can be reduced.

In the display device described above, display is performed with a reduction in the number of gate lines selected in one frame period. Therefore, a period for selecting a gate line in one row per unit time can be sufficiently lengthened. Since the period for selecting a gate line in one row can be lengthened, a period for writing data signals in pixels can be ensured; thus, display quality can be greatly improved. In addition, in the display device described above, data signals written in the previous frame period can be held, so that the pixels in which data signals are not written in the following frame period can have a state in which the data signals are held and thus display can be performed without causing degradation of display quality. In addition, the power consumption of the display device can be reduced.

1-2. Structure Example 2 of Display Device

A structure example of a display device which is different from the above-described structure example will be described with reference to FIGS. 13A and 13B, FIG. 14, FIG. 15, FIG. 16, FIG. 17, FIGS. 18A and 18B, and FIGS. 19A and 19B. In particular, a display device capable of differentiating a frame rate in accordance with a display region of a moving image or a still image will be described.

Figure 13A:
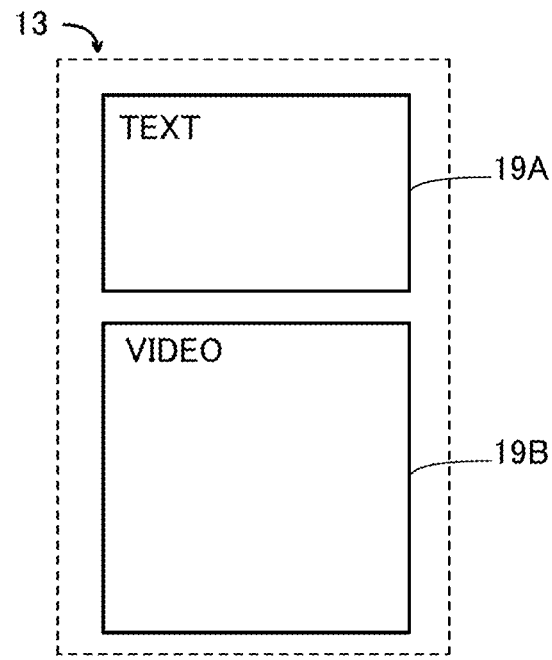
FIGS. 13A and 13B illustrate the structure of a display device.

FIG. 13A schematically illustrates an example of display of the pixel portion 13 to be a display portion. A text display region 19A and a video display region 19B are illustrated in FIG. 13A. A display region of a portable information terminal such as a smartphone is in some cases divided into the text display region 19A and the video display region 19B as in FIG. 13A.

The text display region 19A in FIG. 13A can be roughly classified into a still image display region. Even when a frame rate in displaying is reduced, the influence of degrading display quality is small in the still image display region. The video display region 19B in FIG. 13A can be roughly classified into a moving image display region. An increase in a frame rate in displaying in the moving image display region can improve display quality.

Figure 13B:
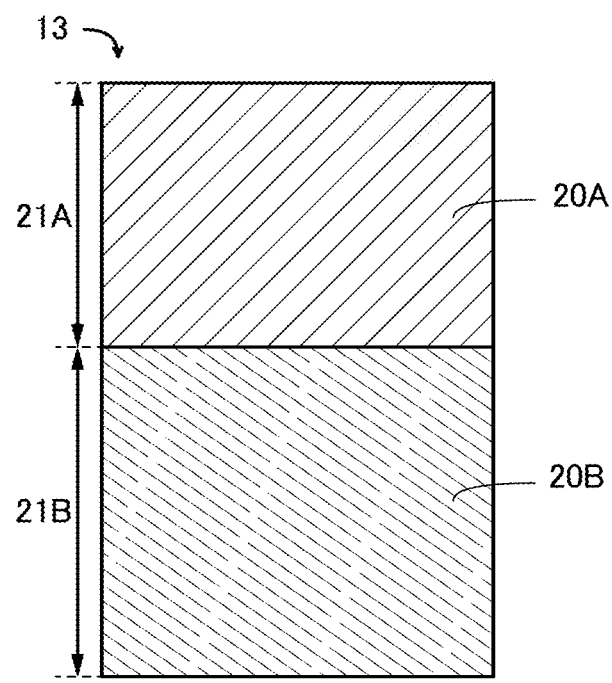

FIG. 13B schematically illustrates a still image display region 20A and a moving image display region 20B of the pixel portion 13 with reference to FIG. 13A. In the still image display region 20A of the pixel portion 13 in FIG. 13B, rows to which scan signals are supplied from the gate driver are illustrated as a first region 21A. In the moving image display region 20B of the pixel portion 13 in FIG. 13B, rows to which scan signals are supplied from the gate driver are illustrated as a second region 21B.

Figure 14:
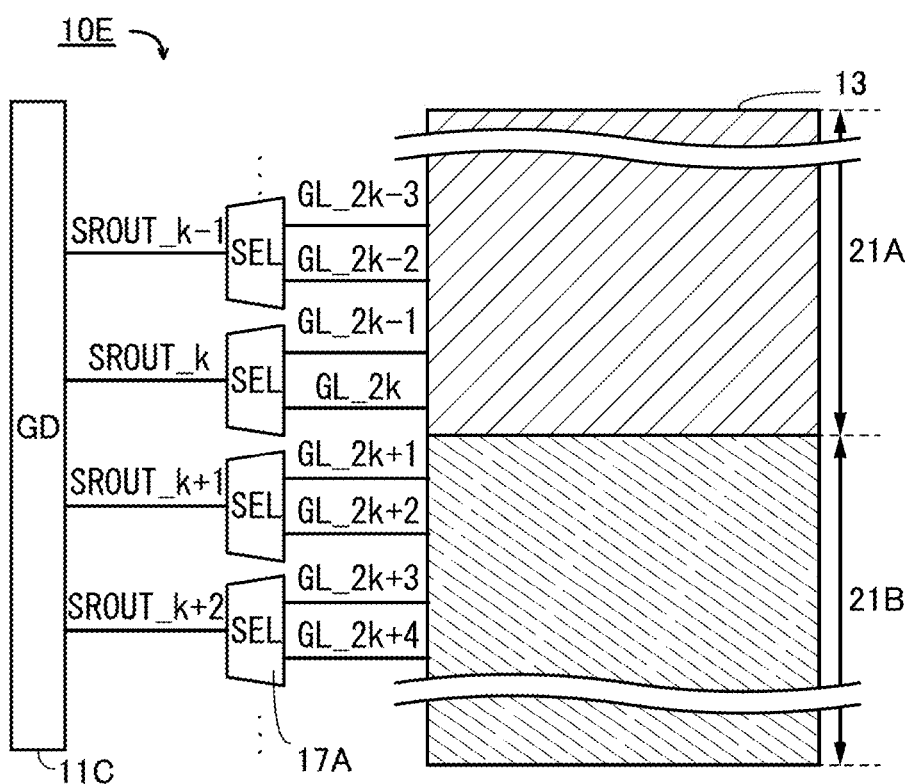
FIG. 14 illustrates the structure of a display device.

FIG. 14 illustrates the first region 21A and the second region 21B corresponding to the still image display region 20A and the moving image display region 20B, respectively, of the pixel portion 13 in FIG. 13B in the display device 10E in FIG. 9C.

FIG. 14 illustrates a boundary of the first region 21A and the second region 21B between a gate line in a $2k$-row and a gate line in a $(2k+1)$-row. Wirings supplied with pulse signals SROUT_k−1 to SROUT_k+2 and gate lines GL_$2k$−3 to GL_$2k$+4 are illustrated in FIG. 14. For example, the pulse signal SROUT_k−1 can output a scan signal to the gate line GL_$2k$−3 or GL_$2k$−2 by the switching circuit 17A.

Figure 15:
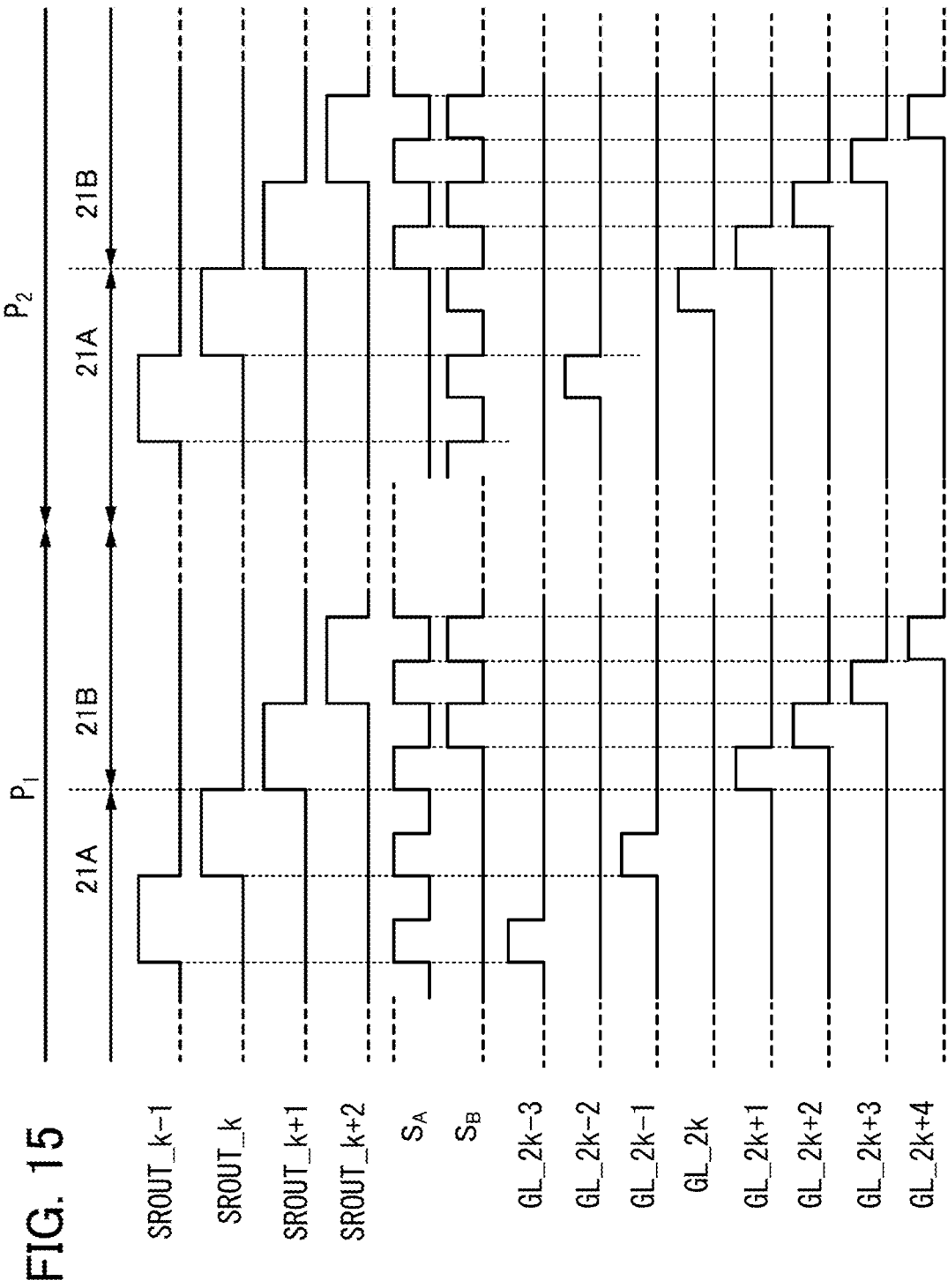
FIG. 15 illustrates the operation of a display device.

FIG. 15 is a timing chart when a frame rate can be differentiated in accordance with a display region of a moving image or a still image based on the operation example described in FIG. 12A. FIG. 15 illustrates the pulse signals SROUT_k−1 to SROUT_k+2, the switching signals $S_A$ and $S_B$, and scan signals of the gate lines GL_$2k$−3 to GL_$2k$+4, which are arranged near the boundary of the first region 21A and the second region 21B, in the first frame period $P_1$ and the second frame period $P_2$.

As illustrated in FIG. 15, in the first frame period $P_1$ in which scan signals are output to the first region 21A, the scan signals are output to the gate lines GL_$2k$−3 and GL_$2k$−1 in the odd-numbered rows by periodically setting the switching signal $S_A$ at H level. In the period, scan signals are not output to the gate lines GL_$2k$−2 and GL_$2k$ in the even-numbered rows by setting the switching signal $S_B$ at L level.

As illustrated in FIG. 15, in the first frame period $P_1$ in which scan signals are output to the second region 21B, the scan signals are output to the gate lines GL_$2k$+1, GL_$2k$+2, GL_$2k$+3, and GL_$2k$+4 in this order by alternately setting the switching signals $S_A$ and $S_B$ at H level.

As illustrated in FIG. 15, in the second frame period $P_2$ in which scan signals are output to the first region 21A, the scan signals are output to the gate lines GL_$2k$−2 and GL_$2k$ in the even-numbered rows by periodically setting the switching signal $S_B$ at H level. In the period, scan signals are not output to the gate lines GL_$2k$−3 and GL_$2k$−1 in the odd-numbered rows by setting the switching signal $S_A$ at L level.

As illustrated in FIG. 15, in the second frame period $P_2$ in which scan signals are output to the second region 21B, the scan signals are output to the gate lines GL_$2k$+1, GL_$2k$+2, GL_$2k$+3, and GL_$2k$+4 in this order by alternately setting the switching signals $S_A$ and $S_B$ at H level.

Figure 43:
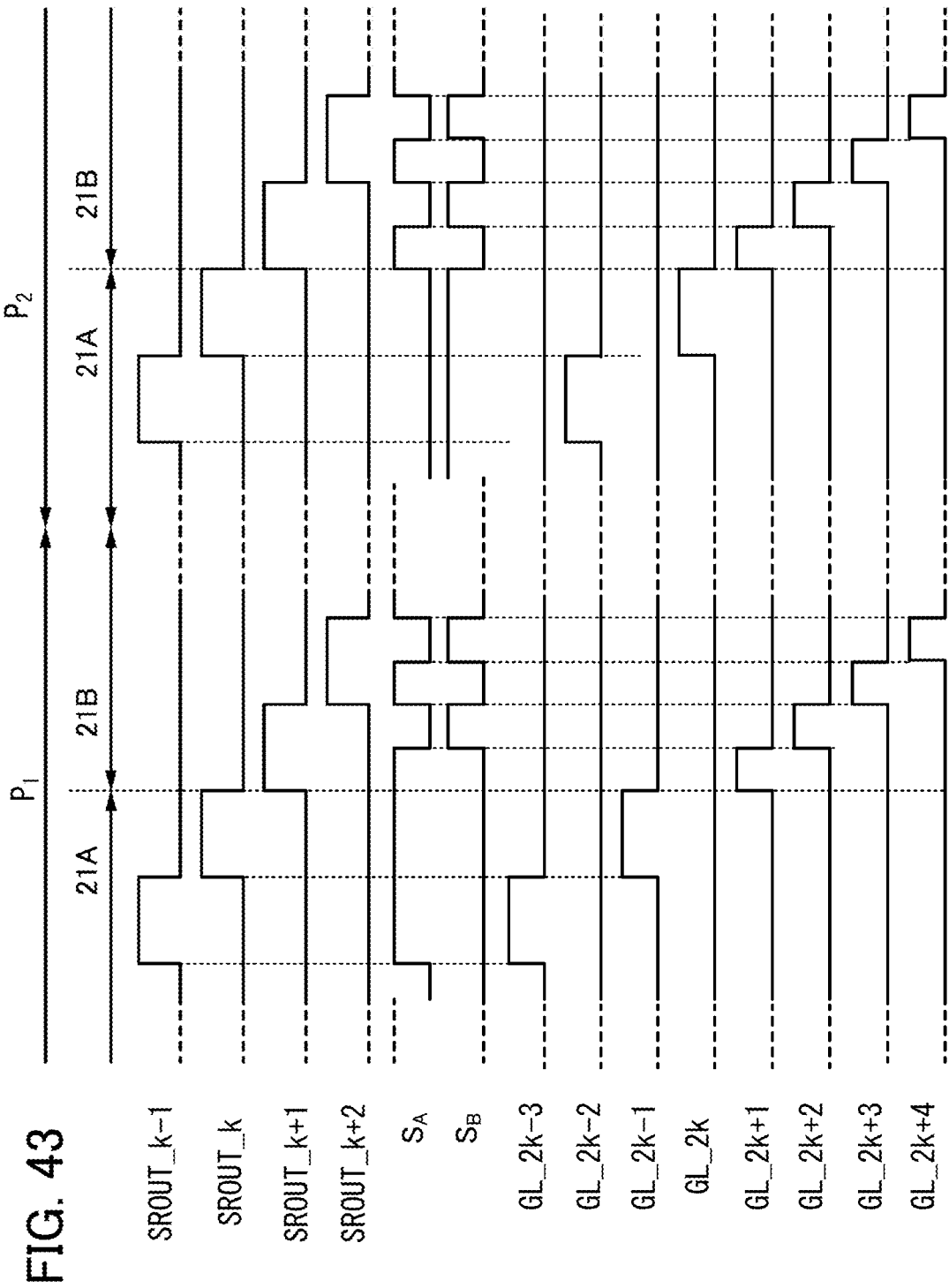
FIG. 43 illustrates the operation of a display device.

As illustrated in FIG. 43, in the first frame period $P_1$ in which scan signals are output to the first region 21A and the second frame period $P_2$ in which scan signals are output to the first region 21A, the switching signal $S_A$ or $S_B$ may be constantly held at H level. With the structure, power consumption can be reduced by the amount required to charge and discharge the wiring supplied with the switching signal $S_A$ or $S_B$.

As described above, in the structures of FIGS. 13A and 13B, FIG. 14, FIG. 15, and FIG. 43, display in different regions with different frame rates can be achieved by differentiating the frequency of setting scan signals at H level in one frame period between the first region 21A corresponding to the still image display region and the second region 21B corresponding to the moving image display region. With the structure, in the still image display region, a period of writing data signals in pixels can be sufficiently lengthened by reducing the frequency of rewriting data signals. In addition, in the moving image display region, the display quality of a moving image can be improved by increasing the frequency of rewriting data signals.

Figure 16:
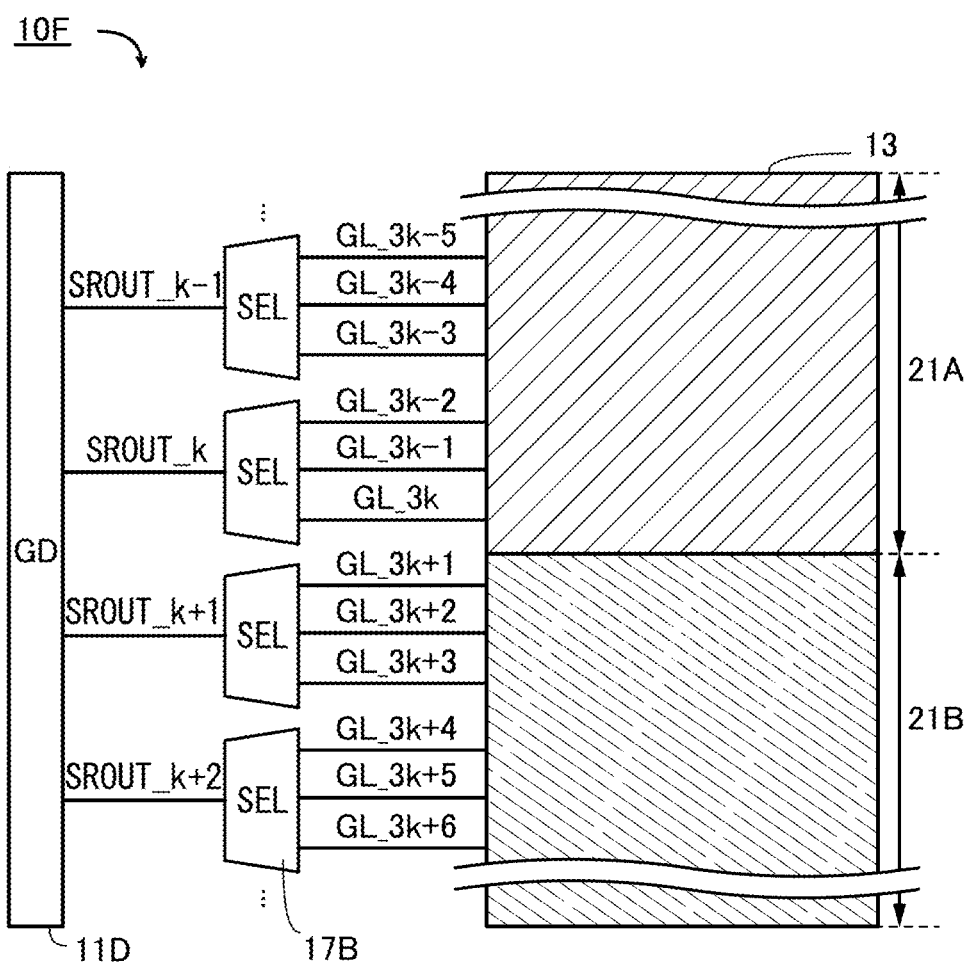
FIG. 16 illustrates the structure of a display device.

FIG. 16 illustrates the first region 21A and the second region 21B corresponding to the still image display region 20A and the moving image display region 20B, respectively, of the pixel portion 13 in FIG. 13B in the display device 10F in FIG. 9D.

FIG. 16 illustrates a boundary of the first region 21A and the second region 21B between a gate line in a $3k$-row and a gate line in a $(3k+1)$-row. The wirings supplied with the pulse signals SROUT_k−1 to SROUT_k+2 and gate lines GL_$3k$−5 to GL_$3k$+6 are illustrated in FIG. 16. For example, the pulse signal SROUT_k−1 can output a scan signal to the gate line GL_$3k$−5, GL_$3k$−4, or GL_$3k$−3 by the switching circuit 17B.

Figure 17:
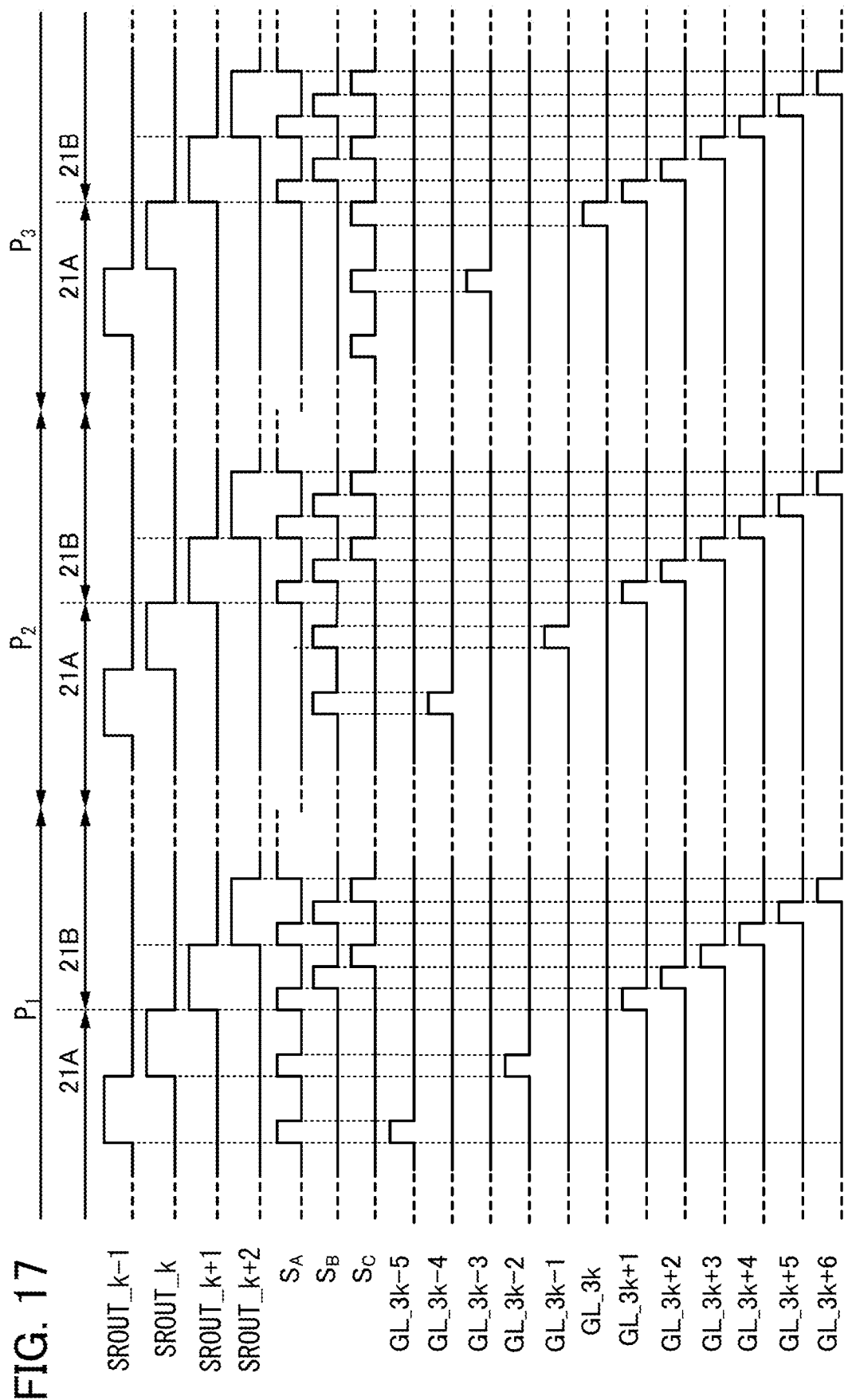
FIG. 17 illustrates the operation of a display device.

FIG. 17 is a timing chart when a frame rate can be differentiated in accordance with a display region of a moving image or a still image based on the operation example described in FIG. 12B. FIG. 17 illustrates the pulse signals SROUT_k−1 to SROUT_k+2, the switching signals $S_A$, $S_B$, and $S_C$, and scan signals of the gate lines GL_$3k$−5 to GL_$3k$+6, which are arranged near the boundary of the first region 21A and the second region 21B, in the first frame period $P_1$, the second frame period $P_2$, and the third frame period $P_3$.

As illustrated in FIG. 17, in the first frame period $P_1$ in which scan signals are output to the first region 21A, the scan signals are output to the gate lines GL_$3k$−5 and GL_$3k$−2 by periodically setting the switching signal $S_A$ at H level. In the period, scan signals are not output to the gate lines GL_$3k$−4, GL_$3k$−3, GL_$3k$−1, and GL_$3k$ by setting the switching signals $S_B$ and $S_C$ at L level.

As illustrated in FIG. 17, in the first frame period $P_1$ in which scan signals are output to the second region 21B, the scan signals are output to the gate lines GL_$3k$+1, GL_$3k$+2, GL_$3k$+3, GL_$3k$+4, GL_$3k$+5, and GL_$3k$+6 in this order by alternately setting the switching signals $S_A$, $S_B$, and $S_C$ at H level.

As illustrated in FIG. 17, in the second frame period $P_2$ in which scan signals are output to the first region 21A, the scan signals are output to the gate lines GL_$3k$−4 and GL_$3k$−1 by periodically setting the switching signal $S_B$ at H level. In the period, scan signals are not output to the gate lines GL_$3k$−5, GL_$3k$−3, GL_$3k$−2, and GL_$3k$ by setting the switching signals $S_A$ and $S_C$ at L level.

As illustrated in FIG. 17, in the second frame period $P_2$ in which scan signals are output to the second region 21B, the scan signals are output to the gate lines GL_$3k$+1, GL_$3k$+2, GL_$3k$+3, GL_$3k$+4, GL_$3k$+5, and GL_$3k$+6 in this order by alternately setting the switching signals $S_A$, $S_B$, and $S_C$ at H level.

As illustrated in FIG. 17, in the third frame period $P_3$ in which scan signals are output to the first region 21A, the scan signals are output to the gate lines GL_3k–3 and GL_3k by periodically setting the switching signal $S_C$ at H level. In the period, scan signals are not output to the gate lines GL_3k–5, GL_3k–4, GL_3k–2, and GL_3k–1 by setting the switching signals $S_A$ and $S_B$ at L level.

As illustrated in FIG. 17, in the third frame period $P_3$ in which scan signals are output to the second region 21B, the scan signals are output to the gate lines GL_3k+1, GL_3k+2, GL_3k+3, GL_3k+4, GL_3k+5, and GL_3k+6 in this order by alternately setting the switching signals $S_A$, $S_B$, and $S_C$ at H level.

Figure 44:
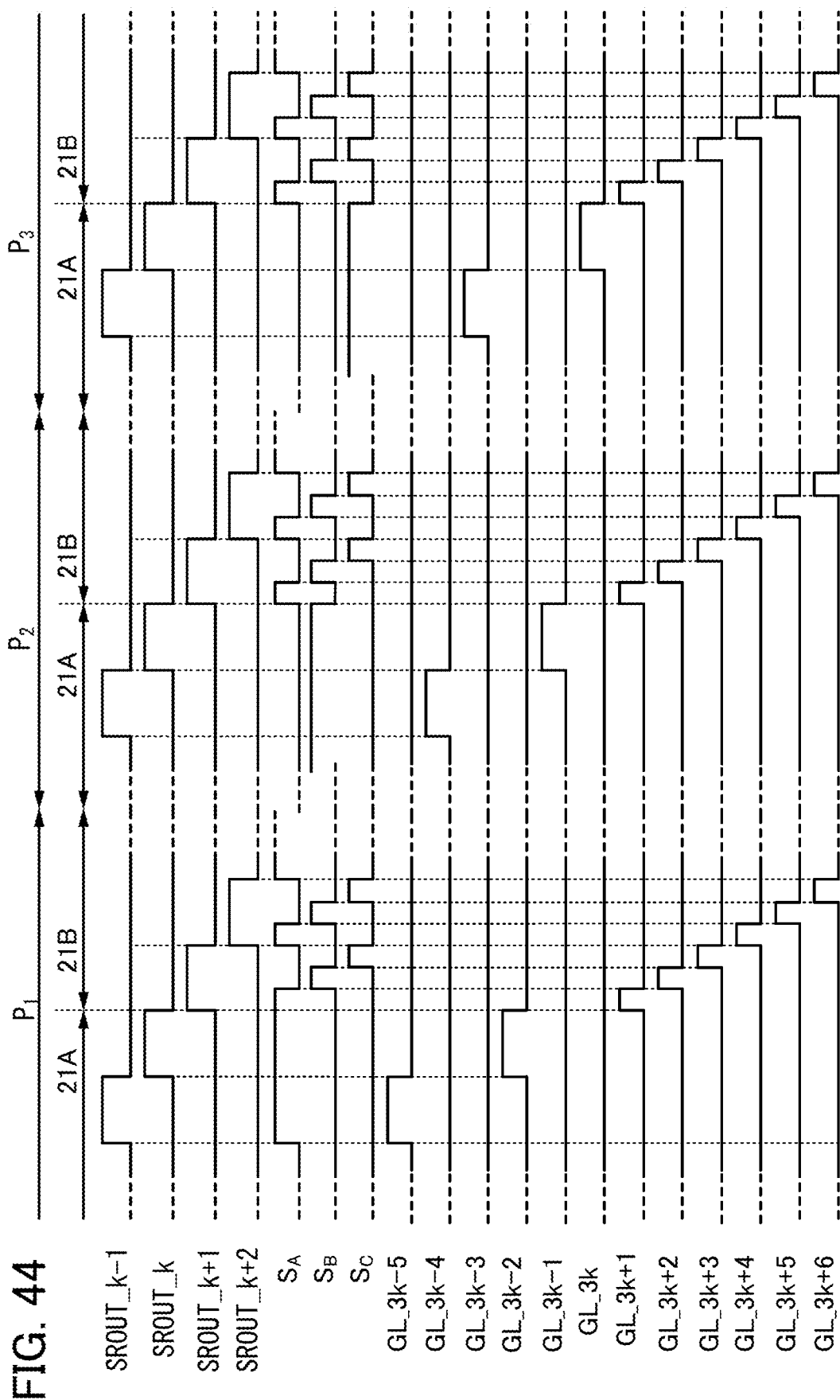
FIG. 44 illustrates the operation of a display device.

As illustrated in FIG. 44, in the first frame period $P_1$ in which scan signals are output to the first region 21A, the second frame period $P_2$ in which scan signals are output to the first region 21A, and the third frame period $P_3$ in which scan signals are output to the first region 21A, the switching signal $S_A$ or $S_B$ may be constantly held at H level. With the structure, power consumption can be reduced by the amount required to charge and discharge the wiring supplied with the switching signal $S_A$ or $S_B$.

As described above, in the structures of FIG. 16, FIG. 17, and FIG. 44, display in different regions with different frame rates can be achieved by differentiating the frequency of setting scan signals at H level in one frame period between the first region 21A corresponding to the still image display region and the second region 21B corresponding to the moving image display region. With the structure, in the still image display region, a period of writing data signals in pixels can be sufficiently lengthened by reducing the frequency of rewriting data signals. In addition, in the moving image display region, the display quality of a moving image can be improved by increasing the frequency of rewriting data signals. In addition, the power consumption of the display device can be reduced.

Note that although the structure in which a scan signal is set at H level in every other row in the region in which a frame rate is reduced is described above, one embodiment of the present invention is not limited to the structure.

Figure 18A:
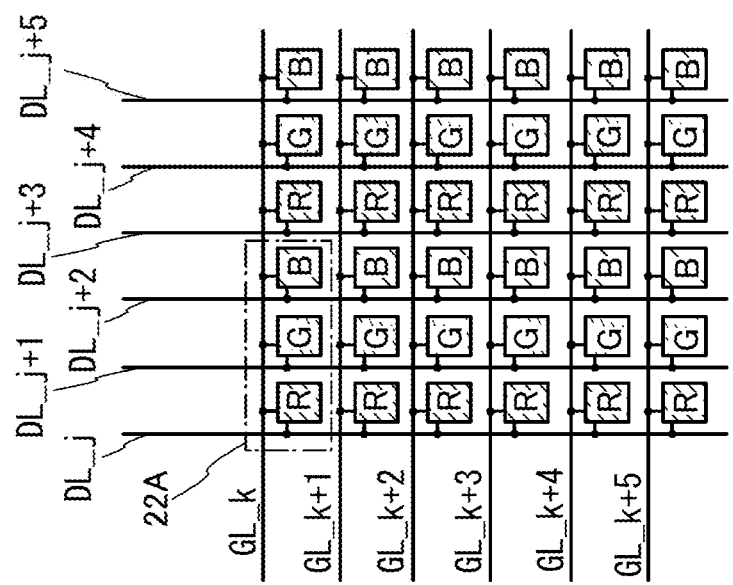
FIGS. 18A and 18B illustrate the structure and the operation of a display device.

FIG. 18A illustrates pixels in six rows and six columns in the case where stripe arrangement of pixels of picture elements including color components for color display is performed. Gate lines GL_k to GL_k+5 and signal lines DL_j to DL_j+5 are illustrated in FIG. 18A.

Figure 18B:
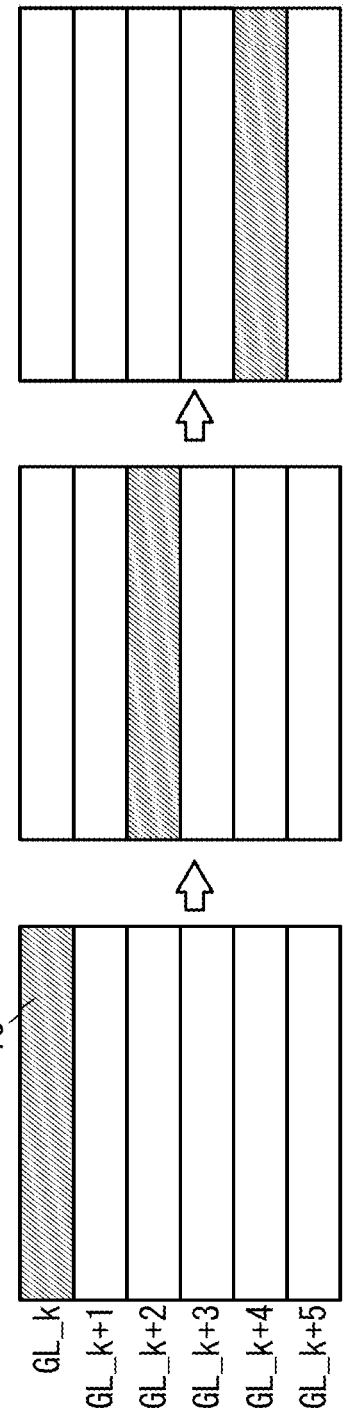

In the case where pixels of RGB (red, green, and blue) which form one picture element 22A are arranged in the same row as illustrated in FIG. 18A, the writing region 15 in which data signals are written may be provided in every other row as illustrated in FIG. 18B.

Figure 19A:
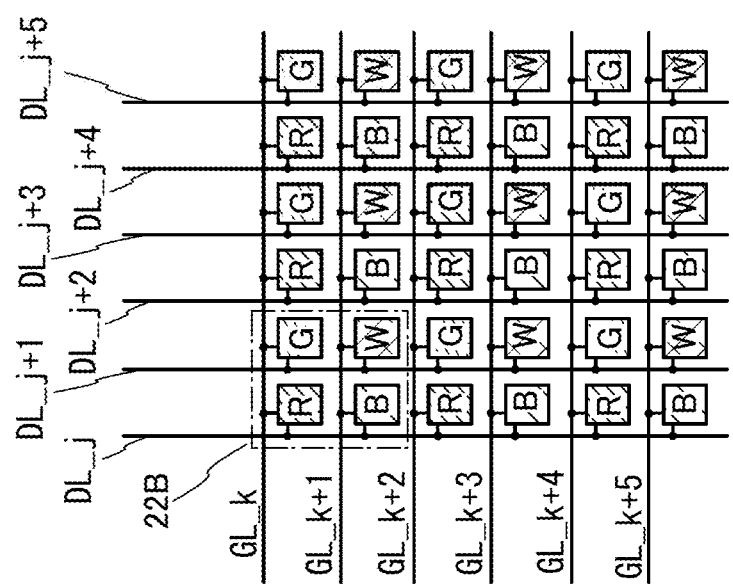
FIGS. 19A and 19B illustrate the structure and the operation of a display device.

FIG. 19A illustrates pixels in six rows and six columns in the case where Bayer arrangement of pixels of picture elements including color components for color display is used. The gate lines GL_k to GL_k+5 and the signal lines DL_j to DL_j+5 are illustrated in FIG. 19A.

Figure 19B:
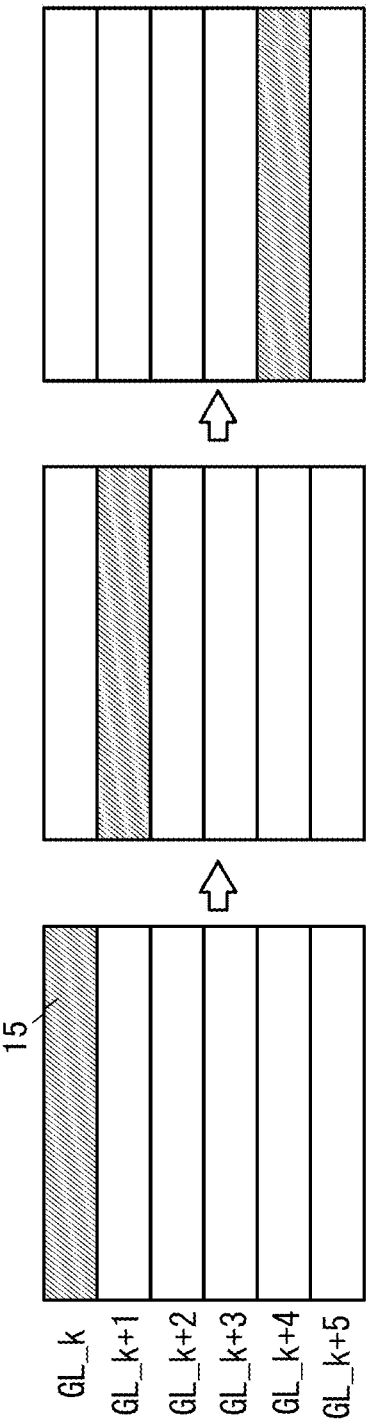

In the case where pixels of RGBW (red, green, blue, and white) which form one picture element 22B are arranged in different rows as illustrated in FIG. 19A, the writing region 15 in which data signals are written may be provided in every three rows as illustrated in FIG. 19B.

As described above, in the structure in FIGS. 18A and 18B and FIGS. 19A and 19B, data signals can be written in the pixels of the same picture element in the same frame period. Therefore, the display quality of the color display can be improved.

1-3. Structure Example 1 of Transistor

A structure example of a transistor that can be used for the transistors M1, M2, M1_A, and M1_B will be described. As the structure of the transistor, a top-gate structure, a bottom-gate structure, or the like can be employed. As a transistor including an oxide semiconductor in a channel formation region, a transistor having a back gate is particularly effective. Thus, a structure example of a transistor that can be used for the transistor M1_A having the back gate will be described with reference to FIGS. 20A to 20C.

Figure 20A:
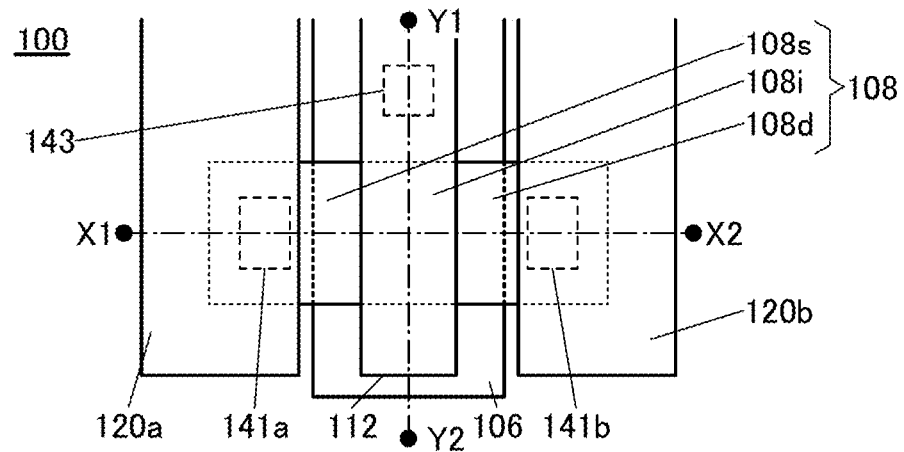
FIG. 20A is a top view of a transistor and FIGS. 20B and 20C are cross-sectional views thereof.
Figure 20B:
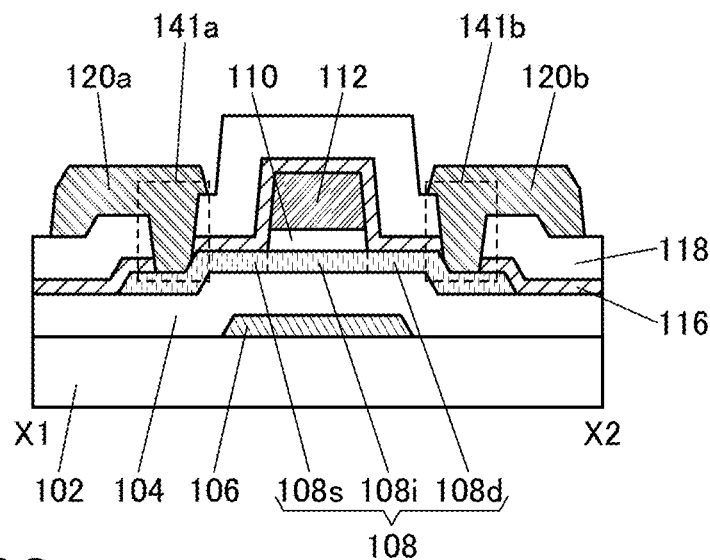
Figure 20C:
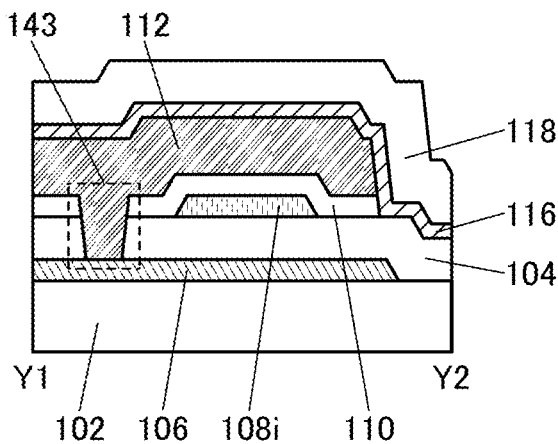

FIGS. 20A to 20C illustrate an example of the transistor. Note that the transistor in FIGS. 20A to 20C includes an oxide semiconductor film in a semiconductor layer. The transistor M1_A includes the first gate electrode and the second gate electrode and has a structure in which the oxide semiconductor film functioning as a semiconductor layer is electrically surrounded by electric fields of the first gate electrode and the second gate electrode.

FIG. 20A is a top view of a transistor 100. FIG. 20B is a cross-sectional view taken along the dashed-dotted line X1-X2 in FIG. 20A. FIG. 20C is a cross-sectional view taken along the dashed-dotted line Y1-Y2 in FIG. 20A. For clarity, some components such as an insulating film 110 are not illustrated in FIG. 20A. As in FIG. 20A, some components are not illustrated in some cases in top views of transistors described below. In addition, the direction of the dashed-dotted line X1-X2 may be referred to as the channel length (L) direction, and the direction of the dashed-dotted line Y1-Y2 may be referred to as the channel width (W) direction.

The transistor 100 in FIGS. 20A to 20C includes a conductive film 106 formed over a substrate 102, an insulating film 104 over the conductive film 106, an oxide semiconductor film 108 over the insulating film 104, the insulating film 110 over the oxide semiconductor film 108, an oxide semiconductor film 112 over the insulating film 110, an insulating film 116 over the insulating film 104, the oxide semiconductor film 108, and the oxide semiconductor film 112, and an opening 143. Furthermore, the oxide semiconductor film 108 has a channel region 108i overlapping with the oxide semiconductor film 112 and in contact with the insulating film 110, a source region 108s in contact with the insulating film 116, and a drain region 108d in contact with the insulating film 116.

Note that the opening 143 is provided in the insulating film 104 and the insulating film 110. The conductive film 106 is electrically connected to the oxide semiconductor film 112 through the opening 143. Therefore, the same potential is applied to the conductive film 106 and the oxide semiconductor film 112.

The transistor 100 may further include an insulating film 118 over the insulating film 116, a conductive film 120a electrically connected to the source region 108s through an opening 141a provided in the insulating film 116 and the insulating film 118, and a conductive film 120b electrically connected to the drain region 108d through an opening 141b provided in the insulating film 116 and the insulating film 118.

The conductive film 106 functions as a first gate electrode (also referred to as a bottom gate electrode), and the oxide semiconductor film 112 functions as a second gate electrode (also referred to as a top gate electrode). The insulating film 104 functions as a first gate insulating film, and the insulating film 110 functions as a second gate insulating film.

In this manner, the transistor 100 in FIGS. 20A to 20C has a structure in which a conductive film or an oxide semiconductor film functioning as a gate electrode is provided over and under the oxide semiconductor film 108.

Furthermore, as illustrated in FIG. 20C, the oxide semiconductor film 108 faces the conductive film 106 functioning as the first gate electrode and the oxide semiconductor film 112 functioning as the second gate electrode, and is positioned between the two gate electrodes.

The length in the channel width direction of the oxide semiconductor film 112 is longer than the length in the channel width direction of the oxide semiconductor film 108. In the channel width direction, the whole oxide semiconductor film 108 is covered with the oxide semiconductor film 112 with the insulating film 110 provided therebetween. Since the oxide semiconductor film 112 is connected to the conductive film 106 through the opening 143 provided in the insulating film 104 and the insulating film 110, a side surface of the oxide semiconductor film 108 in the channel width direction faces the oxide semiconductor film 112 with the insulating film 110 provided therebetween.

In other words, in the channel width direction of the transistor 100, the conductive film 106 and the oxide semiconductor film 112 are connected to each other through the opening 143 provided in the insulating film 104 and the insulating film 110, and the conductive film 106 and the oxide semiconductor film 112 surround the oxide semiconductor film 108 with the insulating film 104 and the insulating film 110 provided therebetween.

Such a structure enables electric fields of the conductive film 106 functioning as the first gate electrode and the oxide semiconductor film 112 functioning as the second gate electrode to electrically surround the oxide semiconductor film 108 included in the transistor 100. With such a structure of the transistor 100, an electric field for inducing a channel can be effectively applied to the oxide semiconductor film 108 by the conductive film 106 or the oxide semiconductor film 112. Therefore, the current drive capability of the transistor 100 is increased, so that a high on-state current can be obtained. Since the on-state current can be increased, it is possible to reduce the size of the transistor 100. In addition, since the transistor 100 has a structure in which the oxide semiconductor film 108 is surrounded by the conductive film 106 and the oxide semiconductor film 112, the mechanical strength of the transistor 100 can be increased.

Note that in the channel width direction of the transistor 100, an opening which is different from the opening 143 may be formed on the side of the oxide semiconductor film 108 where the opening 143 is not formed.

In this specification and the like, the insulating film 104 is referred to as a first insulating film, the insulating film 116 is referred to as a second insulating film, and the insulating film 118 is referred to as a third insulating film in some cases. The insulating film 110 functions as a gate insulating film, and the oxide semiconductor film 112 functions as a gate electrode. The conductive film 120a and the conductive film 120b function as a source electrode and a drain electrode, respectively.

The insulating film 116 contains one or both of nitrogen and hydrogen. From the insulating film 116 containing one or both of nitrogen and hydrogen, one or both of nitrogen and hydrogen can be supplied to the oxide semiconductor film 108 and the oxide semiconductor film 112.

The oxide semiconductor film 112 has a function of supplying oxygen to the insulating film 110. The oxide semiconductor film 112 having a function of supplying oxygen to the insulating film 110 enables the insulating film 110 to contain excess oxygen. When the insulating film 110 includes an excess oxygen region, excess oxygen can be supplied to the oxide semiconductor film 108, specifically, the channel region 108i. Thus, a highly reliable display device can be obtained.

To supply excess oxygen to the oxide semiconductor film 108, excess oxygen may be supplied to the insulating film 104 that is formed under the oxide semiconductor film 108. However, in that case, the excess oxygen contained in the insulating film 104 is also possibly supplied to the source region 108s and the drain region 108d of the oxide semiconductor film 108. If excess oxygen is supplied to the source region 108s and the drain region 108d, the resistance of the source region 108s and the drain region 108d might be increased.

In contrast, in the structure in which the insulating film 110 formed over the oxide semiconductor film 108 contains excess oxygen, excess oxygen can be selectively supplied to the channel region 108i. Alternatively, after excess oxygen is supplied to the channel region 108i, the source region 108s, and the drain region 108d, the carrier density in the source region 108s and the drain region 108d may be selectively increased.

The carrier density in the oxide semiconductor film 112 having supplied oxygen to the insulating film 110 is increased by one or both of nitrogen and hydrogen supplied from the insulating film 116. In other words, the oxide semiconductor film 112 also functions as an oxide conductor (OC). Thus, the oxide semiconductor film 112 has a higher carrier density than the oxide semiconductor film 108.

Furthermore, the oxide semiconductor film 112 and the source region 108s and the drain region 108d of the oxide semiconductor film 108 may each contain an element that forms an oxygen vacancy. Typical examples of the element that forms an oxygen vacancy include hydrogen, boron, carbon, nitrogen, fluorine, phosphorus, sulfur, chlorine, and a rare gas element. Typical examples of the rare gas element include helium, neon, argon, krypton, and xenon.

When an impurity element is added to the oxide semiconductor film, a bond between a metal element and oxygen in the oxide semiconductor film is cut, whereby an oxygen vacancy is formed. Alternatively, when an impurity element is added to the oxide semiconductor film, oxygen bonded to a metal element in the oxide semiconductor film is bonded to the impurity element, and the oxygen is released from the metal element, whereby an oxygen vacancy is formed. As a result, the oxide semiconductor film has a higher carrier density and thus the conductivity thereof becomes higher.

The transistor 100 preferably has a region in which a side end portion of the insulating film 110 is aligned with a side end portion of the oxide semiconductor film 112. In other words, in the transistor 100, an upper end portion of the insulating film 110 is substantially aligned with a lower end portion of the oxide semiconductor film 112. The above structure can be obtained by processing the insulating film 110 with the use of the oxide semiconductor film 112 as a mask, for example.

Next, details of other components included in the transistor illustrated in FIGS. 20A to 20C will be described.

[Substrate]

As the substrate 102, any of a variety of substrates can be used without particular limitation. Examples of the substrate include a semiconductor substrate (e.g., a single crystal substrate or a silicon substrate), an SOI substrate, a glass substrate, a quartz substrate, a plastic substrate, a metal substrate, a stainless steel substrate, a substrate including stainless steel foil, a tungsten substrate, a substrate including tungsten foil, a flexible substrate, an attachment film, paper including a fibrous material, and a base material film. Examples of a glass substrate include a barium borosilicate glass substrate, an aluminoborosilicate glass substrate, and a soda lime glass substrate. Examples of the flexible substrate, the attachment film, and the base material film are plastics typified by polyethylene terephthalate (PET), polyethylene naphthalate (PEN), and polyether sulfone (PES), a synthetic resin of acrylic or the like, polypropylene, polyester, polyvinyl fluoride, polyvinyl chloride, polyamide, polyimide, aramid, epoxy, an inorganic vapor deposition film, paper, and the like. In particular, by forming the transistor with the use of a semiconductor substrate, a single crystal substrate, an SOI substrate, or the like, transistors with fewer variations in characteristics, sizes, shapes, or the like, with high current supply capability, and with small sizes can be formed. By forming a circuit using such a transistor, low power consumption or high integration of the circuit can be achieved.

A flexible substrate may be used as the substrate 102, and the transistor may be provided directly on the flexible substrate. Alternatively, a separation layer may be provided between the substrate 102 and the transistor. The separation layer can be used when part or the whole of the transistor formed over the separation layer is separated from the substrate 102 and transferred onto another substrate. In such a case, the transistor can be transferred to a substrate having low heat resistance or a flexible substrate as well. For the above separation layer, a stack including inorganic films, which are a tungsten film and a silicon oxide film, or an organic resin film of polyimide or the like formed over a substrate can be used, for example.

Examples of a substrate to which the transistor is transferred include, in addition to the above-described substrates over which the transistor can be formed, a paper substrate, a cellophane substrate, an aramid film substrate, a polyimide film substrate, a stone substrate, a wood substrate, a cloth substrate (including a natural fiber (e.g., silk, cotton, or hemp), a synthetic fiber (e.g., nylon, polyurethane, or polyester), a regenerated fiber (e.g., acetate, cupra, rayon, or regenerated polyester), or the like), a leather substrate, and a rubber substrate. By using such a substrate, a transistor with excellent characteristics or a transistor with low power consumption can be formed, a device with high durability can be formed, heat resistance can be provided, or a reduction in weight or thickness can be achieved.

[First Insulating Film]

The insulating film 104 can be formed by a sputtering method, a CVD method, an evaporation method, a pulsed laser deposition (PLD) method, a printing method, a coating method, or the like as appropriate. The insulating film 104 can be formed with a single layer or a stack using, for example, an oxide insulating film or a nitride insulating film. Note that an oxide insulating film is preferably used for at least a region of the insulating film 104 which is in contact with the oxide semiconductor film 108, in order to improve characteristics of the interface with the oxide semiconductor film 108. When the insulating film 104 is formed using an oxide insulating film that releases oxygen by heating, oxygen contained in the insulating film 104 can be moved to the oxide semiconductor film 108 by heat treatment.

The thickness of the insulating film 104 can be greater than or equal to 50 nm, greater than or equal to 100 nm and less than or equal to 3000 nm, or greater than or equal to 200 nm and less than or equal to 1000 nm. With the use of the thick insulating film 104, the amount of oxygen released from the insulating film 104 can be increased, and the interface state at the interface between the insulating film 104 and the oxide semiconductor film 108 and oxygen vacancies included in the channel region 108$i$ of the oxide semiconductor film 108 can be reduced.

The insulating film 104 can be formed with a single layer or a stack using, for example, silicon oxide, silicon oxynitride, silicon nitride oxide, silicon nitride, aluminum oxide, hafnium oxide, gallium oxide, or a Ga—Zn oxide. In this embodiment, a stacked-layer structure of a silicon nitride film and a silicon oxynitride film is used as the insulating film 104. When the insulating film 104 has a stacked-layer structure of the silicon nitride film as a lower layer and the silicon oxynitride film as an upper layer, oxygen can be efficiently introduced into the oxide semiconductor film 108.

[Oxide Semiconductor Film]

One or both of the oxide semiconductor film 108 and the oxide semiconductor film 112 are formed using a metal oxide such as an In-M-Zn oxide (M is Al, Ga, Y, or Sn). Alternatively, an In—Ga oxide or an In—Zn oxide may be used for the oxide semiconductor film 108 and the oxide semiconductor film 112. It is particularly preferable that the oxide semiconductor film 108 and the oxide semiconductor film 112 be formed using metal oxides containing the same constituent elements because manufacturing cost can be reduced.

Note that in the case where an In-M-Zn oxide is used as the oxide semiconductor film 108 and the oxide semiconductor film 112, when the summation of In and M is assumed to be 100 atomic %, the proportions of In and M are as follows: the proportions of In and M are preferably set to be greater than 25 atomic % and less than 75 atomic %, respectively, or greater than 34 atomic % and less than 66 atomic %, respectively.

It is preferable that energy gaps of the oxide semiconductor film 108 and the oxide semiconductor film 112 be each 2 eV or more, 2.5 eV or more, or 3 eV or more.

The thickness of the oxide semiconductor film 108 is greater than or equal to 3 nm and less than or equal to 200 nm, preferably greater than or equal to 3 nm and less than or equal to 100 nm and further preferably greater than or equal to 3 nm and less than or equal to 60 nm. The thickness of the oxide semiconductor film 112 is greater than or equal to 5 nm and less than or equal to 500 nm, preferably greater than or equal to 10 nm and less than or equal to 300 nm and further preferably greater than or equal to 20 nm and less than or equal to 100 nm.

In the case where the oxide semiconductor film 108 and the oxide semiconductor film 112 are each an In-M-Zn oxide, it is preferable that the atomic ratio of metal elements of a sputtering target used to form a film of the In-M-Zn oxide satisfy In≥M and Zn≥M. As the atomic ratio of metal elements of such a sputtering target, InM:Zn=1:1:1, In:M:Zn=1:1:1.2, InM:Zn=2:1:1.5, InM:Zn=2:1:2.3, In:M:Zn=2:1:3, In:M:Zn=3:1:2, In:M:Zn=4:2:4.1, In:M:Zn=5:1:7, or the like is preferable. Note that the atomic ratios of metal elements in the formed oxide semiconductor film 108 and oxide semiconductor film 112 may vary from the above atomic ratio of metal elements of the sputtering target within a range of approximately ±40%. For example, in the case where a sputtering target with an atomic ratio of In:Ga:Zn=4:2:4.1 is used, atomic ratios of In:Ga:Zn in the formed oxide semiconductor film 108 and oxide semiconductor film 112 each may be 4:2:3 and its vicinity.

When contained in the oxide semiconductor film 108 and the oxide semiconductor film 112, silicon or carbon, which are elements belonging to Group 14, may cause oxygen vacancies to be increased and the oxide semiconductor film to have n-type conductivity. To prevent this, the concentration of silicon or carbon (measured by secondary ion mass spectrometry) in the oxide semiconductor film 108, particularly in the channel region 108$i$, is preferably lower than or equal to $2\times10^{18}$ atoms/cm$^3$ or lower than or equal to $2\times10^{17}$ atoms/cm$^3$. As a result, the transistor has a positive threshold voltage (normally-off characteristics).

Furthermore, the concentration of alkali metal or alkaline earth metal in the channel region 108i, which is measured by secondary ion mass spectrometry, can be lower than or equal to $1\times10^{18}$ atoms/cm$^3$, or lower than or equal to $2\times10^{16}$ atoms/cm$^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal in the channel region 108i. As a result, the transistor has positive threshold voltage (normally-off characteristics).

Furthermore, when nitrogen is contained in the channel region 108i, electrons serving as carriers are generated, the carrier density is increased, and the region becomes an n-type in some cases. Thus, a transistor including an oxide semiconductor film which contains nitrogen is likely to have normally-on characteristics. For this reason, nitrogen in the channel region 108i is preferably reduced as much as possible. The nitrogen concentration, which is measured by secondary ion mass spectrometry, may be, for example, lower than or equal to $5\times10^{18}$ atoms/cm$^3$.

When the impurity element in the channel region 108i is reduced, the carrier density of the oxide semiconductor film can be lowered.

Examples of a factor affecting the carrier density of an oxide semiconductor film include oxygen vacancy ($V_O$) and impurities in the oxide semiconductor film.

As the amount of oxygen vacancy in the oxide semiconductor film increases, the density of defect states increases when hydrogen is bonded to the oxygen vacancy (this state is also referred to as $V_OH$). The density of defect states also increases with an increase in the amount of impurity in the oxide semiconductor film. Hence, the carrier density of an oxide semiconductor film can be controlled by controlling the density of defect states in the oxide semiconductor film.

A transistor using the oxide semiconductor film in a channel region will be described below.

The carrier density of the oxide semiconductor film is preferably reduced in order to inhibit the negative shift of the threshold voltage of the transistor or reduce the off-state current of the transistor. In order to reduce the carrier density of the oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. The carrier density of a highly purified intrinsic oxide semiconductor film is lower than $8\times10^{15}$ cm$^{-3}$, preferably lower than $1\times10^{11}$ cm$^{-3}$ and further preferably lower than $1\times10^{10}$ cm$^{-3}$, and is higher than or equal to $1\times10^{-9}$ cm$^{-3}$.

In contrast, the carrier density of the oxide semiconductor film is preferably increased in order to improve the on-state current of the transistor or improve the field-effect mobility of the transistor. In order to increase the carrier density of the oxide semiconductor film, the impurity concentration or the density of defect states in the oxide semiconductor film is slightly increased. Alternatively, the bandgap of the oxide semiconductor film is preferably narrowed. For example, an oxide semiconductor film that has a slightly high impurity concentration or a slightly high density of defect states in the range where a favorable on/off ratio is obtained in the $I_d$-$V_g$ characteristics of the transistor can be regarded as substantially intrinsic. Furthermore, an oxide semiconductor film that has a high electron affinity and thus has a narrow bandgap so as to increase the density of thermally excited electrons (carriers) can be regarded as substantially intrinsic. Note that a transistor using an oxide semiconductor film with a higher electron affinity has lower threshold voltage.

The oxide semiconductor film with an increased carrier density has somewhat n-type conductivity; thus, it can be referred to as a "slightly-n oxide semiconductor film".

The carrier density of a substantially intrinsic oxide semiconductor film is preferably higher than or equal to $1\times10^{5}$ cm$^{-3}$ and lower than $1\times10^{18}$ cm$^{-3}$, further preferably higher than or equal to $1\times10^{7}$ cm$^{-3}$ and lower than or equal to $1\times10^{17}$ cm$^{-3}$, still further preferably higher than or equal to $1\times10^{9}$ cm$^{-3}$ and lower than or equal to $5\times10^{16}$ cm$^{-3}$, yet further preferably higher than or equal to $1\times10^{10}$ cm$^{-3}$ and lower than or equal to $1\times10^{16}$ cm$^{-3}$, and yet still preferably higher than or equal to $1\times10^{11}$ cm$^{-3}$ and lower than or equal to $1\times10^{15}$ cm$^{-3}$.

Figure 21:
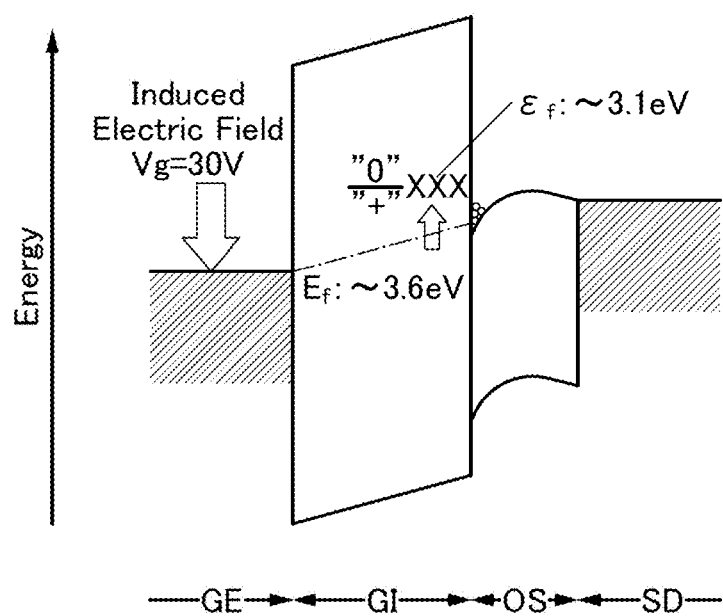
FIG. 21 is an energy band diagram of a transistor including an oxide semiconductor film in a channel region.

The use of the substantially intrinsic oxide semiconductor film may improve the reliability of a transistor. Here, the reason for the improvement in the reliability of a transistor which uses the oxide semiconductor film in its channel region is described with reference to FIG. 21. FIG. 21 is an energy band diagram of the transistor which uses the oxide semiconductor film in its channel region.

In FIG. 21, GE, GI, OS, and SD refer to a gate electrode, a gate insulating film, an oxide semiconductor film, and a source/drain electrode, respectively. In other words, FIG. 21 shows an example of energy bands of the gate electrode, the gate insulating film, the oxide semiconductor film, and the source/drain electrode in contact with the oxide semiconductor film.

In FIG. 21, a silicon oxide film and an In—Ga—Zn oxide are used as the gate insulating film and the oxide semiconductor film, respectively. The transition level (a) of a defect that might be formed in the silicon oxide film is assumed to be formed at a position approximately 3.1 eV away from the conduction band minimum of the gate insulating film. Furthermore, the Fermi level ($E_f$) of the silicon oxide film at the interface between the oxide semiconductor and the silicon oxide film when the gate voltage ($V_g$) is 30 V is assumed to be formed at a position approximately 3.6 eV away from the conduction band minimum of the gate insulating film. Note that the Fermi level of the silicon oxide film changes depending on the gate voltage. For example, the Fermi level ($E_f$) of the silicon oxide film at the interface between the oxide semiconductor film and the silicon oxide film is lowered as the gate voltage is increased. A white circle and x in FIG. 21 represent an electron (carrier) and a defect state in the silicon oxide film, respectively.

As shown in FIG. 21, when thermal excitation of carriers occurs during the application of a gate voltage, the carriers are trapped by the defect states (x in the diagram) and the charge state of each of the defect states is changed from positive ("+") to neutral ("0"). In other words, when the value obtained by adding the thermal excitation energy to the Fermi level ($E_f$) of the silicon oxide film becomes greater than the transition level ($\varepsilon_f$) of the defect, the charge state of the defect states in the silicon oxide film is changed from positive to neutral, so that the threshold voltage of the transistor shifts in the positive direction.

When an oxide semiconductor film with a different electron affinity is used, the Fermi level of the interface between the gate insulating film and the oxide semiconductor film might be changed. When an oxide semiconductor film with a higher electron affinity is used, the conduction band minimum of the gate insulating film becomes relatively high at the interface between the gate insulating film and the oxide semiconductor film or in the vicinity of the interface. In that case, the defect state (x in FIG. 21) which might be formed in the gate insulating film also becomes relatively high, so that the energy difference between the Fermi level of the gate insulating film and the Fermi level of the oxide semiconductor film is increased. The increase in energy difference leads to a reduction in the amount of charge trapped in the gate insulating film. For example, a change in the charge state of the defect states which might be formed in the silicon oxide film becomes smaller, so that a change in the threshold voltage of the transistor by gate bias temperature (GBT) stress can be reduced.

Meanwhile, the source region 108s, the drain region 108d, and the oxide semiconductor film 112 are in contact with the insulating film 116. One or both of hydrogen and nitrogen are added from the insulating film 116 to the source region 108s, the drain region 108d, and the oxide semiconductor film 112 in contact with the insulating film 116, so that the carrier densities in the source region 108s, the drain region 108d, and the oxide semiconductor film 112 are increased.

Furthermore, one or both of the oxide semiconductor film 108 and the oxide semiconductor film 112 may have a non-single-crystal structure. The non-single-crystal structure includes a c-axis aligned crystalline oxide semiconductor (CAAC-OS) which is described later, a polycrystalline structure, a microcrystalline structure described later, or an amorphous structure, for example. Among the non-single-crystal structure, the amorphous structure has the highest density of defect states, whereas CAAC-OS has the lowest density of defect states.

Note that the oxide semiconductor film 108 may be a single film or a stacked films each including two or more of the following: a region having an amorphous structure, a region having a microcrystalline structure, a region having a polycrystalline structure, a CAAC-OS region, and a region having a single-crystal structure. Note that the oxide semiconductor film 112 may be a single film or a stacked films each including two or more of the following: a region having an amorphous structure, a region having a microcrystalline structure, a region having a polycrystalline structure, a CAAC-OS region, and a region having a single-crystal structure.

Note that in the oxide semiconductor film 108, the crystallinity of the channel region 108i is different from the crystallinity of each of the source region 108s and the drain region 108d in some cases. Specifically, in the oxide semiconductor film 108, the crystallinity of each of the source region 108s and the drain region 108d is lower than the crystallinity of the channel region 108i in some cases. This is because, when the impurity element is added to the source region 108s and the drain region 108d, the source region 108s and the drain region 108d are damaged and thus have lower crystallinity.

[Insulating Film Functioning as Gate Insulating Film]

The insulating film 110 can be formed with a single layer or a stack using an oxide insulating film or a nitride insulating film. Note that an oxide insulating film is preferably used for at least a region of the insulating film 110 which is in contact with the oxide semiconductor film 108, in order to improve characteristics of the interface with the oxide semiconductor film 108. The insulating film 110 can be formed with a single layer or a stack using, for example, silicon oxide, silicon oxynitride, silicon nitride oxide, silicon nitride, aluminum oxide, hafnium oxide, gallium oxide, or a Ga—Zn oxide.

Furthermore, it is possible to prevent outward diffusion of oxygen from the oxide semiconductor film 108 and entry of hydrogen, water, and the like into the oxide semiconductor film 108 from the outside by providing an insulating film having a blocking effect against oxygen, hydrogen, water, and the like as the insulating film 110. As the insulating film which has an effect of blocking oxygen, hydrogen, water, and the like, an aluminum oxide film, an aluminum oxynitride film, a gallium oxide film, a gallium oxynitride film, an yttrium oxide film, an yttrium oxynitride film, a hafnium oxide film, a hafnium oxynitride film, or the like can be used.

The insulating film 110 may be formed using a high-k material such as hafnium silicate (HfSiO$_x$), hafnium silicate to which nitrogen is added (HfSi$_x$O$_y$N$_z$), hafnium aluminate to which nitrogen is added (HfAl$_x$O$_y$N$_z$), hafnium oxide, or yttrium oxide, so that gate leakage current of the transistor can be reduced.

When the insulating film 110 is formed using an oxide insulating film that releases oxygen by heating, oxygen contained in the insulating film 110 can be moved to the oxide semiconductor film 108 by heat treatment.

The thickness of the insulating film 110 can be greater than or equal to 5 nm and less than or equal to 400 nm, greater than or equal to 5 nm and less than or equal to 300 nm, or greater than or equal to 10 nm and less than or equal to 250 nm.

[Second Insulating Film]

The insulating film 116 contains one or both of nitrogen and hydrogen. The insulating film 116 is a nitride insulating film, for example. The nitride insulating film can be formed using silicon nitride, silicon nitride oxide, aluminum nitride, aluminum nitride oxide, or the like. The hydrogen concentration in the insulating film 116 is preferably higher than or equal to $1 \times 10^{22}$ atoms/cm$^3$. Furthermore, the insulating film 116 is in contact with the source region 108s and the drain region 108d of the oxide semiconductor film 108. The insulating film 116 is also in contact with the oxide semiconductor film 112. Therefore, the hydrogen concentrations in the source region 108s, the drain region 108d, and the oxide semiconductor film 112 in contact with the insulating film 116 are increased; thus, the carrier densities in the source region 108s, the drain region 108d, and the oxide semiconductor film 112 can be increased. Since the source region 108s, the drain region 108d, and the oxide semiconductor film 112 are in contact with the insulating film 116, they have regions with the same hydrogen concentration in some cases.

[Third Insulating Film]

The insulating film 118 can be formed with a single layer or a stack using an oxide insulating film or a nitride insulating film. The insulating film 118 can be formed with a single layer or a stack using, for example, silicon oxide, silicon oxynitride, silicon nitride oxide, silicon nitride, aluminum oxide, hafnium oxide, gallium oxide, or a Ga—Zn oxide.

The insulating film 118 is preferably a film functioning as a barrier film against hydrogen, water, and the like from the outside.

The thickness of the insulating film 118 can be greater than or equal to 30 nm and less than or equal to 500 nm, or greater than or equal to 100 nm and less than or equal to 400 nm.

[Conductive Film]

The conductive film 106 and the conductive films 120a and 120b can be formed by a sputtering method, a vacuum evaporation method, a pulsed laser deposition (PLD) method, a thermal CVD method, or the like. The conductive films 120a and 120b can be formed using, for example, a metal element selected from aluminum, chromium, copper, tantalum, titanium, molybdenum, nickel, iron, cobalt, and tungsten; an alloy containing any of these metal elements as a component; an alloy containing these metal elements in combination; or the like. Furthermore, one or more metal elements selected from manganese and zirconium may be used. The conductive film 106 and the conductive films 120a and 120b may each have a single-layer structure or a stacked-layer structure of two or more layers. For example, any of the following can be used: a single-layer structure of an aluminum film containing silicon; a single-layer structure of a copper film containing manganese; a two-layer structure in which a titanium film is stacked over an aluminum film; a two-layer structure in which a titanium film is stacked over a titanium nitride film; a two-layer structure in which a tungsten film is stacked over a titanium nitride film; a two-layer structure in which a tungsten film is stacked over a tantalum nitride film or a tungsten nitride film; a two-layer structure in which a copper film is stacked over a copper film containing manganese; a two-layer structure in which a copper film is stacked over a titanium film; a three-layer structure in which a titanium film, an aluminum film, and a titanium film are stacked in this order; and a three-layer structure in which a copper film containing manganese, a copper film, and a copper film containing manganese are stacked in this order. Alternatively, an alloy film or a nitride film in which aluminum and one or more elements selected from titanium, tantalum, tungsten, molybdenum, chromium, neodymium, and scandium are combined may be used.

The conductive film 106 and the conductive films 120a and 120b can also be formed using a light-transmitting conductive material such as indium tin oxide (ITO), indium oxide containing tungsten oxide, indium zinc oxide containing tungsten oxide, indium oxide containing titanium oxide, indium tin oxide containing titanium oxide, indium zinc oxide, or indium tin oxide containing silicon (also referred to as In—Sn—Si oxide or ITSO). It is also possible to have a stacked-layer structure of the above light-transmitting conductive material and the above metal element.

The thicknesses of the conductive film 106 and the conductive films 120a and 120b each can be greater than or equal to 30 nm and less than or equal to 500 nm, or greater than or equal to 100 nm and less than or equal to 400 nm.

1-4. Structure Example 2 of Transistor

A structure of a transistor, which is different from that of the transistor illustrated in FIGS. 20A to 20C, will be described with reference to FIGS. 22A to 22C.

Figure 22A:
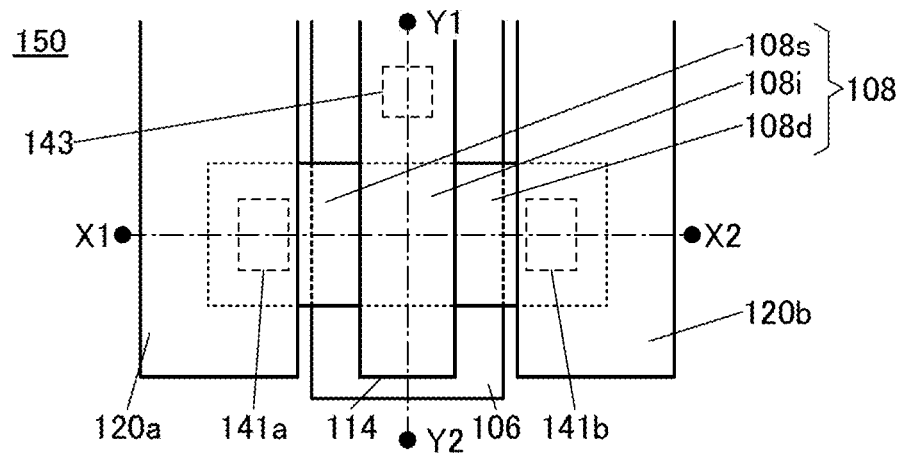
FIG. 22A is a top view of a transistor and FIGS. 22B and 22C are cross-sectional views thereof.

FIG. 22A is a top view of a transistor 150. FIG. 22B is a cross-sectional view taken along the dashed-dotted line X1-X2 in FIG. 22A. FIG. 22C is a cross-sectional view taken along the dashed-dotted line Y1-Y2 in FIG. 22A.

Figure 22B:
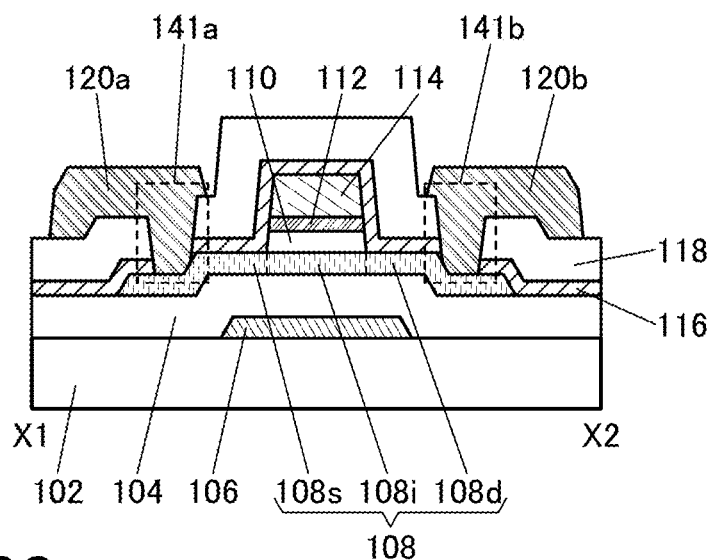
Figure 22C:
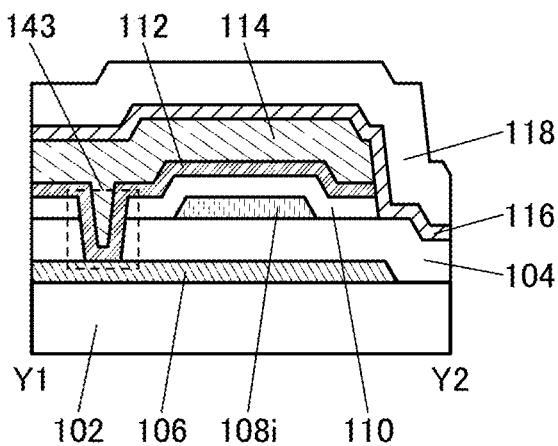

The transistor 150 in FIGS. 22A to 22C includes the conductive film 106 formed over the substrate 102, the insulating film 104 over the conductive film 106, the oxide semiconductor film 108 over the insulating film 104, the insulating film 110 over the oxide semiconductor film 108, the oxide semiconductor film 112 over the insulating film 110, a conductive film 114 over the oxide semiconductor film 112, the insulating film 116 over the insulating film 104, the oxide semiconductor film 108, and the conductive film 114, and the opening 143. Furthermore, the oxide semiconductor film 108 has the channel region 108i overlapping with the oxide semiconductor film 112 and in contact with the insulating film 110, the source region 108s in contact with the insulating film 116, and the drain region 108d in contact with the insulating film 116.

Note that the opening 143 is provided in the insulating film 104 and the insulating film 110. The conductive film 106 is electrically connected to the oxide semiconductor film 112 through the opening 143. Therefore, the same potential is applied to the conductive film 106 and the oxide semiconductor film 112.

The transistor 150 may include the insulating film 118 over the insulating film 116, the conductive film 120a electrically connected to the source region 108s through the opening 141a provided in the insulating film 116 and the insulating film 118, and the conductive film 120b electrically connected to the drain region 108d through the opening 141b provided in the insulating film 116 and the insulating film 118.

The conductive film 106 functions as a first gate electrode (also referred to as a bottom gate electrode), and the oxide semiconductor film 112 and the conductive film 114 function as a second gate electrode (also referred to as a top gate electrode). In addition, the conductive film 114 has a function of changing the oxide semiconductor film 112 into an n-type semiconductor film, whereby the oxide semiconductor film 112 functions as part of the gate electrode. The insulating film 104 functions as a first gate insulating film, and the insulating film 110 functions as a second gate insulating film.

In this manner, the transistor 150 in FIGS. 22A to 22C has a structure in which a conductive film or an oxide semiconductor film functioning as a gate electrode is provided over and under the oxide semiconductor film 108.

Such a structure enables electric fields of the conductive film 106 functioning as the first gate electrode, the oxide semiconductor film 112 functioning as the second gate electrode, and the conductive film 114 to electrically surround the oxide semiconductor film 108 included in the transistor 150. With such a structure of the transistor 150, an electric field for inducing a channel can be effectively applied to the oxide semiconductor film 108 by the conductive film 106, or the oxide semiconductor film 112 and the conductive film 114. Therefore, the current drive capability of the transistor 150 is increased, so that a high on-state current can be obtained. Since the on-state current can be increased, it is possible to reduce the size of the transistor 150. In addition, since the transistor 150 has a structure in which the oxide semiconductor film 108 is surrounded by the conductive film 106, the oxide semiconductor film 112, and the conductive film 114, the mechanical strength of the transistor 150 can be increased.

The insulating film 116 contains one or both of nitrogen and hydrogen. From the insulating film 116 containing one or both of nitrogen and hydrogen, one or both of nitrogen and hydrogen can be supplied to the source region 108s and the drain region 108d.

The oxide semiconductor film 112 has a function of supplying oxygen to the insulating film 110. The oxide semiconductor film 112 having a function of supplying oxygen to the insulating film 110 enables the insulating film 110 to contain excess oxygen. When the insulating film 110 includes an excess oxygen region, excess oxygen can be supplied to the channel region 108i. Thus, a highly reliable display device can be obtained.

The carrier density of the oxide semiconductor film 112 having supplied oxygen to the insulating film 110 is increased by the contact of the oxide semiconductor film 112 with the conductive film 114. In other words, the oxide semiconductor film 112 also functions as an oxide conductor (OC). Thus, there is no need to increase the number of manufacturing steps and the oxide semiconductor film 112 can function as part of the gate electrode.

The conductive film 114 is formed using a method and a material similar to those of the conductive film 106 and the conductive films 120a and 120b described above. It is particularly preferable to form the conductive film 114 by a sputtering method using titanium, copper, or tungsten. With the use of titanium, copper, or tungsten for the conductive film 114, the conductivity of the oxide semiconductor film 112 in contact with the conductive film 114 can be improved. Note that the conductive film 114 may have a stacked-layer structure. For example, a stacked-layer structure in which a copper film is provided over a copper film containing manganese or a stacked-layer structure in which an aluminum film is provided over a tungsten film may be employed.

1-5. Structure Example 3 of Transistor

A structure of a transistor, which is different from that of the transistor illustrated in FIGS. 20A to 20C, will be described with reference to FIGS. 23A to 23C.

Figure 23A:
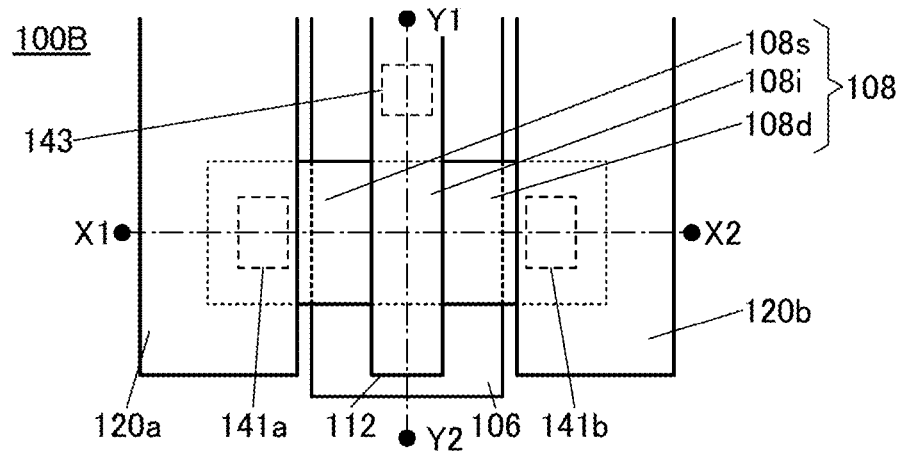
FIG. 23A is a top view of a transistor and FIGS. 23B and 23C are cross-sectional views thereof.

FIG. 23A is a top view of a transistor 100B. FIG. 23B is a cross-sectional view taken along the dashed-dotted line X1-X2 in FIG. 23A. FIG. 23C is a cross-sectional view taken along the dashed-dotted line Y1-Y2 in FIG. 23A.

Figure 23B:
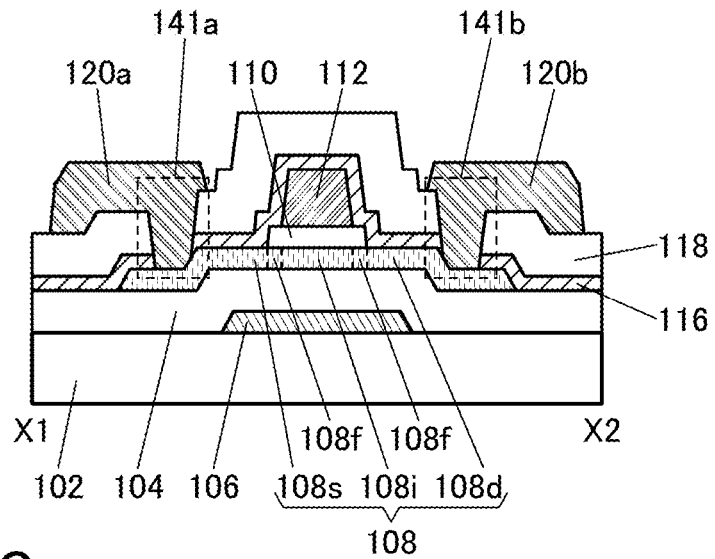
Figure 23C:
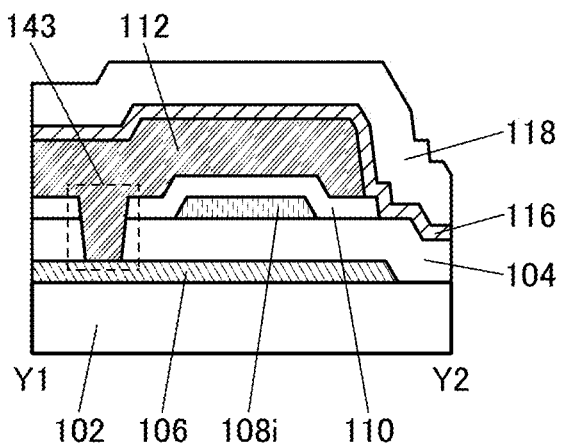

The transistor 100B in FIGS. 23A to 23C is different from the transistor 100 described above in the shape of the oxide semiconductor film 112. Specifically, lower end portions of the oxide semiconductor film 112 of the transistor 100B are positioned further inward than upper end portions of the insulating film 110. In other words, side end portions of the insulating film 110 are positioned further outward than side end portions of the oxide semiconductor film 112.

For example, the above structure can be obtained in the following manner: after being processed using the same mask, the oxide semiconductor film 112 and the insulating film 110 are processed by a wet etching method and a dry etching method, respectively.

When the oxide semiconductor film 112 has the above structure, regions 108f are formed in the oxide semiconductor film 108 in some cases. The regions 108f are formed between the channel region 108i and the source region 108s and between the channel region 108i and the drain region 108d.

The regions 108f function as high-resistance regions or low-resistance regions. The high-resistance regions have the same level of resistance as the channel region 108i and do not overlap with the oxide semiconductor film 112 functioning as the gate electrode. In the case where the regions 108f are high-resistance regions, the regions 108f function as offset regions. To suppress a decrease in the on-state current of the transistor 100B, the regions 108f functioning as offset regions may each have a length of 1 μm or less in the channel length (L) direction.

The low-resistance regions have resistance that is lower than that of the channel region 108i and higher than that of the source region 108s and that of the drain region 108d. In the case where the regions 108f are low-resistance regions, the regions 108f function as lightly doped drain (LDD) regions. The regions 108f functioning as LDD regions can relieve an electric field in a drain region, thereby reducing a change in the threshold voltage of the transistor due to the electric field in the drain region.

The regions 108f serving as low-resistance regions are formed by the following method. For example, one or both of hydrogen and nitrogen are supplied from the insulating film 116 to the regions 108f. Alternatively, an impurity element is added from above the oxide semiconductor film 112 with the use of the insulating film 110 and the oxide semiconductor film 112 as masks, so that the impurity is added to the oxide semiconductor film 108 through the insulating film 110.

Figure 24A:
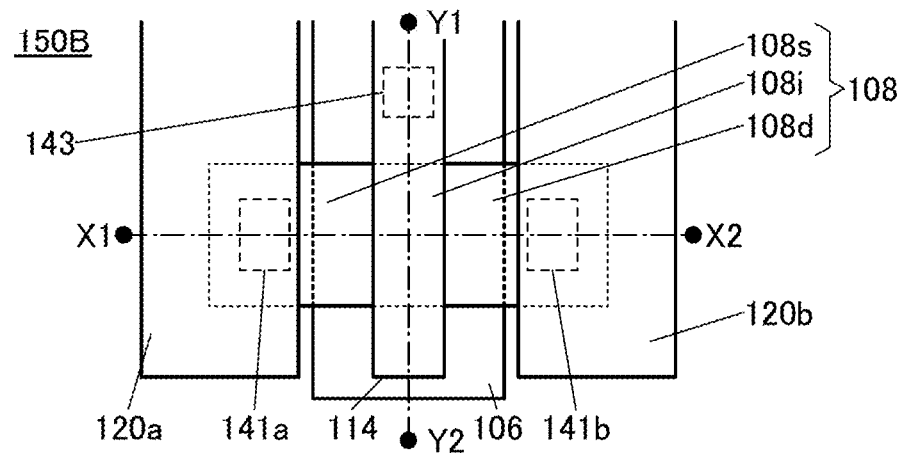
FIG. 24A is a top view of a transistor and FIGS. 24B and 24C are cross-sectional views thereof.
Figure 24B:
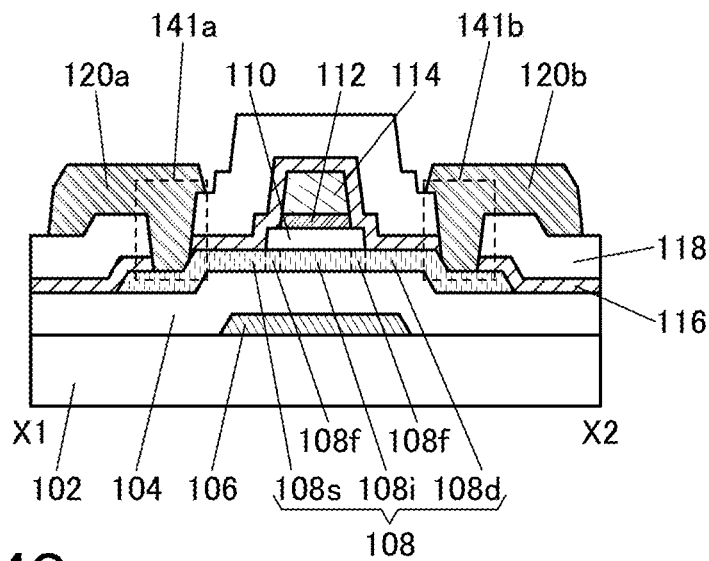
Figure 24C:
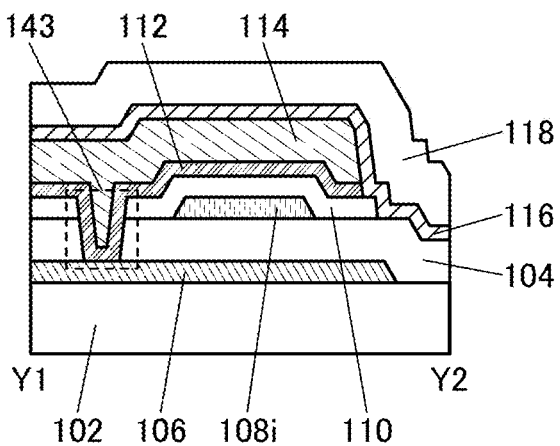

By changing the shape of the oxide semiconductor film 112 functioning as the second gate electrode, a transistor 150B described above can have a structure similar to that of the transistor 100B. FIGS. 24A to 24C illustrate an example in this case. FIG. 24A is a top view of the transistor 150B. FIG. 24B is a cross-sectional view taken along the dashed-dotted line X1-X2 in FIG. 24A. FIG. 24C is a cross-sectional view taken along the dashed-dotted line Y1-Y2 in FIG. 24A.

1-6. Modification Example 1 of Transistor

Next, a modification example of the transistor in FIGS. 22A to 22C will be described with reference to FIGS. 25A and 25B.

Figure 25A:
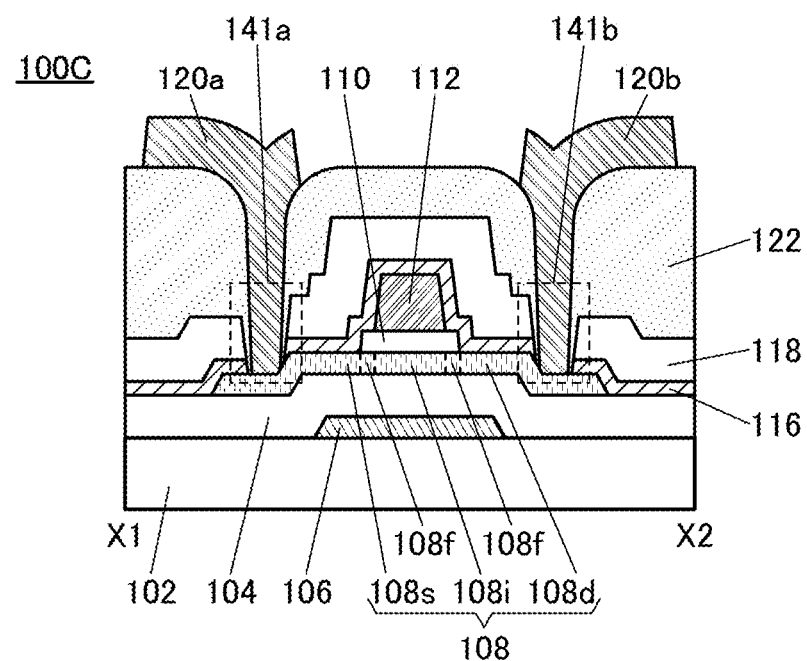
FIGS. 25A and 25B are cross-sectional views of a transistor.
Figure 25B:
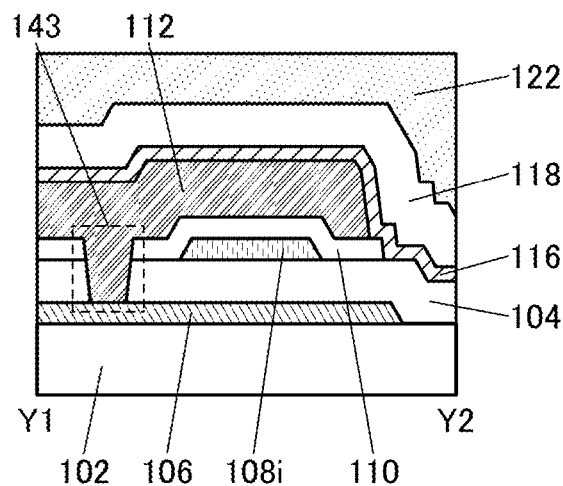

FIGS. 25A and 25B are cross-sectional views of a transistor 100C. A top view of the transistor 100C is similar to that of the transistor 100B in FIG. 23A and will be described with reference to FIG. 23A. FIG. 25A is a cross-sectional view taken along the dashed-dotted line X1-X2 in FIG. 23A, and FIG. 25B is a cross-sectional view taken along the dashed-dotted line Y1-Y2 in FIG. 23A.

The transistor 100C is different from the transistor 100B described above in that an insulating film 122 functioning as a planarization insulating film is provided. Note that the other components of the transistor 100C are similar to those of the transistor 100B described above, and an effect similar to that of the transistor 100B can be obtained.

The insulating film 122 has a function of covering unevenness and the like caused by the transistor or the like. The insulating film 122 has an insulating property and is formed using an inorganic or organic material. Examples of the inorganic material include a silicon oxide film, a silicon oxynitride film, a silicon nitride oxide film, a silicon nitride film, an aluminum oxide film, and an aluminum nitride film. Examples of the organic material include photosensitive resin materials such as an acrylic resin and a polyimide resin.

Note that the shape of each opening in the insulating film 122 is not limited to that in FIGS. 25A and 25B, in which the openings are smaller than the openings 141a and 141b, and may be larger than or equal to the size of each of the openings 141a and 141b, for example.

In addition, the structure is not limited to the example in FIGS. 25A and 25B, in which the conductive films 120a and 120b are provided over the insulating film 122. For example, the insulating film 122 may be provided over the conductive films 120a and 120b formed over the insulating film 118.

1-7. Modification Example 2 of Transistor

Next, modification examples of the transistor in FIGS. 20A to 20C will be described with reference to FIGS. 26A and 26B, FIGS. 27A and 27B, and FIGS. 28A and 28B.

Figure 26A:
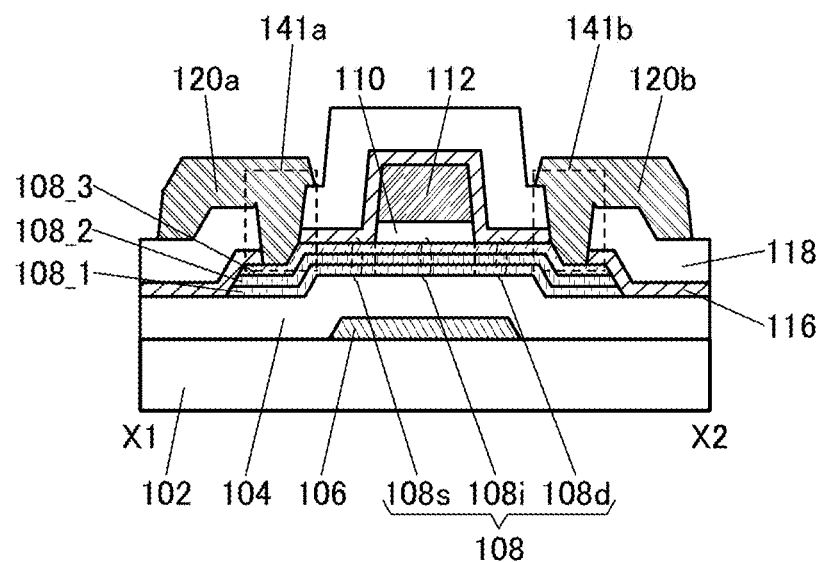
FIGS. 26A and 26B are cross-sectional views of a transistor.
Figure 26B:
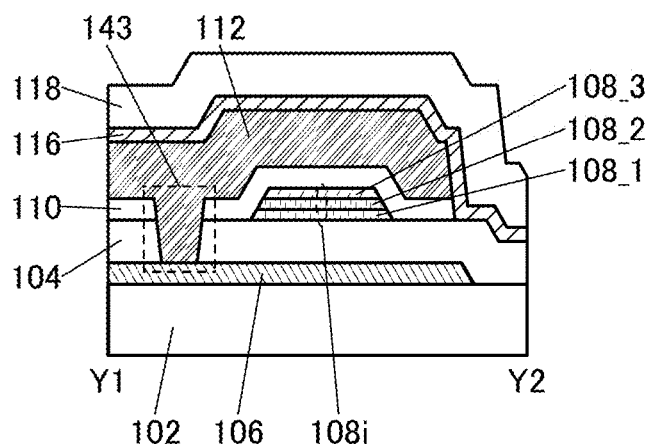

FIGS. 26A and 26B are cross-sectional views of a transistor 100F. A top view of the transistor 100F is similar to that of the transistor 100 in FIG. 20A and will be described with reference to FIG. 20A. FIG. 26A is a cross-sectional view taken along the dashed-dotted line X1-X2 in FIG. 20A, and FIG. 26B is a cross-sectional view taken along the dashed-dotted line Y1-Y2 in FIG. 20A.

The transistor 100F is different from the transistor 100 described above in the shape of the oxide semiconductor film 108. Note that the other components of the transistor 100F are similar to those of the transistor 100 described above, and an effect similar to that of the transistor 100 can be obtained.

The oxide semiconductor film 108 of the transistor 100F includes an oxide semiconductor film 108_1 over the insulating film 116, an oxide semiconductor film 1082 over the oxide semiconductor film 108_1, and an oxide semiconductor film 1083 over the oxide semiconductor film 1082.

The channel region 108i, the source region 108s, and the drain region 108d each have a three-layer structure of the oxide semiconductor films 108_1, 108_2, and 108_3.

Figure 27A:
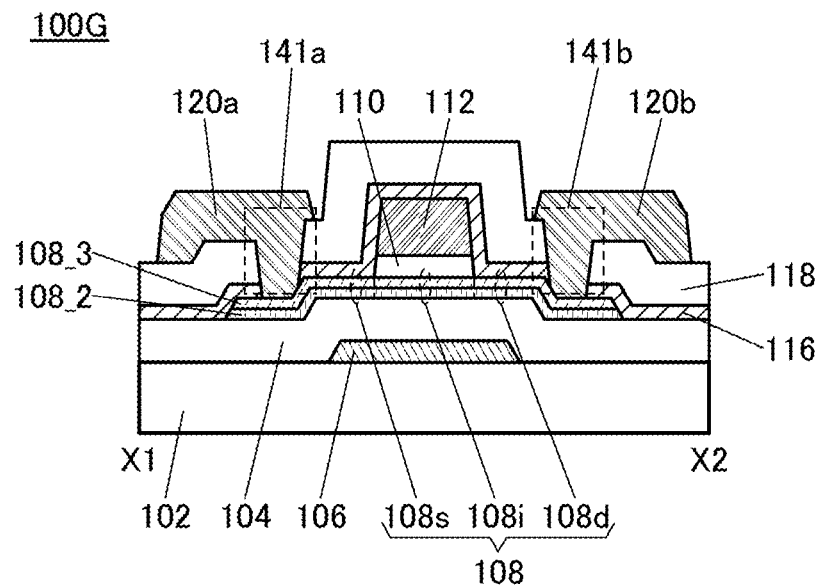
FIGS. 27A and 27B are cross-sectional views of a transistor.
Figure 27B:
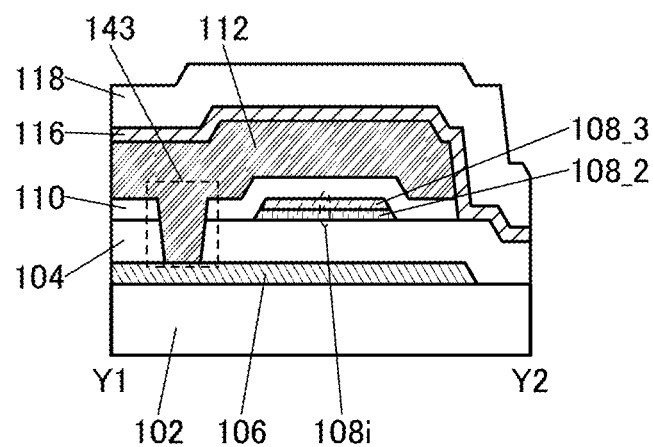

FIGS. 27A and 27B are cross-sectional views of a transistor 100G. A top view of the transistor 100G is similar to that of the transistor 100 in FIG. 20A and will be described with reference to FIG. 20A. FIG. 27A is a cross-sectional view taken along the dashed-dotted line X1-X2 in FIG. 20A, and FIG. 27B is a cross-sectional view taken along the dashed-dotted line Y1-Y2 in FIG. 20A.

The transistor 100G is different from the transistor 100 described above in the shape of the oxide semiconductor film 108. Note that the other components of the transistor 100G are similar to those of the transistor 100 described above, and an effect similar to that of the transistor 100 can be obtained.

The oxide semiconductor film 108 of the transistor 100G includes the oxide semiconductor film 108_2 over the insulating film 116 and the oxide semiconductor film 108_3 over the oxide semiconductor film 108_2.

The channel region 108i, the source region 108s, and the drain region 108d each have a two-layer structure of the oxide semiconductor films 108_2 and 108_3.

The transistor 100G has a two-layer structure of the oxide semiconductor films 108_2 and 108_3 in the channel region 108i.

Here, a band structure of the insulating film 104, the oxide semiconductor films 108_1, 108_2, and 108_3, and the insulating film 110, and a band structure of the insulating film 104, the oxide semiconductor films 108_2 and 108_3, and the insulating film 110 are described with reference to FIGS. 28A and 28B.

Figure 28A:
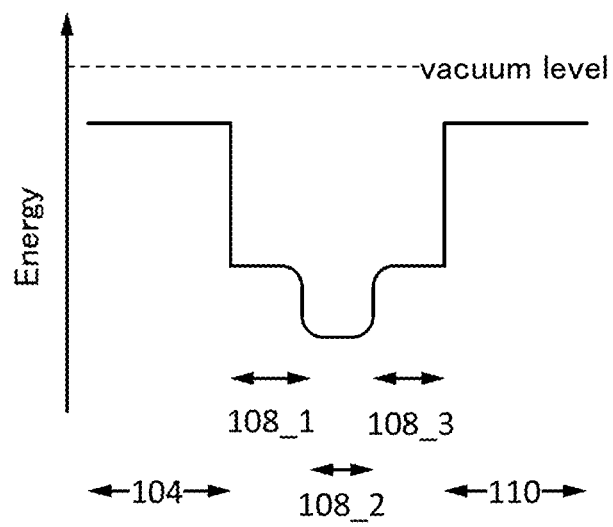
FIGS. 28A and 28B each show an energy band structure.

FIG. 28A shows an example of a band structure in the thickness direction of a stack including the insulating film 104, the oxide semiconductor films 108_1, 108_2, and 108_3, and the insulating film 110. FIG. 28B shows an example of a band structure in the thickness direction of a stack including the insulating film 104, the oxide semiconductor films 108_2 and 108_3, and the insulating film 110. For easy understanding, the band structure shows energy level of the conduction band minimum (Ec) of each of the insulating film 104, the oxide semiconductor films 108_1, 108_2, and 108_3, and the insulating film 110.

In the band structure of FIG. 28A, a silicon oxide film is used as each of the insulating film 104 and the insulating film 110, an oxide semiconductor film formed using a metal oxide target having an atomic ratio of metal elements of In:Ga:Zn=1:3:2 is used as the oxide semiconductor film 108_1, an oxide semiconductor film formed using a metal oxide target having an atomic ratio of metal elements of In:Ga:Zn=4:2:4.1 is used as the oxide semiconductor film 108_2, and an oxide semiconductor film formed using a metal oxide target having an atomic ratio of metal elements of In:Ga:Zn=1:3:2 is used as the oxide semiconductor film 108_3.

Figure 28B:
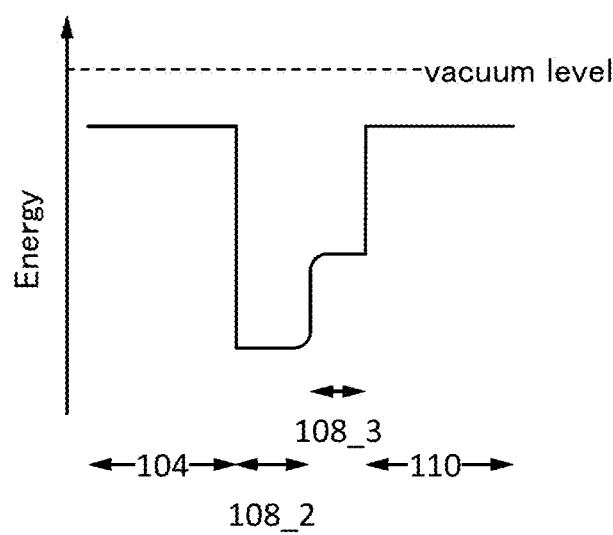

In the band structure of FIG. 28B, a silicon oxide film is used as each of the insulating film 104 and the insulating film 110, the oxide semiconductor film formed using a metal oxide target having an atomic ratio of metal elements of In:Ga:Zn=4:2:4.1 is used as the oxide semiconductor film 108_2, and the oxide semiconductor film formed using a metal oxide target having an atomic ratio of metal elements of In:Ga:Zn=1:3:2 is used as the oxide semiconductor film 108_3.

As illustrated in FIG. 28A, the energy level of the conduction band minimum gradually varies between the oxide semiconductor films 108_1, 108_2, and 108_3. As illustrated in FIG. 28B, the energy level of the conduction band minimum gradually varies between the oxide semiconductor films 108_2 and 108_3. In other words, the energy level of the conduction band minimum is continuously varied or continuously connected. To obtain such a band structure, there exists no impurity, which forms a defect state such as a trap center or a recombination center, at the interface between the oxide semiconductor films 108_1 and 108_2 and the interface between the oxide semiconductor films 108_2 and 108_3.

To form a continuous junction between the oxide semiconductor films 108_1, 108_2, and 108_3, it is necessary to form the films successively without exposure to the air by using a multi-chamber deposition apparatus (sputtering apparatus) provided with a load lock chamber.

In each band structure of FIGS. 28A and 28B, the oxide semiconductor film 108_2 serves as a well, and a channel region of the transistor with the stacked-layer structure is formed in the oxide semiconductor film 108_2.

By providing the oxide semiconductor films 108_1 and 108_3, the oxide semiconductor film 108_2 can be distanced away from trap states.

In addition, the trap states might be more distant from the vacuum level than the energy level of the conduction band minimum (Ec) of the oxide semiconductor film 108_2 functioning as a channel region, so that electrons are likely to be accumulated in the trap states. When the electrons are accumulated in the trap states, the electrons become negative fixed electric charge, so that the threshold voltage of the transistor is shifted in the positive direction. Therefore, it is preferable that the energy level of the trap states be closer to the vacuum level than the energy level of the conduction band minimum (Ec) of the oxide semiconductor film 108_2. Such a structure inhibits accumulation of electrons in the trap states. As a result, the on-state current and the field-effect mobility of the transistor can be increased.

The energy level of the conduction band minimum of each of the oxide semiconductor films 108_1 and 108_3 is closer to the vacuum level than that of the oxide semiconductor film 108_2. Typically, a difference in energy level between the conduction band minimum of the oxide semiconductor film 108_2 and the conduction band minimum of each of the oxide semiconductor films 108_1 and 108_3 is 0.15 eV or more or 0.5 eV or more and 2 eV or less or 1 eV or less. That is, the difference between the electron affinity of each of the oxide semiconductor films 108_1 and 108_3 and the electron affinity of the oxide semiconductor film 108_2 is 0.15 eV or more or 0.5 eV or more and 2 eV or less or 1 eV or less.

In such a structure, the oxide semiconductor film 108_2 serves as a main current path. In other words, the oxide semiconductor film 108_2 functions as a channel region, and the oxide semiconductor films 108_1 and 108_3 function as oxide insulating films. The oxide semiconductor films 108_1 and 108_3 are each preferably formed using an oxide semiconductor film containing one or more metal elements constituting the oxide semiconductor film 108_2 in which a channel region is formed. In such a structure, interface scattering hardly occurs at the interface between the oxide semiconductor films 108_1 and 108_2 and the interface between the oxide semiconductor films 108_2 and 108_3. Thus, the transistor can have high field-effect mobility because the movement of carriers is not hindered at the interface.

To prevent each of the oxide semiconductor films 108_1 and 108_3 from functioning as part of a channel region, a material having sufficiently low conductivity is used for the oxide semiconductor films 108_1 and 108_3. Thus, the oxide semiconductor films 108_1 and 108_3 can also be referred to as oxide insulating films owing to its physical property and/or function. Alternatively, a material which has a smaller electron affinity (a difference in energy level between the vacuum level and the conduction band minimum) than the oxide semiconductor film 108_2 and has a difference in energy level in the conduction band minimum from the oxide semiconductor film 108_2 (band offset) is used for the oxide semiconductor films 108_1 and 108_3. Furthermore, to inhibit generation of a difference between threshold voltages due to the value of the drain voltage, it is preferable to form the oxide semiconductor films 108_1 and 108_3 using a material whose energy level of the conduction band minimum is closer to the vacuum level than that of the oxide semiconductor film 108_2. For example, a difference between the energy level of the conduction band minimum of the oxide semiconductor film 108_2 and the energy level of the conduction band minimum of each of the oxide semiconductor films 108_1 and 108_3 is preferably 0.2 eV or more and further preferably 0.5 eV or more.

It is preferable that the oxide semiconductor films 108_1 and 108_3 not have a spinel crystal structure. This is because if the oxide semiconductor films 108_1 and 108_3 have a spinel crystal structure, constituent elements of the conductive films 120a and 120b might be diffused to the oxide semiconductor film 108_2 at the interface between the spinel crystal structure and another region. Note that each of the oxide semiconductor films 108_1 and 108_3 is preferably a CAAC-OS film, in which case a higher blocking property against constituent elements of the conductive films 120a and 120b, for example, copper elements can be obtained.

One embodiment of the present invention is not limited to the example described in this embodiment, in which an oxide semiconductor film formed using a metal oxide target having an atomic ratio of metal elements of In:Ga:Zn=1:3:2 is used as each of the oxide semiconductor films 108_1 and 108_3; for example, an oxide semiconductor film formed using a metal oxide target having an atomic ratio of In:Ga:Zn=1:1:1, In:Ga:Zn=1:1:1.2, In:Ga:Zn=1:3:4, or In:Ga:Zn=1:3:6 may be used as each of the oxide semiconductor films 108_1 and 108_3.

When the oxide semiconductor films 108_1 and 108_3 are formed using a metal oxide target having an atomic ratio of In:Ga:Zn=1:1:1, the oxide semiconductor films 108_1 and 108_3 have an atomic ratio of In:Ga:Zn=1:$\beta$1 (0<$\beta$1≤2):$\beta$2 (0<$\beta$2≤2) in some cases. When the oxide semiconductor films 108_1 and 108_3 are formed using a metal oxide target having an atomic ratio of In:Ga:Zn=1:3:4, the oxide semiconductor films 108_1 and 108_3 have an atomic ratio of In:Ga:Zn=1:$\beta$3 (1≤$\beta$3≤5):$\beta$4 (2≤$\beta$4≤6) in some cases. When the oxide semiconductor films 108_1 and 108_3 are formed using a metal oxide target having an atomic ratio of In:Ga:Zn=1:3:6, the oxide semiconductor films 108_1 and 108_3 have an atomic ratio of In:Ga:Zn=1:$\beta$5 (1≤$\beta$5≤5):$\beta$6 (4≤$\beta$6≤8) in some cases.

1-8. Method for Manufacturing Transistor

Next, an example of a method for manufacturing the transistor 100C illustrated in FIGS. 25A and 25B will be described with reference to FIGS. 29A to 29D, FIGS. 30A to 30D, FIGS. 31A to 31D, and FIGS. 32A and 32B. Note that FIGS. 29A to 29D, FIGS. 30A to 30D, FIGS. 31A to 31D, and FIGS. 32A and 32B are cross-sectional views in the channel length (L) direction and the channel width direction (W) illustrating a method for manufacturing the transistor 100C.

First, the conductive film 106 is formed over the substrate 102. Then, the insulating film 104 is formed over the substrate 102 and the conductive film 106, and an oxide semiconductor film is formed over the insulating film 104. After that, the oxide semiconductor film is processed into an island shape, whereby an oxide semiconductor film 107 is formed (see FIG. 29A).

The conductive film 106 can be formed by a sputtering method, a vacuum evaporation method, a pulsed laser deposition (PLD) method, a thermal CVD method, or the like. In this embodiment, a 100-nm-thick tungsten film is formed by a sputtering method as the conductive film 106.

The insulating film 104 can be formed by a sputtering method, a CVD method, an evaporation method, a pulsed laser deposition (PLD) method, a printing method, a coating method, or the like as appropriate. In this embodiment, as the insulating film 104, a 400-nm-thick silicon nitride film and a 50-nm-thick silicon oxynitride film are formed with a PECVD apparatus.

After the insulating film 104 is formed, oxygen may be added to the insulating film 104. Examples of oxygen added to the insulating film 104 include an oxygen radical, an oxygen atom, an oxygen atomic ion, and an oxygen molecular ion. As a method for adding the oxygen, an ion doping method, an ion implantation method, plasma treatment, or the like can be given. Alternatively, after a film that suppresses release of oxygen is formed over the insulating film, oxygen may be added to the insulating film 104 through the film.

The film that suppresses release of oxygen can be formed using any of the following conductive materials: a metal element selected from indium, zinc, gallium, tin, aluminum, chromium, tantalum, titanium, molybdenum, nickel, iron, cobalt, and tungsten; an alloy containing the above-described metal element as a component; an alloy containing any of the above-described metal elements in combination; a metal nitride containing the above-described metal element; a metal oxide containing the above-described metal element; a metal nitride oxide containing the above-described metal element; and the like.

In the case where oxygen is added by plasma treatment, by making oxygen excited by a microwave to generate high-density oxygen plasma, the amount of oxygen added to the insulating film 104 can be increased.

The oxide semiconductor film 107 can be formed by a sputtering method, a coating method, a pulsed laser deposition method, a laser ablation method, a thermal CVD method, or the like. Note that processing into the oxide semiconductor film 107 can be performed in the following manner: a mask is formed over the oxide semiconductor film by a lithography process, and then, the oxide semiconductor film is partly etched using the mask. Alternatively, the island-shaped oxide semiconductor film 107 may be directly formed by a printing method.

As a power supply device for generating plasma in the case of forming the oxide semiconductor film by a sputtering method, an RF power supply device, an AC power supply device, a DC power supply device, or the like can be used as appropriate. In the case where the oxide semiconductor film is formed by a sputtering method, as a sputtering gas, a rare gas (typically argon), oxygen, or a mixed gas of a rare gas and oxygen is used as appropriate. In the case of using the mixed gas of a rare gas and oxygen, the proportion of oxygen to a rare gas is preferably increased.

For example, in the case where the oxide semiconductor film is formed by a sputtering method, the substrate temperature is preferably higher than or equal to 150° C. and lower than or equal to 750° C., higher than or equal to 150° C. and lower than or equal to 450° C., or higher than or equal to 200° C. and lower than or equal to 350° C., which enables crystallinity to be improved.

Note that in this embodiment, the oxide semiconductor film 107 is formed as follows. A 40-nm-thick oxide semiconductor film is deposited with a sputtering apparatus with the use of an In—Ga—Zn metal oxide having an atomic ratio of In:Ga:Zn=1:1:1.2 as a sputtering target.

After the oxide semiconductor film 107 is formed, heat treatment may be performed so that the oxide semiconductor film 107 is subjected to dehydrogenation or dehydration. The heat treatment is performed typically at a temperature higher than or equal to 150° C. and lower than the strain point of the substrate, higher than or equal to 250° C. and lower than or equal to 450° C., or higher than or equal to 300° C. and lower than or equal to 450° C.

The heat treatment can be performed under an inert gas atmosphere containing nitrogen or a rare gas such as helium, neon, argon, xenon, or krypton. Furthermore, the heat treatment may be performed under an inert gas atmosphere first, and then under an oxygen atmosphere. It is preferable that the above inert gas atmosphere and the above oxygen atmosphere do not contain hydrogen, water, or the like. The treatment time can be from 3 minutes to 24 hours.

An electric furnace, an RTA apparatus, or the like can be used for the heat treatment. With the use of an RTA apparatus, the heat treatment can be performed at a temperature higher than or equal to the strain point of the substrate if the heating time is short. Therefore, the heat treatment time can be shortened.

By forming the oxide semiconductor film while it is heated or performing heat treatment after the formation of the oxide semiconductor film, the hydrogen concentration in the oxide semiconductor film, which is measured by secondary ion mass spectrometry, can be lower than or equal to $5 \times 10^{19}$ atoms/cm$^3$, lower than or equal to $1 \times 10^{19}$ atoms/cm$^3$, lower than or equal to $5 \times 10^{18}$ atoms/cm$^3$, lower than or equal to $1 \times 10^{18}$ atoms/cm$^3$, lower than or equal to $5 \times 10^{17}$ atoms/cm$^3$, or lower than or equal to $1 \times 10^{16}$ atoms/cm$^3$.

Figure 29A:
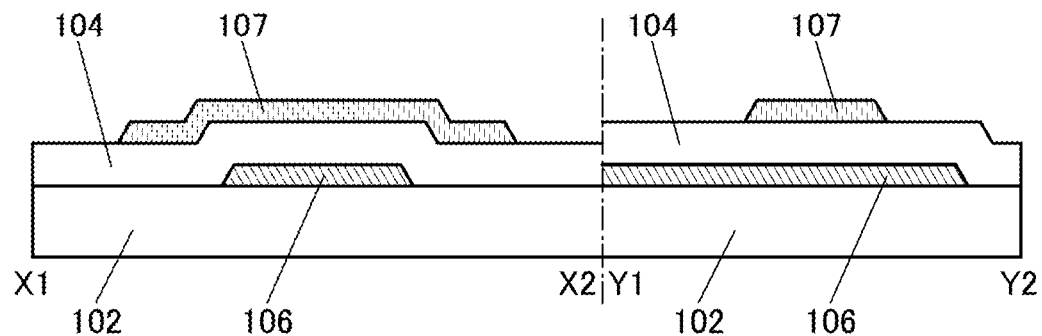
FIGS. 29A to 29D are cross-sectional views illustrating a method for manufacturing a transistor.
Figure 29B:
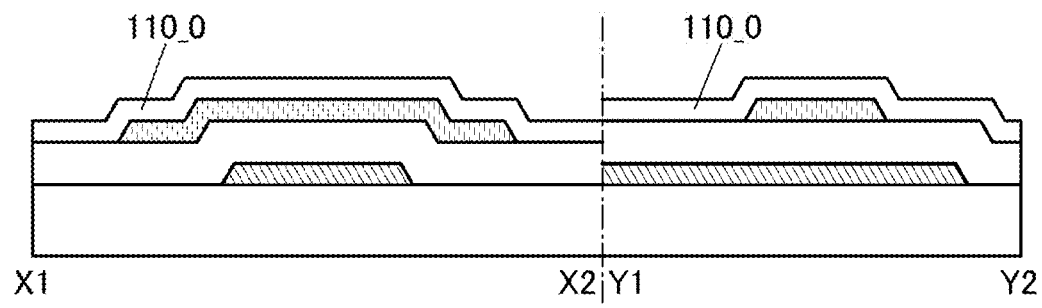

Next, an insulating film 110_0 is formed over the insulating film 104 and the oxide semiconductor film 107 (see FIG. 29B).

As the insulating film 110_0, a silicon oxide film or a silicon oxynitride film can be formed by a PECVD method. In this case, a deposition gas containing silicon and an oxidizing gas are preferably used as a source gas. Typical examples of the deposition gas containing silicon include silane, disilane, trisilane, and silane fluoride. As the oxidizing gas, oxygen, ozone, dinitrogen monoxide, and nitrogen dioxide can be given as examples.

The silicon oxynitride film having a small amount of defects can be formed as the insulating film 110_0 by a PECVD method under the conditions where the flow rate of an oxidizing gas to that of a deposition gas is higher than 20 times and lower than 100 times or higher than or equal to 40 times and lower than or equal to 80 times and the pressure in a treatment chamber is lower than 100 Pa or lower than or equal to 50 Pa.

As the insulating film 110_0, a silicon oxide film or a silicon oxynitride film which is dense can be formed under the following conditions: the substrate placed in a treatment chamber of a PECVD apparatus that is vacuum-evacuated is held at a temperature higher than or equal to 280° C. and lower than or equal to 400° C., the pressure is greater than or equal to 20 Pa and less than or equal to 250 Pa, preferably greater than or equal to 100 Pa and less than or equal to 250 Pa, with introduction of a source gas into the treatment chamber, and a high-frequency power is supplied to an electrode provided in the treatment chamber.

The insulating film 110_0 may also be formed by a PECVD method using a microwave. A microwave refers to a wave in the frequency range of 300 MHz to 300 GHz. In a microwave, electron temperature and electron energy are low. Furthermore, in the power supplied in a PECVD apparatus using a microwave, the proportion of power used for plasma generation, that is, power used for ionization of molecules is high, whereas the proportion of power used for electron acceleration is low. Thus, plasma with high density (high-density plasma) can be generated. This method causes little plasma damage to the deposition surface or a deposit, so that the insulating film 110_0 having few defects can be formed.

Alternatively, the insulating film 110_0 can be formed by a CVD method using an organosilane gas. As the organosilane gas, any of the following silicon-containing compounds can be used: tetraethyl orthosilicate (TEOS) (chemical formula: $Si(OC_2H_5)_4$); tetramethylsilane (TMS) (chemical formula: $Si(CH_3)_4$); tetramethylcyclotetrasiloxane (TMCTS); octamethylcyclotetrasiloxane (OMCTS); hexamethyldisilazane (HMDS); triethoxysilane ($SiH(OC_2H_5)_3$); trisdimethylaminosilane ($SiH(N(CH_3)_2)_3$); and the like. By a CVD method using the organosilane gas, the insulating film 110_0 having high coverage can be formed.

In this embodiment, a 100-nm-thick silicon oxynitride film is formed with a PECVD apparatus as the insulating film 110_0.

Figure 29C:
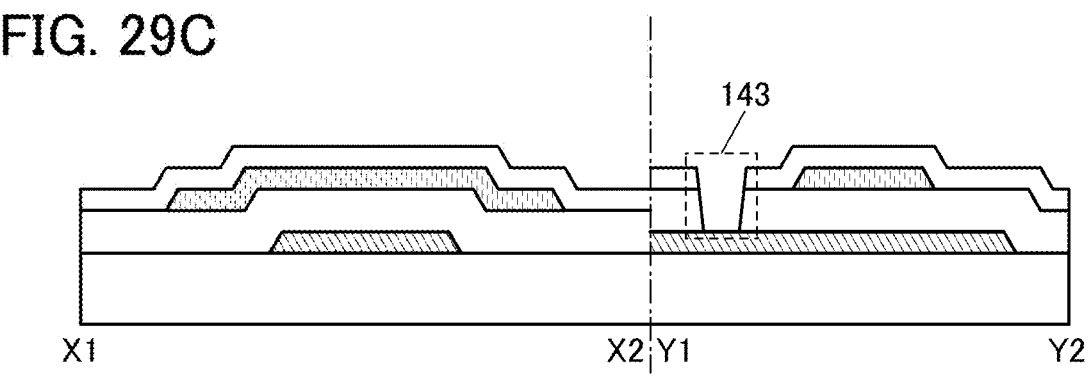

Next, a mask is formed in a desired position over the insulating film 110_0 by a lithography process, and then the insulating film 110_0 and the insulating film 104 are partly etched, whereby the opening 143 that reaches the conductive film 106 is formed (see FIG. 29C).

As a method for forming the opening 143, a wet etching method and/or a dry etching method can be used as appropriate. In this embodiment, the opening 143 is formed by a dry etching method.

Next, an oxide semiconductor film 112_0 is formed over the insulating film 110_0 to cover the opening 143. In the formation of the oxide semiconductor film 112_0, oxygen in the oxide semiconductor film 112_0 is added to the insulating film 110_0 (see FIG. 29D).

The oxide semiconductor film 112_0 is preferably formed by a sputtering method in an atmosphere containing an oxygen gas. Since the atmosphere in which the oxide semiconductor film 112_0 is formed contains an oxygen gas, oxygen can be favorably added to the insulating film 110_0.

Figure 29D:
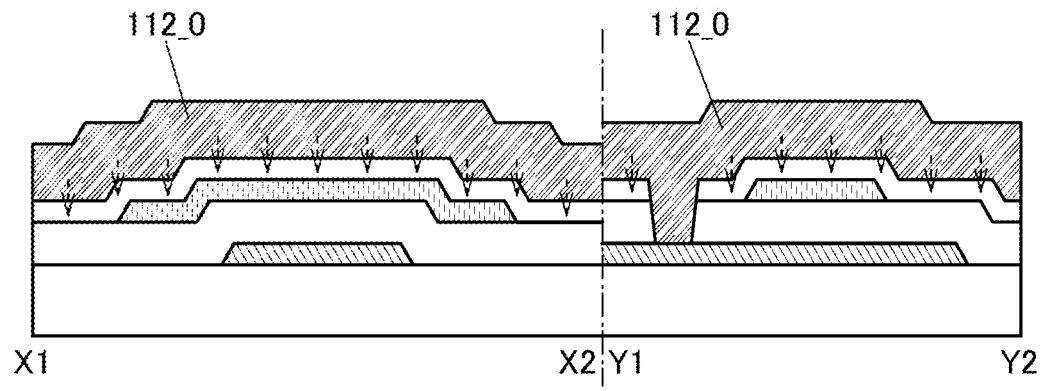

In FIG. 29D, oxygen added to the insulating film 110_0 is schematically shown by arrows. Furthermore, the oxide semiconductor film 112_0 formed to cover the opening 143 is electrically connected to the conductive film 106.

Note that in this embodiment, the oxide semiconductor film 1120 is formed as follows. A 100-nm-thick oxide semiconductor film is deposited with a sputtering apparatus with the use of an In—Ga—Zn metal oxide having an atomic ratio of In:Ga:Zn=4:2:4.1 as a sputtering target.

Figure 30A:
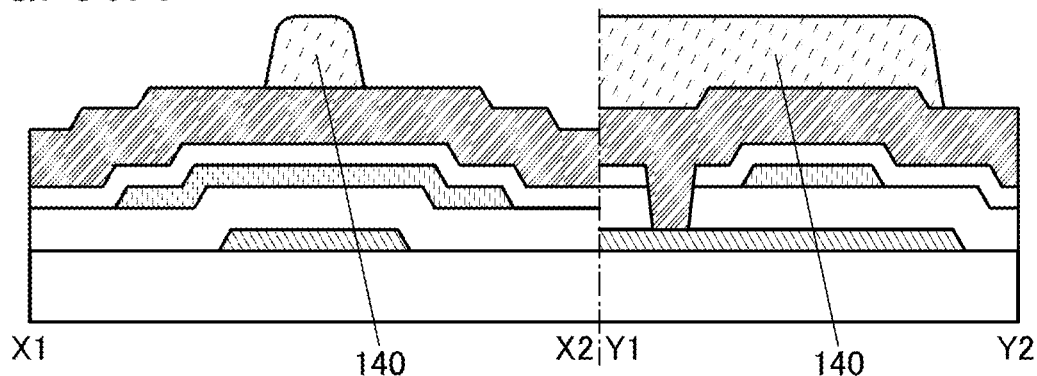
FIGS. 30A to 30D are cross-sectional views illustrating a method for manufacturing a transistor.

Next, a mask 140 is formed in a desired position over the oxide semiconductor film 112_0 by a lithography process (see FIG. 30A).

Figure 30B:
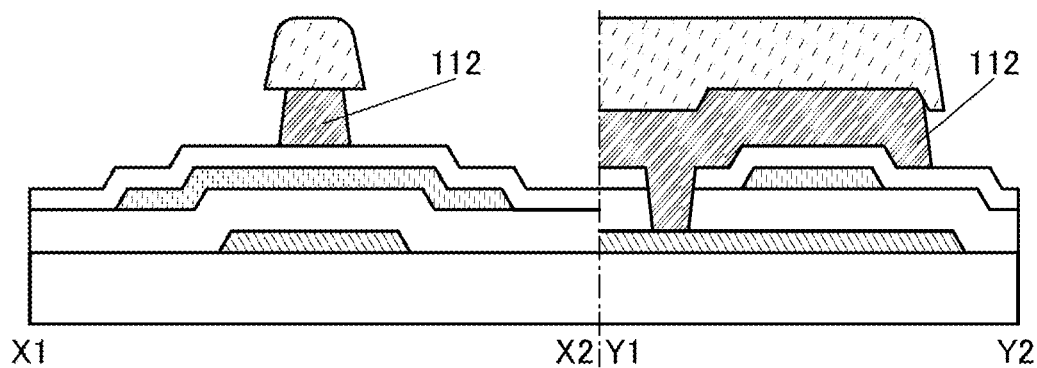

Then, the oxide semiconductor film 112_0 is processed into the island-shaped oxide semiconductor film 112 by etching from above the mask 140 (see FIG. 30B).

In this embodiment, the oxide semiconductor film 112_0 is processed by a wet etching method.

Figure 30C:
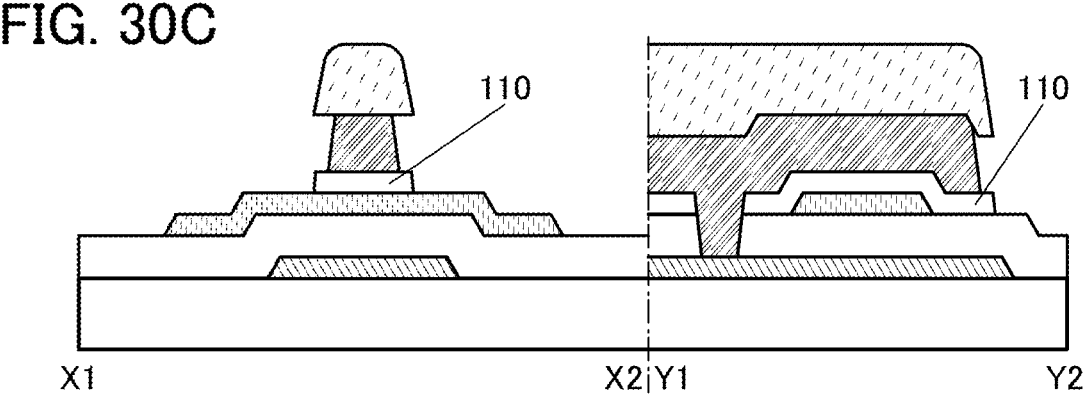

In succession to the above step, the insulating film 110_0 is processed into the island-shaped insulating film 110 by etching from above the mask 140 (see FIG. 30C).

In this embodiment, the insulating film 110_0 is processed by a dry etching method.

In the processing into the oxide semiconductor film 112 and the insulating film 110, the thickness of the oxide semiconductor film 107 in a region not overlapping with the oxide semiconductor film 112 is decreased in some cases. In other cases, in the processing into the oxide semiconductor film 112 and the insulating film 110, the thickness of the insulating film 104 in a region not overlapping with the oxide semiconductor film 107 is decreased.

Figure 30D:
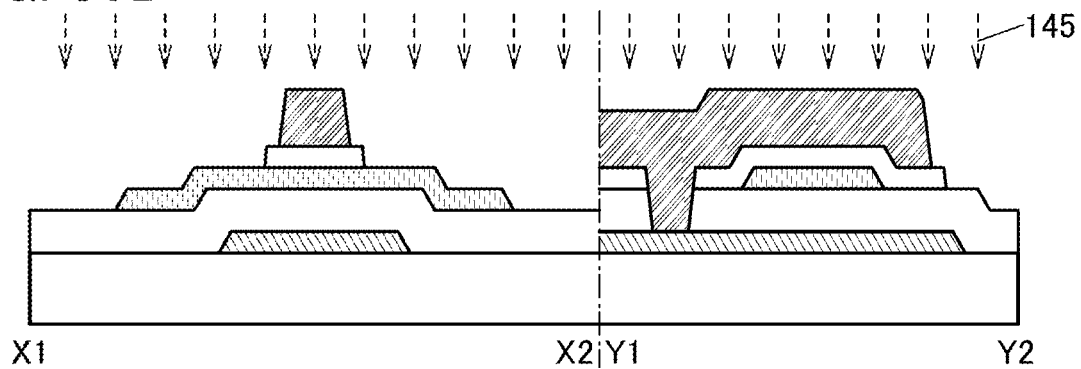

Next, the impurity element 145 is added from above the insulating film 104, the oxide semiconductor film 107, and the oxide semiconductor film 112 after the mask 140 is removed (see FIG. 30D).

As a method for adding the impurity element 145, an ion doping method, an ion implantation method, plasma treatment, or the like can be given. In the case of plasma treatment, plasma is generated in a gas atmosphere containing an impurity element to be added and plasma treatment is performed, whereby the impurity element can be added. A dry etching apparatus, an ashing apparatus, a PECVD apparatus, a high-density PECVD apparatus, or the like can be used to generate the plasma.

Note that as a source gas of the impurity element 145, one or more of $B_2H_6$, $PH_3$, $CH_4$, $N_2$, $NH_3$, $AlH_3$, $AlCl_3$, $SiH_4$, $Si_2H_6$, $F_2$, HF, $H_2$, and a rare gas (e.g., argon) can be used. Alternatively, one or more of $B_2H_6$, $PH_3$, $N_2$, $NH_3$, $AlH_3$, $AlCl_3$, $F_2$, HF, and $H_2$ which are diluted with a rare gas can be used. One or more of $B_2H_6$, $PH_3$, $N_2$, $NH_3$, $AlH_3$, $AlCl_3$, $F_2$, HF, and $H_2$ which are diluted with a rare gas is used to add the impurity element 145 to the oxide semiconductor film 107 and the oxide semiconductor film 112, whereby one or more of the rare gas, hydrogen, boron, carbon, nitrogen, fluorine, phosphorus, sulfur, and chlorine can be added to the oxide semiconductor film 107 and the oxide semiconductor film 112.

Alternatively, after being added to the oxide semiconductor film 107 and the oxide semiconductor film 112 with the use of a rare gas as a source gas, the impurity element 145 may be added thereto with the use of one or more of $B_2H_6$, $PH_3$, $CH_4$, $N_2$, $NH_3$, $AlH_3$, $AlCl_3$, $SiH_4$, $Si_2H_6$, $F_2$, HF, and $H_2$ as a source gas.

Alternatively, after being added to the oxide semiconductor film 107 and the oxide semiconductor film 112 with the use of one or more of $B_2H_6$, $PH_3$, $CH_4$, $N_2$, $NH_3$, $AlH_3$, $AlCl_3$, $SiH_4$, $Si_2H_6$, $F_2$, HF, and $H_2$ as a source gas, the impurity element 145 may be added thereto with the use of a rare gas as a source gas.

The addition of the impurity element 145 is controlled by appropriately setting the implantation conditions such as the acceleration voltage and the dose. For example, in the case where argon is added by an ion implantation method, the acceleration voltage may be set to be higher than or equal to 10 kV and lower than or equal to 100 kV and the dose may be set to be greater than or equal to $1\times10^{13}$ ions/cm$^2$ and less than or equal to $1\times10^{16}$ ions/cm$^2$, for example, $1\times10^{14}$ ions/cm$^2$. In the case where a phosphorus ion is added by an ion implantation method, the acceleration voltage is set to 30 kV and the dose is set to be greater than or equal to $1\times10^{13}$ ions/cm$^2$ and less than or equal to $5\times10^{16}$ ions/cm$^2$, for example, $1\times10^{15}$ ions/cm$^2$.

One embodiment of the present invention is not limited to the example described in this embodiment, in which the impurity element 145 is added after the mask 140 is removed; for example, the impurity element 145 may be added with the mask 140 left.

In this embodiment, argon is added to the oxide semiconductor film 107 and the oxide semiconductor film 112 as the impurity element 145 with a doping apparatus. Note that one embodiment of the present invention is not limited to the example described in this embodiment, in which the impurity element 145 is added; for example, the step of adding the impurity element 145 is not necessarily performed.

In the addition of the impurity element 145, a large number of impurities are added to the regions in which the surface of the oxide semiconductor film 107 is exposed (regions to be the source region 108s and the drain region 108d). In contrast, since the impurity element 145 is added to regions of the oxide semiconductor film 107 which do not overlap with the oxide semiconductor film 112 but overlap with the insulating film 110 (regions to be the regions 1080 through the insulating film 110, the amount of the added impurity element 145 is smaller than that in the source region 108s and the drain region 108d.

In this embodiment, argon is added to the oxide semiconductor film 107 and the oxide semiconductor film 112 as the impurity element 145 with a doping apparatus.

Note that one embodiment of the present invention is not limited to the example described in this embodiment, in which argon is added as the impurity element 145; for example, the step of adding the impurity element 145 is not necessarily performed. In the case where the step of adding the impurity element 145 is not performed, the regions 108f have the same level of impurity concentration as the channel region 108i.

Next, the insulating film 116 is formed over the insulating film 104, the oxide semiconductor film 107, the insulating film 110, and the oxide semiconductor film 112. Note that the oxide semiconductor film 107 is in contact with the insulating film 116 by formation of the insulating film 116 and serves as the source region 108s and the drain region 108d. The oxide semiconductor film 107 which is not in contact with the insulating film 116, i.e., the oxide semiconductor film 107 in contact with the insulating film 110 serves as the channel region 108i. Accordingly, the oxide semiconductor film 108 including the channel region 108i, the source region 108s, and the drain region 108d is formed (see FIG. 31A).

The insulating film 116 can be formed using the material that can be used for the insulating film 116. In this embodiment, a 100-nm-thick silicon nitride film is formed with a PECVD apparatus as the insulating film 116.

With the silicon nitride film used as the insulating film 116, hydrogen in the silicon nitride film enters the oxide semiconductor film 112, the source region 108s, and the drain region 108d in contact with the insulating film 116; consequently, the carrier densities in the oxide semiconductor film 112, the source region 108s, and the drain region 108d can be increased.

The regions 108f are formed between the channel region 108i and the source region 108s and between the channel region 108i and the drain region 108d.

Figure 31A:
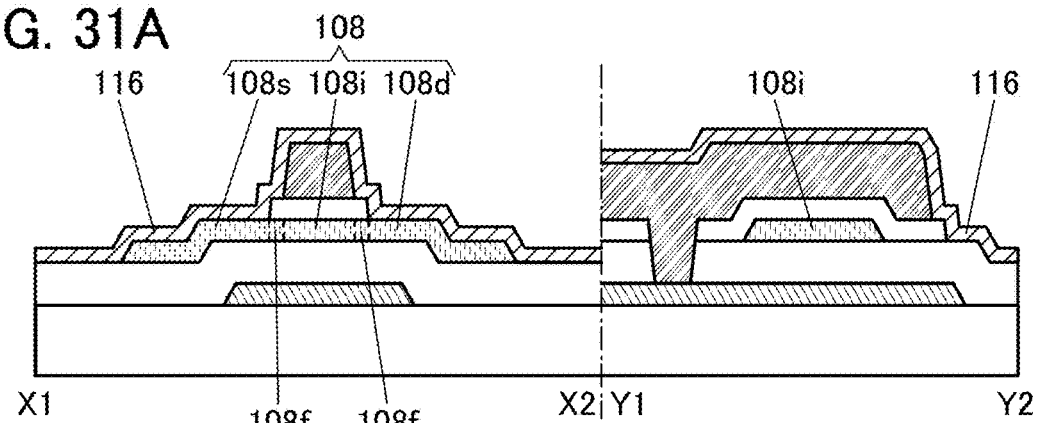
FIGS. 31A to 31D are cross-sectional views illustrating a method for manufacturing a transistor.
Figure 31B:
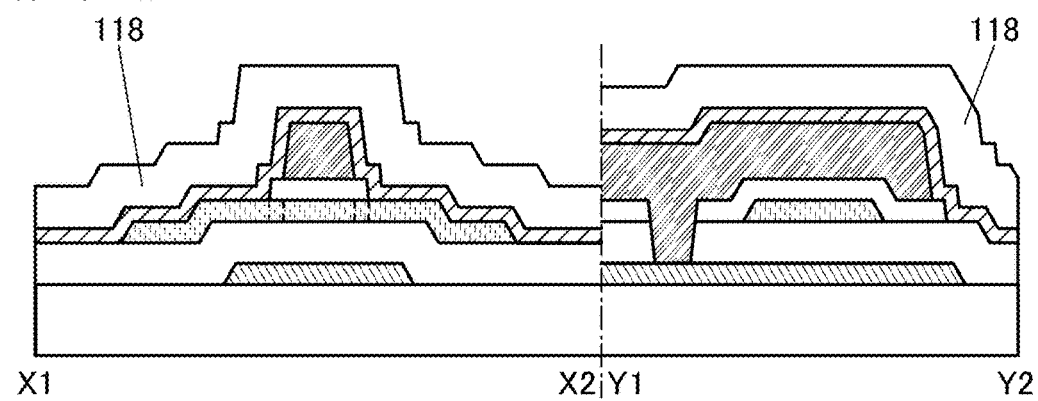

Next, the insulating film 118 is formed over the insulating film 116 (see FIG. 31B).

The insulating film 118 can be formed using a material selected from the above-described materials. In this embodiment, a 300-nm-thick silicon oxynitride film is formed with a PECVD apparatus as the insulating film 118.

Figure 31C:
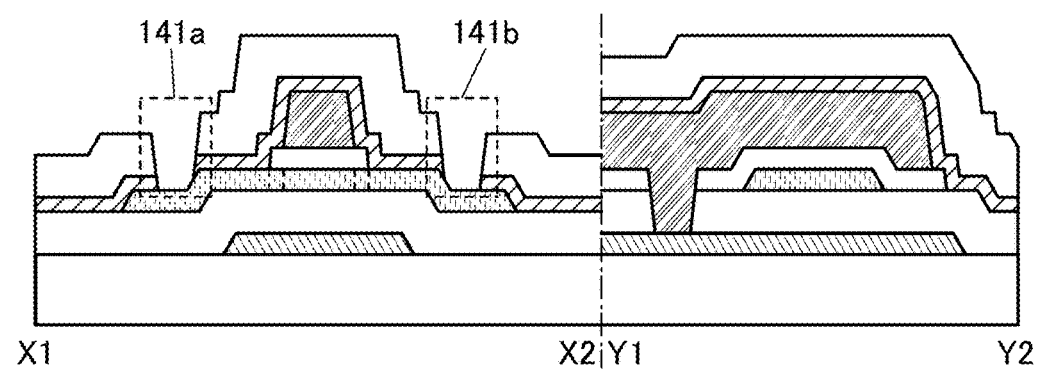

Next, a mask is formed in a desired position over the insulating film 118 by a lithography process, and then the insulating film 118 and the insulating film 116 are partly etched, whereby the opening 141a and the opening 141b that reach the source region 108s and the drain region 108d, respectively, are formed (see FIG. 31C).

Figure 31D:
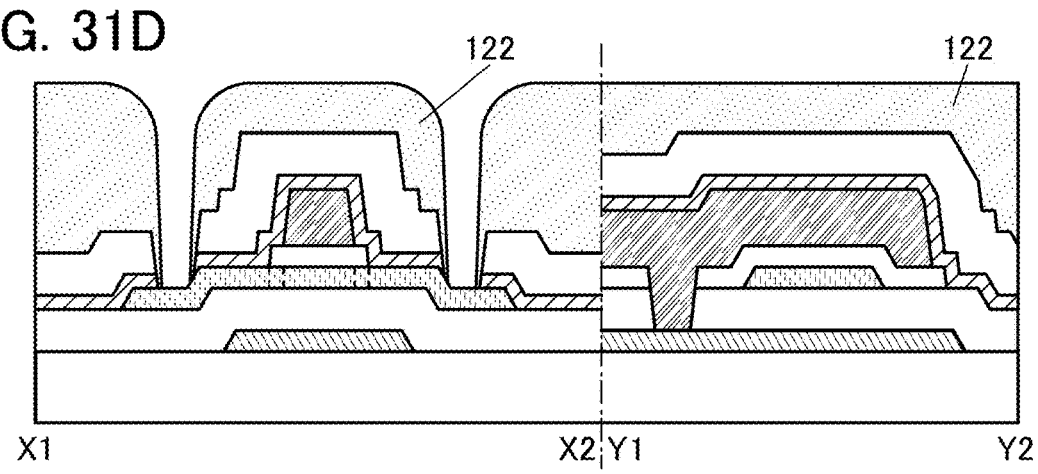

Next, the insulating film 122 is formed over the insulating film 118 (see FIG. 31D).

Note that the insulating film 122 functions as a planarization insulating film. Furthermore, the insulating film 122 has openings in positions overlapping with the openings 141a and 141b.

In this embodiment, the insulating film 122 having the openings is formed in the following manner: a photosensitive acrylic-based resin is applied with a spin coater, and then, desired regions of the photosensitive acrylic-based resin are exposed to light.

Figure 32A:
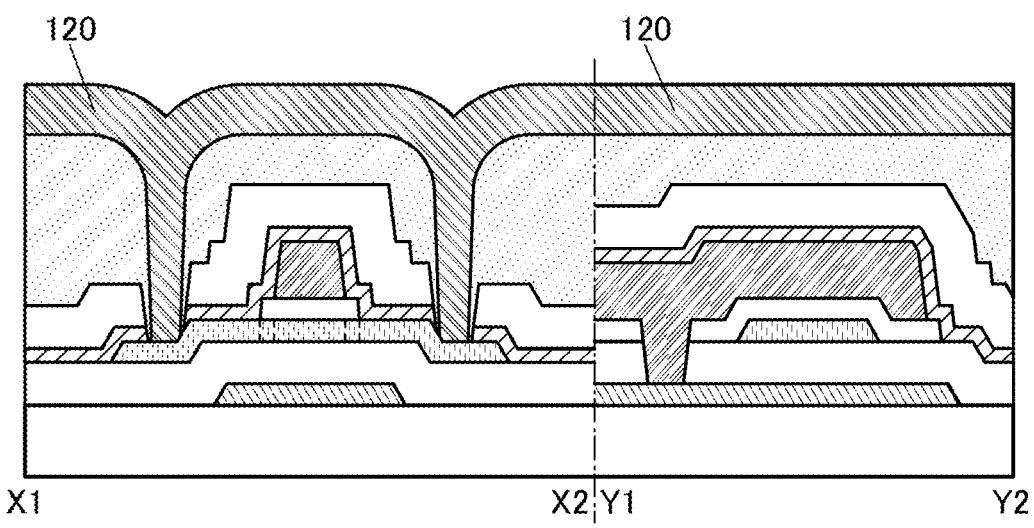
FIGS. 32A and 32B are cross-sectional views illustrating a method for manufacturing a transistor.

Then, a conductive film 120 is formed over the insulating film 122 to cover the openings 141a and 141b (see FIG. 32A).

Figure 32B:
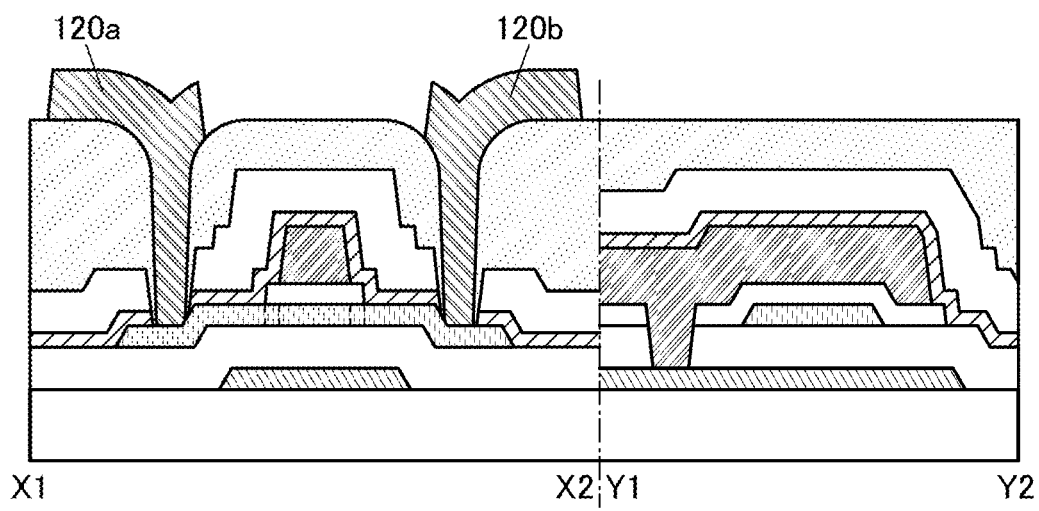

Next, a mask is formed in a desired position over the conductive film 120 by a lithography process, and then the conductive film 120 is partly etched, whereby the conductive films 120a and 120b are formed (see FIG. 32B).

In this embodiment, processing into the conductive film 120 is performed by a dry etching method. In some cases, an upper portion of the insulating film 122 is partly removed when the conductive film 120 is processed.

Through the above-described steps, the transistor 100C illustrated in FIGS. 25A and 25B can be manufactured.

Note that the films included in the transistor 100C (i.e., the insulating film, the oxide semiconductor film, the conductive film, and the like) can be formed by any of a sputtering method, a chemical vapor deposition (CVD) method, a vacuum evaporation method, a pulsed laser deposition (PLD) method, and an atomic layer deposition (ALD) method. Alternatively, a coating method or a printing method can be used. Although the sputtering method and a plasma-enhanced chemical vapor deposition (PECVD) method are typical examples of the film formation method, a thermal CVD method may be used. As the thermal CVD method, a metal organic chemical vapor deposition (MOCVD) method may be used, for example.

Deposition by the thermal CVD method is performed in such a manner that the pressure in a chamber is set to an atmospheric pressure or a reduced pressure, and a source gas and an oxidizer are supplied to the chamber at a time and react with each other in the vicinity of the substrate or over the substrate. Thus, no plasma is generated in the deposition; therefore, the thermal CVD method has an advantage that no defect due to plasma damage is caused.

Deposition by an ALD method is performed in the following manner: a source gas for reaction is introduced into a chamber in which the pressure is set to an atmospheric pressure or a reduced pressure, and a reaction is caused; then, this sequence is repeated. An inert gas (e.g., argon or nitrogen) may be introduced as a carrier gas with the source gases. For example, two or more kinds of source gases may be sequentially supplied to the chamber. In this case, an inert gas is introduced between reaction of a first source gas and introduction of a second source gas to prevent the source gases from being mixed. Alternatively, the first source gas may be exhausted by vacuum evacuation instead of the introduction of the inert gas, and then the second source gas may be introduced. The first source gas is adsorbed on the surface of the substrate and a reaction is caused to form a first layer, and then, the second source gas is introduced and adsorbed and a reaction is caused to form a second layer over the first layer; in this manner, a thin film is formed. The sequence of the gas introduction is repeated plural times until a desired thickness is obtained, whereby a thin film with excellent step coverage can be formed. The thickness of the thin film can be precisely adjusted by the number of times the gas introduction is repeated; therefore, an ALD method is suitable for manufacturing a minute FET.

The films such as the conductive films, the insulating films, and the oxide semiconductor films which are described above can be formed by a thermal CVD method such as an MOCVD method. For example, in the case where an In—Ga—Zn—O film is formed, trimethylindium (In$(CH_3)_3$), trimethylgallium (Ga$(CH_3)_3$), and dimethylzinc (Zn$(CH_3)_2$) are used. Without limitation to the above combination, triethylgallium (Ga$(C_2H_5)_3$) can be used instead of trimethylgallium, and diethylzinc (Zn$(C_2H_5)_2$) can be used instead of dimethylzinc.

For example, in the case where a hafnium oxide film is formed by a deposition apparatus using an ALD method, two kinds of gases, i.e., ozone ($O_3$) as an oxidizer and a source gas which is obtained by vaporizing liquid containing a solvent and a hafnium precursor (e.g., a hafnium alkoxide or a hafnium amide such as tetrakis(dimethylamide)hafnium (TDMAH, Hf$[N(CH_3)_2]_4$) and tetrakis(ethylmethylamide) hafnium) are used.

For example, in the case where an aluminum oxide film is formed by a deposition apparatus using an ALD method, two kinds of gases, i.e., $H_2O$ as an oxidizer and a source gas which is obtained by vaporizing liquid containing a solvent and an aluminum precursor (e.g., trimethylaluminum (TMA, Al$(CH_3)_3$)) are used. Examples of another material include tris(dimethylamide)aluminum, triisobutylaluminum, and aluminum tris(2,2,6,6-tetramethyl-3,5-heptanedionate).

For example, in the case where a silicon oxide film is formed by a deposition apparatus using an ALD method, hexachlorodisilane is adsorbed on a surface where a film is to be formed, and radicals of an oxidizing gas (e.g., $O_2$ or dinitrogen monoxide) are supplied to react with the adsorbate.

For example, in the case where a tungsten film is formed with a deposition apparatus using an ALD method, a $WF_6$ gas and a $B_2H_6$ gas are sequentially introduced to form an initial tungsten film, and then a tungsten film is formed using a $WF_6$ gas and an $H_2$ gas. Note that an $SiH_4$ gas may be used instead of a $B_2H_6$ gas.

For example, in the case where an oxide semiconductor film such as an In—Ga—Zn—O film is formed with a deposition apparatus using an ALD method, an In$(CH_3)_3$ gas and an $O_3$ gas are used to form an In—O layer, a Ga—O layer is formed using a Ga$(CH_3)_3$ gas and an $O_3$ gas, and then a Zn—O layer is formed using a Zn$(CH_3)_2$ gas and an $O_3$ gas. Note that the order of these layers is not limited to this example. A mixed compound layer such as an In—

Ga—O layer, an In—Zn—O layer, or a Ga—Zn—O layer may be formed by using these gases. Note that although an $H_2O$ gas which is obtained by bubbling water with an inert gas such as Ar may be used instead of an $O_3$ gas, it is preferable to use an $O_3$ gas, which does not contain H.

The structure and method described in this embodiment can be combined as appropriate with any of the other structures and methods described in the other embodiments.

Embodiment 2

In this embodiment, a structure of an oxide semiconductor and the like will be described with reference to FIGS. 33A to 33E, FIGS. 34A to 34E, FIGS. 35A to 35D, FIGS. 36A and 36B, and FIG. 37.

2-1. Structure of Oxide Semiconductor

An oxide semiconductor is classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

An amorphous structure is generally thought to be isotropic and have no non-uniform structure, to be metastable and not have fixed positions of atoms, to have a flexible bond angle, and to have a short-range order but have no long-range order, for example.

This means that a stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. In contrast, an a-like OS, which is not isotropic, has an unstable structure that contains a void. Because of its instability, an a-like OS has physical properties similar to those of an amorphous oxide semiconductor.

2-2. CAAC-OS

First, a CAAC-OS will be described.

A CAAC-OS is one of oxide semiconductors having a plurality of c-axis aligned crystal parts (also referred to as pellets).

Figure 33A:
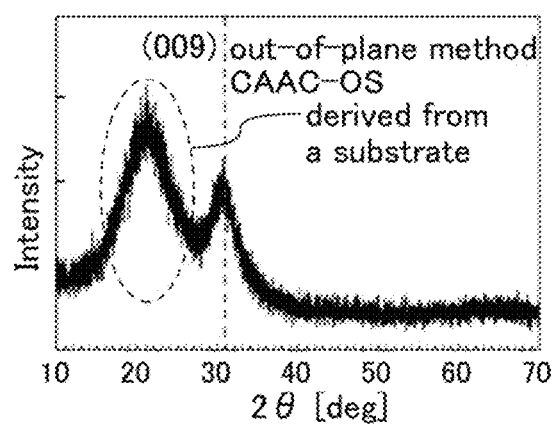
FIGS. 33A to 33E show structural analyses of a CAAC-OS and a single crystal oxide semiconductor by XRD and selected-area electron diffraction patterns of a CAAC-OS.

Analysis of a CAAC-OS by X-ray diffraction (XRD) will be described. For example, when the structure of a CAAC-OS including an $InGaZnO_4$ crystal that is classified into the space group R-3m is analyzed by an out-of-plane method, a peak appears at a diffraction angle (2θ) of around 31° as shown in FIG. 33A. This peak is derived from the (009) plane of the $InGaZnO_4$ crystal, which indicates that crystals in the CAAC-OS have c-axis alignment, and that the c-axes are aligned in a direction substantially perpendicular to a surface over which the CAAC-OS film is formed (also referred to as a formation surface) or the top surface of the CAAC-OS film. Note that a peak sometimes appears at a 2θ of around 36° in addition to the peak at a 2θ of around 31°.

The peak at a 2θ of around 36° is derived from a crystal structure that is classified into the space group Fd-3m; thus, this peak is preferably not exhibited in a CAAC-OS.

Figure 33B:
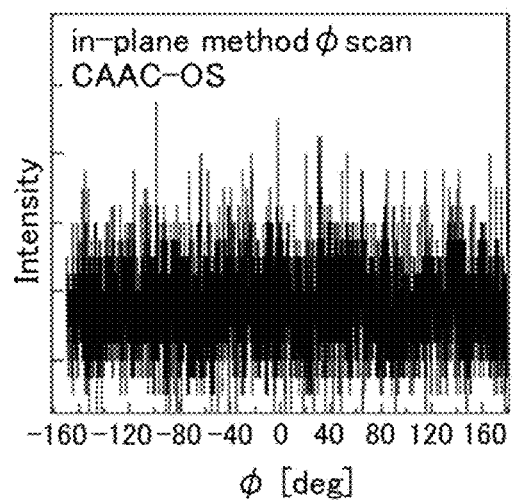
Figure 33C:
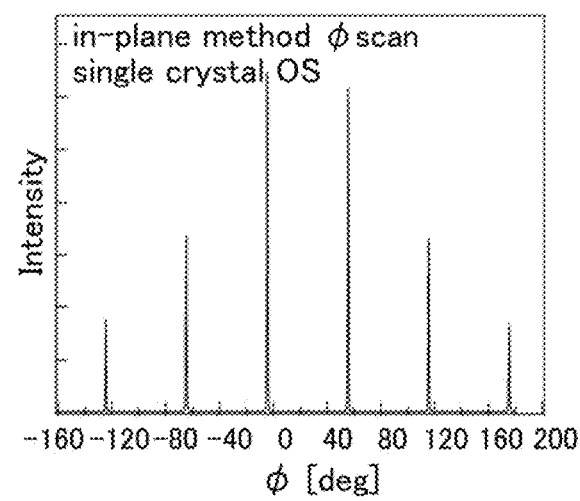
Figure 33D:
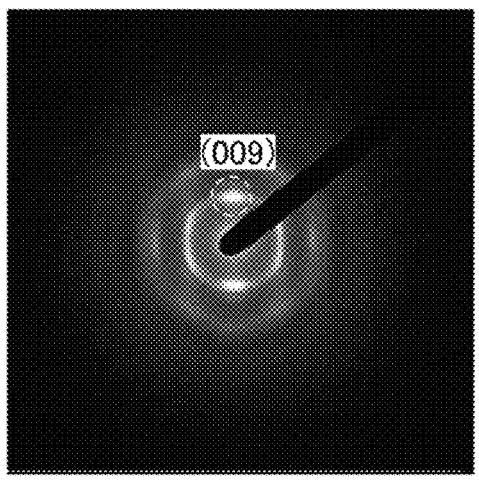

On the other hand, in structural analysis of the CAAC-OS by an in-plane method in which an X-ray is incident on the CAAC-OS in a direction parallel to the formation surface, a peak appears at a 2θ of around 56°. This peak is attributed to the (110) plane of the $InGaZnO_4$ crystal. When analysis (φ scan) is performed with 2θ fixed at around 56° and with the sample rotated using a normal vector to the sample surface as an axis (φ axis), as shown in FIG. 33B, a peak is not clearly observed. In contrast, in the case where single crystal $InGaZnO_4$ is subjected to φ scan with 2θ fixed at around 56°, as shown in FIG. 33C, six peaks which are derived from crystal planes equivalent to the (110) plane are observed. Accordingly, the structural analysis using XRD shows that the directions of a-axes and b-axes are irregularly oriented in the CAAC-OS.

Figure 33E:
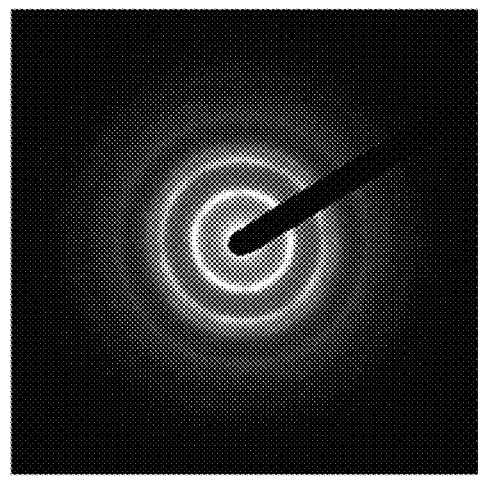

Next, a CAAC-OS analyzed by electron diffraction will be described. For example, when an electron beam with a probe diameter of 300 nm is incident on a CAAC-OS including an $InGaZnO_4$ crystal in a direction parallel to the formation surface of the CAAC-OS, a diffraction pattern (also referred to as a selected-area electron diffraction pattern) shown in FIG. 33D can be obtained. In this diffraction pattern, spots derived from the (009) plane of an $InGaZnO_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, FIG. 33E shows a diffraction pattern obtained in such a manner that an electron beam with a probe diameter of 300 nm is incident on the same sample in a direction perpendicular to the sample surface. As shown in FIG. 33E, a ring-like diffraction pattern is observed. Thus, the electron diffraction using an electron beam with a probe diameter of 300 nm also indicates that the a-axes and b-axes of the pellets included in the CAAC-OS do not have regular orientation. The first ring in FIG. 33E is considered to be derived from the (010) plane, the (100) plane, and the like of the $InGaZnO_4$ crystal. The second ring in FIG. 33E is considered to be derived from the (110) plane and the like.

In a combined analysis image (also referred to as a high-resolution TEM image) of a bright-field image and a diffraction pattern of a CAAC-OS, which is obtained using a transmission electron microscope (TEM), a plurality of pellets can be observed. However, even in the high-resolution TEM image, a boundary between pellets, that is, a grain boundary is not clearly observed in some cases. Thus, in the CAAC-OS, a reduction in electron mobility due to the grain boundary is less likely to occur.

Figure 34A:
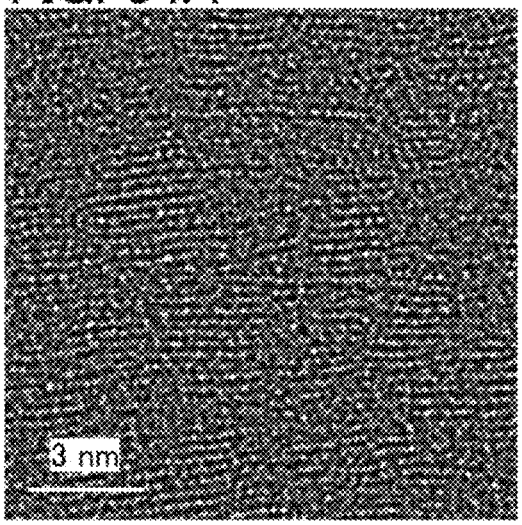
FIGS. 34A to 34E show a cross-sectional TEM image and plan-view TEM images of a CAAC-OS and images obtained through analysis thereof.

FIG. 34A shows a high-resolution TEM image of a cross section of the CAAC-OS which is observed from a direction substantially parallel to the sample surface. The high-resolution TEM image is obtained with a spherical aberration corrector function. The high-resolution TEM image obtained with a spherical aberration corrector function is particularly referred to as a Cs-corrected high-resolution TEM image. The Cs-corrected high-resolution TEM image can be observed with, for example, an atomic resolution analytical electron microscope JEM-ARM200F manufactured by JEOL Ltd.

FIG. 34A shows pellets in which metal atoms are arranged in a layered manner. FIG. 34A proves that the size of a pellet is greater than or equal to 1 nm or greater than or equal to 3 nm. Therefore, the pellet can also be referred to as a nanocrystal (nc). Furthermore, the CAAC-OS can also be referred to as an oxide semiconductor including c-axis aligned nanocrystals (CANC). A pellet reflects unevenness of a formation surface or a top surface of the CAAC-OS, and is parallel to the formation surface or the top surface of the CAAC-OS.

Figure 34B:
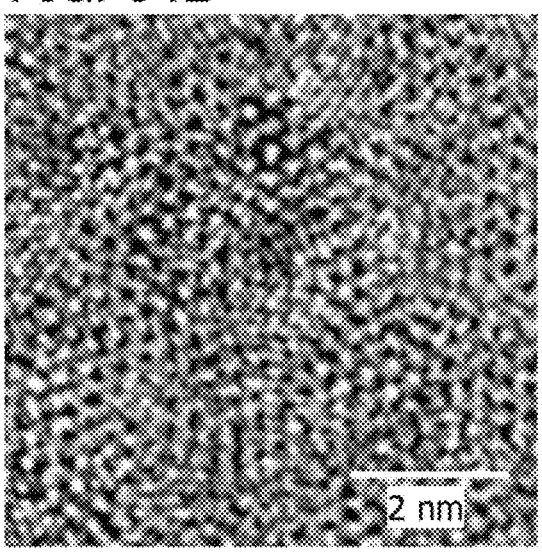
Figure 34C:
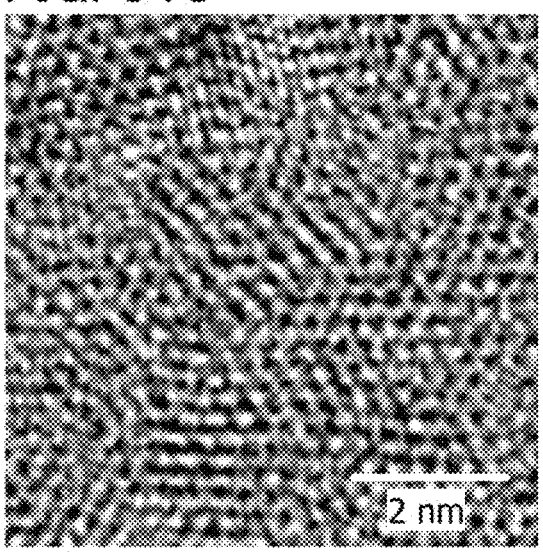
Figure 34D:
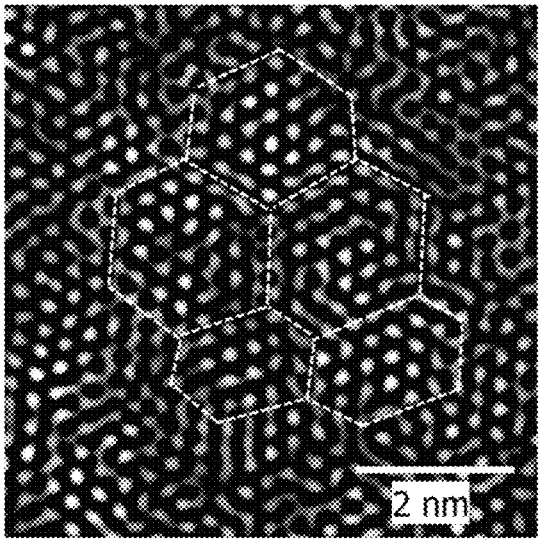
Figure 34E:
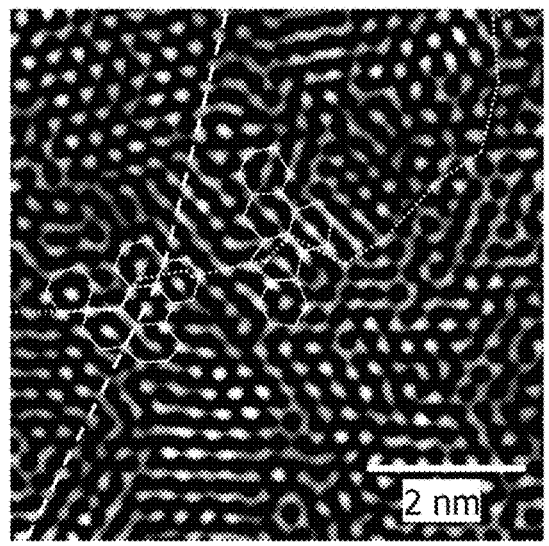

FIGS. 34B and 34C show Cs-corrected high-resolution TEM images of a plane of the CAAC-OS observed from a direction substantially perpendicular to the sample surface. FIGS. 34D and 34E are images obtained through image processing of FIGS. 34B and 34C. The method of image processing is as follows. The image in FIG. 34B is subjected to fast Fourier transform (FFT), so that an FFT image is obtained. Then, mask processing is performed such that a range of from 2.8 nm$^{-1}$ to 5.0 nm$^{-1}$ from the origin in the obtained FFT image remains. After the mask processing, the FFT image is processed by inverse fast Fourier transform (IFFT) to obtain a processed image. The image obtained in this manner is called an FFT filtering image. The FFT filtering image is a Cs-corrected high-resolution TEM image from which a periodic component is extracted, and shows a lattice arrangement.

In FIG. 34D, a portion where a lattice arrangement is broken is denoted with a dashed line. A region surrounded by a dashed line is one pellet. The portion denoted with the dashed line is a junction of pellets. The dashed line draws a hexagon, which means that the pellet has a hexagonal shape. Note that the shape of the pellet is not always a regular hexagon but is a non-regular hexagon in many cases.

In FIG. 34E, a dotted line denotes a boundary between a region with a regular lattice arrangement and another region with a regular lattice arrangement. No clear crystal grain boundary can be observed even in the vicinity of the dotted line. When lattice points around a lattice point in the vicinity of the dotted line are joined, a distorted hexagon can be formed. That is, a lattice arrangement is distorted so that formation of a crystal grain boundary is inhibited. This is probably because the following features of the CAAC-OS can allow distortion: a low density of the atomic arrangement in the a-b plane direction, an interatomic bond distance changed by substitution of a metal element, and the like.

In the above-described manner, the CAAC-OS has c-axis alignment, its pellets (nanocrystals) are connected in an a-b plane direction, and the crystal structure has distortion. For this reason, the CAAC-OS can also be referred to as an oxide semiconductor including a c-axis-aligned a-b-plane-anchored (CAA) crystal.

The CAAC-OS is an oxide semiconductor with high crystallinity. Entry of impurities, formation of defects, or the like might decrease the crystallinity of an oxide semiconductor. This means that the CAAC-OS has small amounts of impurities and defects (e.g., oxygen vacancies).

Note that the impurity means an element other than the main components of the oxide semiconductor, such as hydrogen, carbon, silicon, or a transition metal element. For example, an element (specifically, silicon or the like) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

The characteristics of an oxide semiconductor having impurities or defects might be changed by light, heat, or the like. Impurities contained in the oxide semiconductor might serve as carrier traps or carrier generation sources, for example. For example, an oxygen vacancy in the oxide semiconductor might serve as a carrier trap or serve as a carrier generation source when hydrogen is captured therein.

The CAAC-OS having small amounts of impurities and oxygen vacancies is an oxide semiconductor with low carrier density (specifically, lower than $8\times10^{11}/cm^3$, preferably lower than $1\times10^{11}/cm^3$, and further preferably lower than $1\times10^{10}/cm^3$, and higher than or equal to $1\times10^{-9}/cm^3$). Such an oxide semiconductor is referred to as a highly purified intrinsic or substantially highly purified intrinsic oxide semiconductor. A CAAC-OS has a low impurity concentration and a low density of defect states. Thus, the CAAC-OS can be referred to as an oxide semiconductor having stable characteristics.

2-3. nc-OS

Next, an nc-OS will be described.

Analysis of an nc-OS by XRD will be described. When the structure of an nc-OS is analyzed by an out-of-plane method, a peak indicating orientation does not appear. That is, a crystal of an nc-OS does not have orientation.

Figure 35A:
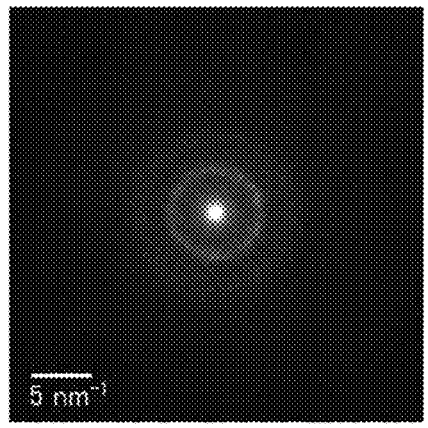
FIGS. 35A to 35D show electron diffraction patterns and a cross-sectional TEM image of an nc-OS.
Figure 35B:
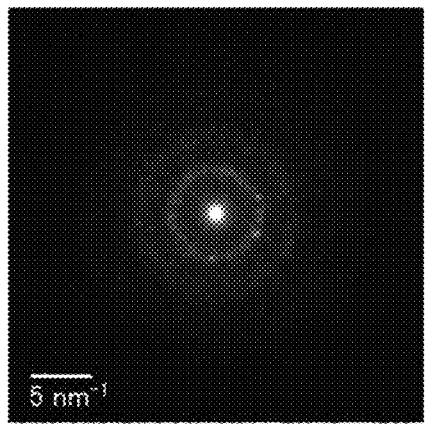

For example, when an electron beam with a probe diameter of 50 nm is incident on a 34-nm-thick region of thinned nc-OS including an InGaZnO$_4$ crystal in a direction parallel to the formation surface, a ring-shaped diffraction pattern (a nanobeam electron diffraction pattern) shown in FIG. 35A is observed. FIG. 35B shows a diffraction pattern obtained when an electron beam with a probe diameter of 1 nm is incident on the same sample. As shown in FIG. 35B, a plurality of spots are observed in a ring-like region. In other words, ordering in an nc-OS is not observed with an electron beam with a probe diameter of 50 nm but is observed with an electron beam with a probe diameter of 1 nm.

Figure 35C:
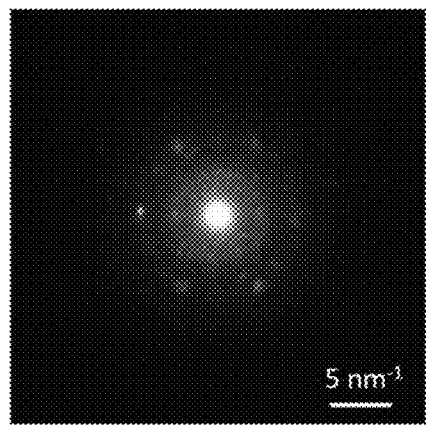

Furthermore, an electron diffraction pattern in which spots are arranged in an approximately regular hexagonal shape is observed in some cases as shown in FIG. 35C when an electron beam having a probe diameter of 1 nm is incident on a region with a thickness of less than 10 nm. This means that an nc-OS has a well-ordered region, i.e., a crystal, in the range of less than 10 nm in thickness. Note that an electron diffraction pattern having regularity is not observed in some regions because crystals are aligned in various directions.

Figure 35D:
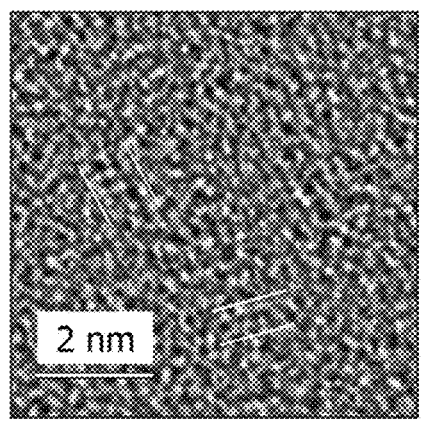

FIG. 35D shows a Cs-corrected high-resolution TEM image of a cross section of an nc-OS observed from the direction substantially parallel to the formation surface. In a high-resolution TEM image, an nc-OS has a region in which a crystal part is observed, such as the part indicated by additional lines in FIG. 35D, and a region in which a crystal part is not clearly observed. In most cases, the size of a crystal part included in the nc-OS is greater than or equal to 1 nm and less than or equal to 10 nm, in particular, greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. In a high-resolution TEM image of the nc-OS, for example, a grain boundary is not clearly observed in some cases. Note that there is a possibility that the origin of the nanocrystal is the same as that of a pellet in a CAAC-OS. Therefore, a crystal part of the nc-OS may be referred to as a pellet in the following description.

In the above-described manner, in the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different pellets in the nc-OS. Thus, the orientation of the whole film is not ordered. Accordingly, the nc-OS cannot be distinguished from an a-like OS or an amorphous oxide semiconductor, depending on an analysis method.

Since there is no regularity of crystal orientation between the pellets (nanocrystals) as mentioned above, the nc-OS can also be referred to as an oxide semiconductor including random aligned nanocrystals (RANC) or an oxide semiconductor including non-aligned nanocrystals (NANC).

The nc-OS is an oxide semiconductor that has high regularity as compared with an amorphous oxide semiconductor. Therefore, the nc-OS is likely to have a lower density of defect states than an a-like OS and an amorphous oxide semiconductor. Note that there is no regularity of crystal orientation between different pellets in the nc-OS. Therefore, the nc-OS has a higher density of defect states than the CAAC-OS.

2-4. a-Like OS

An a-like OS has a structure intermediate between those of the nc-OS and the amorphous oxide semiconductor.

FIGS. 36A and 36B are high-resolution cross-sectional TEM images of an a-like OS. FIG. 36A is the high-resolution cross-sectional TEM image of the a-like OS at the start of the electron irradiation. FIG. 36B is the high-resolution cross-sectional TEM image of a-like OS after the electron ($e^-$) irradiation at $4.3 \times 10^8$ $e^-/nm^2$. FIGS. 36A and 36B show that stripe-like bright regions extending vertically are observed in the a-like OS from the start of the electron irradiation. It can be also found that the shape of the bright region changes after the electron irradiation. Note that the bright region is presumably a void or a low-density region.

The a-like OS has an unstable structure because it contains a void. To verify that an a-like OS has an unstable structure as compared with a CAAC-OS and an nc-OS, a change in structure caused by electron irradiation will be described below.

An a-like OS, an nc-OS, and a CAAC-OS are prepared as samples. Each of the samples is an In—Ga—Zn oxide.

First, a high-resolution cross-sectional TEM image of each sample is obtained. The high-resolution cross-sectional TEM images show that all the samples have crystal parts.

It is known that a unit cell of an $InGaZnO_4$ crystal has a structure in which nine layers including three In—O layers and six Ga—Zn—O layers are stacked in the c-axis direction. The distance between the adjacent layers is equivalent to the lattice spacing on the (009) plane (also referred to as d value). The value is calculated to be 0.29 nm from crystal structural analysis. Accordingly, a portion where the spacing between lattice fringes is greater than or equal to 0.28 nm and less than or equal to 0.30 nm is regarded as a crystal part of $InGaZnO_4$ in the following description. Each of lattice fringes corresponds to the a-b plane of the $InGaZnO_4$ crystal.

Figure 37:
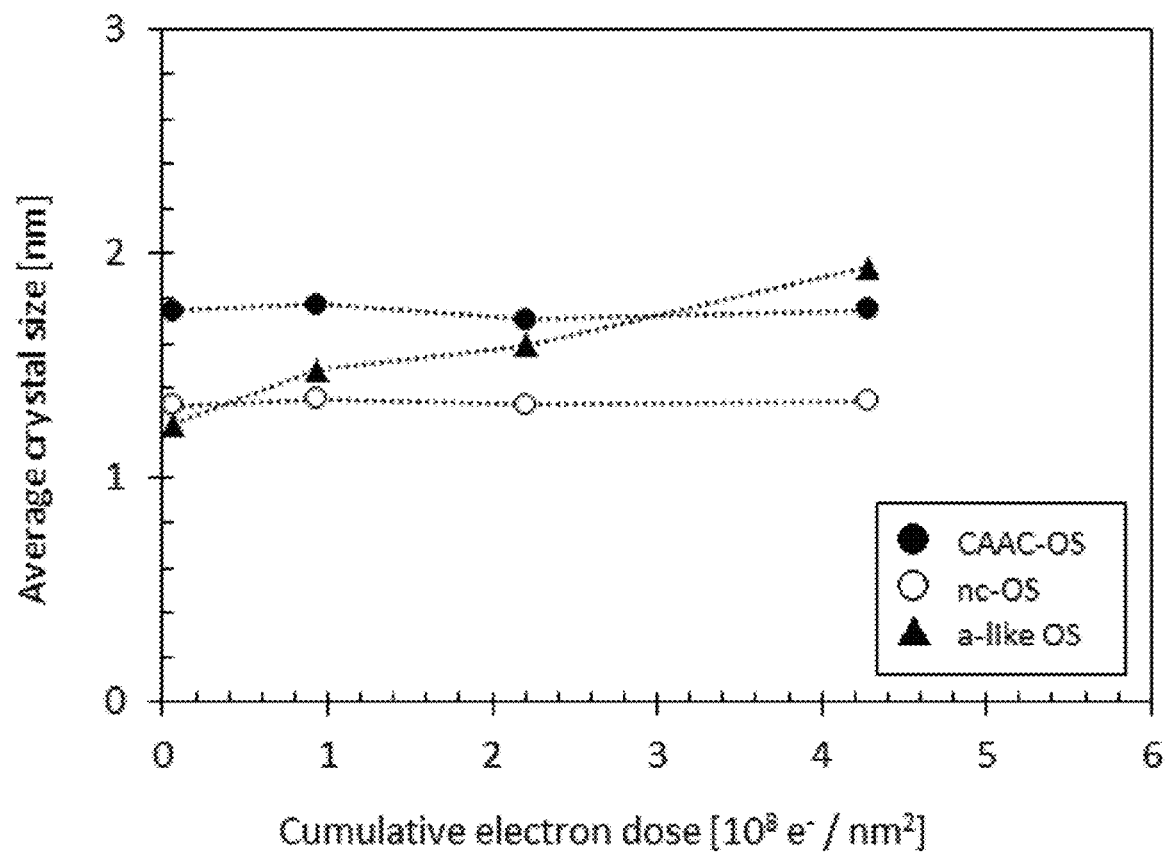
FIG. 37 shows a change in crystal part of an In—Ga—Zn oxide induced by electron irradiation.

FIG. 37 shows a change in the average size of crystal parts (at 22 points to 30 points) in each sample. Note that the crystal part size corresponds to the length of a lattice fringe. FIG. 37 indicates that the crystal part size in the a-like OS increases with an increase in the cumulative electron dose in obtaining TEM images, for example. As shown in FIG. 37, a crystal part of approximately 1.2 nm (also referred to as an initial nucleus) at the start of TEM observation grows to a size of approximately 1.9 nm at a cumulative electron ($e^-$) dose of $4.2 \times 10^8$ $e^-/nm^2$. In contrast, the crystal part size in the nc-OS and the CAAC-OS shows little change from the start of electron irradiation to a cumulative electron dose of $4.2 \times 10^8$ $e^-/nm^2$. As shown in FIG. 37, the crystal part sizes in an nc-OS and a CAAC-OS are approximately 1.3 nm and approximately 1.8 nm, respectively, regardless of the cumulative electron dose. For the electron beam irradiation and TEM observation, a Hitachi H-9000NAR transmission electron microscope was used. The conditions of electron beam irradiation were as follows: the accelerating voltage was 300 kV; the current density was $6.7 \times 10^5$ $e^-/(nm^2 \cdot s)$; and the diameter of an irradiation region was 230 nm.

In this manner, growth of the crystal part in the a-like OS is sometimes induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it contains a void. Specifically, the density of the a-like OS is higher than or equal to 78.6% and lower than 92.3% of the density of the single crystal oxide semiconductor having the same composition. The density of each of the nc-OS and the CAAC-OS is higher than or equal to 92.3% and lower than 100% of the density of the single crystal oxide semiconductor having the same composition. Note that it is difficult to deposit an oxide semiconductor having a density of lower than 78% of the density of the single crystal oxide semiconductor.

For example, in the case of an oxide semiconductor having an atomic ratio of In:Ga:Zn=1:1:1, the density of single crystal $InGaZnO_4$ with a rhombohedral crystal structure is 6.357 $g/cm^3$. Accordingly, in the case of the oxide semiconductor having an atomic ratio of In:Ga:Zn=1:1:1, the density of the a-like OS is higher than or equal to 5.0 $g/cm^3$ and lower than 5.9 $g/cm^3$. For example, in the case of the oxide semiconductor having an atomic ratio of In:Ga:Zn=1:1:1, the density of each of the nc-OS and the CAAC-OS is higher than or equal to 5.9 $g/cm^3$ and lower than 6.3 $g/cm^3$.

Note that in the case where an oxide semiconductor having a certain composition does not exist in a single crystal structure, single crystal oxide semiconductors with different compositions are combined at an adequate ratio, which makes it possible to calculate density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

In the above-described manner, oxide semiconductors have various structures and various properties. Note that an oxide semiconductor may be a stacked-layer film including two or more films of an amorphous oxide semiconductor, an a-like OS, an nc-OS, and a CAAC-OS, for example.

The structure described in this embodiment can be combined as appropriate with any of the other structures described in the other embodiments.

Embodiment 3

In this embodiment, an example of a display device in which any of the transistors described in the above embodiment is applied to a transistor included in a pixel will be described below with reference to FIG. 38, FIG. 39, and FIG. 40.

Figure 38:
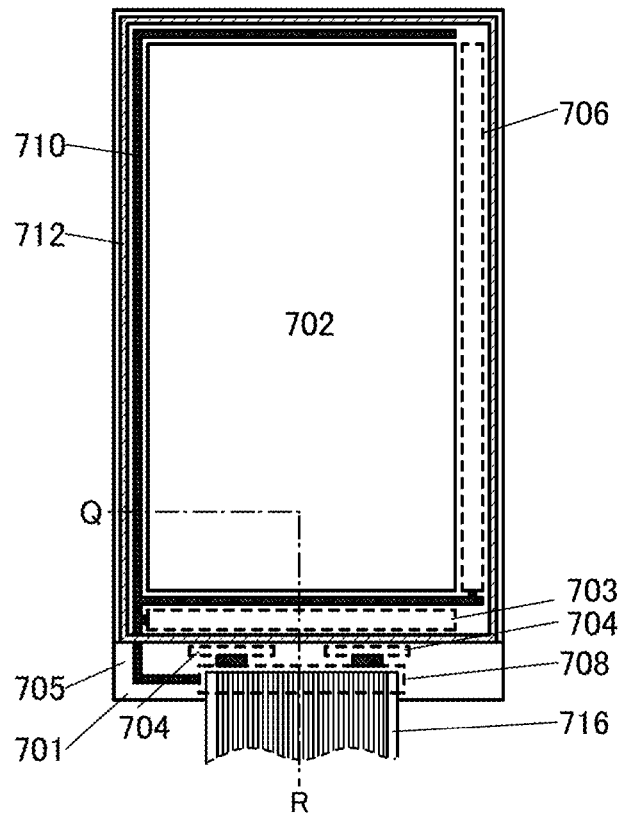
FIG. 38 is a top view illustrating one mode of a display device.

FIG. 38 is a top view of an example of a display device. A display device 700 illustrated in FIG. 38 includes a pixel portion 702 provided over a first substrate 701; a demultiplexer 703, a source driver 704, and a gate driver 706 provided over the first substrate 701; a sealant 712 provided to surround the pixel portion 702, the demultiplexer 703, and the gate driver 706; and a second substrate 705 provided to face the first substrate 701. The first substrate 701 and the second substrate 705 are sealed with the sealant 712. That is, the pixel portion 702, the demultiplexer 703, and the gate driver 706 are sealed with the first substrate 701, the sealant 712, and the second substrate 705. Although not illustrated in FIG. 38, a display element is provided between the first substrate 701 and the second substrate 705.

In the display device 700, a flexible printed circuit (FPC) terminal portion 708 electrically connected to the pixel portion 702, the demultiplexer 703, the source driver 704, and the gate driver 706 is provided in a region different from the region which is surrounded by the sealant 712 and positioned over the first substrate 701. Furthermore, an FPC 716 is connected to the FPC terminal portion 708, and a variety of signals and the like are supplied to the pixel portion 702, the demultiplexer 703, the source driver 704, and the gate driver 706 through the FPC 716. Furthermore, a signal line 710 is connected to the pixel portion 702, the demultiplexer 703, the source driver 704, the gate driver 706, and the FPC terminal portion 708. Various signals and the like are applied to the pixel portion 702, the demultiplexer 703, the source driver 704, the gate driver 706, and the FPC terminal portion 708 via the signal line 710 from the FPC 716.

A plurality of gate driver 706 may be provided in the display device 700. An example of the display device 700 in which the gate driver 706 is formed over the first substrate 701 where the pixel portion 702 is formed and the source driver 704 serves as a source driver IC is described; however, the structure is not limited thereto. For example, the source driver 704 may be formed over the first substrate 701. The source driver IC can be provided by a chip on glass (COG) method, a wire bonding method, or the like.

Any of the transistors described in the above embodiment can be applied to a plurality of transistors of the gate driver 706 in addition to a transistor included in the demultiplexer 703 and a transistor included in a pixel.

The display device 700 can include any of a variety of elements. The elements includes, for example, an electroluminescent (EL) element (e.g., an EL element including organic and inorganic materials, an organic EL element, an inorganic EL element, an LED), a light-emitting transistor (a transistor which emits light by current), an electron emitter, a liquid crystal element, an electronic ink display element, an electrophoretic element, an electrowetting element, a plasma display panel (PDP), micro electro mechanical systems (MEMS) display element (e.g., a grating light valve (GLV), a digital micromirror device (DMD), a digital micro shutter (DMS) element, and an interferometric modulation (IMOD) element), and a piezoelectric ceramic display.

Note that examples of display devices including EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). An example of a display device including electronic ink display element or electrophoretic elements is electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption.

As a display method in the display device 700, a progressive method, an interlace method, or the like can be employed. Furthermore, color elements controlled in a pixel at the time of color display are not limited to three colors: R, G, and B (R, G, and B correspond to red, green, and blue, respectively). For example, four pixels of the R pixel, the G pixel, the B pixel, and a W (white) pixel may be included. Alternatively, a color element may be composed of two colors among R, G, and B as in PenTile layout. The two colors may differ among color elements. Alternatively, one or more colors of yellow, cyan, magenta, and the like may be added to RGB. Note that the sizes of display regions may be different between respective dots of color elements. Embodiments of the disclosed invention are not limited to a display device for color display; the disclosed invention can also be applied to a display device for monochrome display.

A coloring layer (also referred to as a color filter) may be used in order to obtain a full-color display device in which white light (W) for a backlight (e.g., an organic EL element, an inorganic EL element, an LED, or a fluorescent lamp) is used. As the coloring layer, red (R), green (G), blue (B), yellow (Y), or the like may be combined as appropriate, for example. With the use of the coloring layer, higher color reproducibility can be obtained than in the case without the coloring layer. In this case, by providing a region with the coloring layer and a region without the coloring layer, white light in the region without the coloring layer may be directly utilized for display. By partly providing the region without the coloring layer, a decrease in luminance due to the coloring layer can be suppressed, and 20% to 30% of power consumption can be reduced in some cases when an image is displayed brightly. Note that in the case where full-color display is performed using a self-luminous element such as an organic EL element or an inorganic EL element, elements may emit light of their respective colors R, G, B, Y, and W. By using a self-luminous element, power consumption can be further reduced as compared to the case of using the coloring layer in some cases.

As a coloring method, any of the following methods may be used: the above-described color filter method in which part of white light emission is converted into red light, green light, and blue light through a color filter; a three-color method in which light emission of red, green, and blue is used; and a color conversion method or a quantum dot method in which part of blue emission is converted into red light or green light.

In this embodiment, a structure including a liquid crystal element and an EL element as display elements will be described with reference to FIG. 39 and FIG. 40. Note that FIG. 39 is a cross-sectional view taken along the dashed-dotted line Q-R illustrated in FIG. 38 and illustrates a structure including a liquid crystal element as a display element, whereas FIG. 40 is a cross-sectional view taken along the dashed-dotted line Q-R illustrated in FIG. 38 and illustrates a structure including an EL element as a display element.

Common portions between FIG. 39 and FIG. 40 will be described first, and then different portions will be described.

3-1. Common Portions in Display Devices

Figure 39:
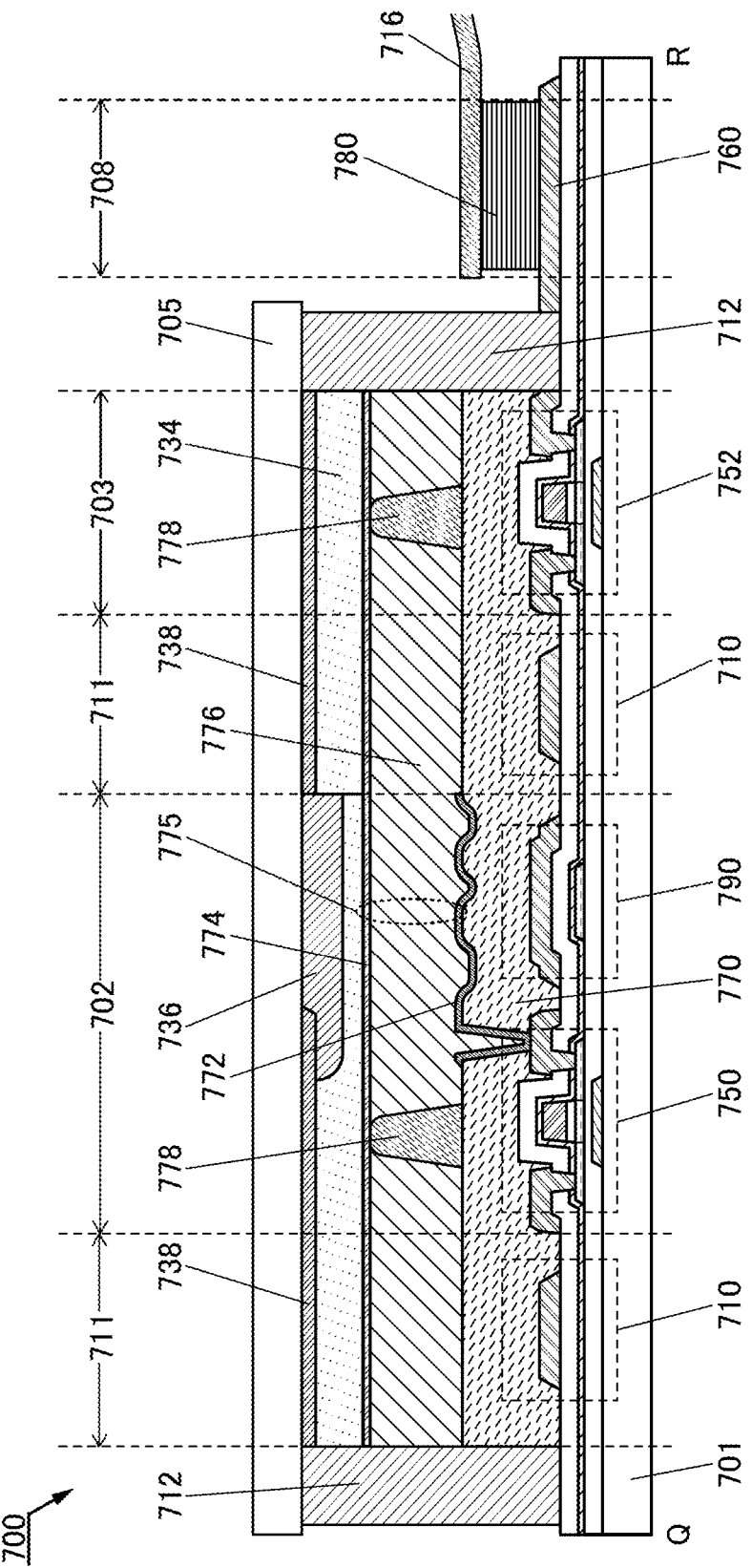
FIG. 39 is a cross-sectional view illustrating one mode of a display device.
Figure 40:
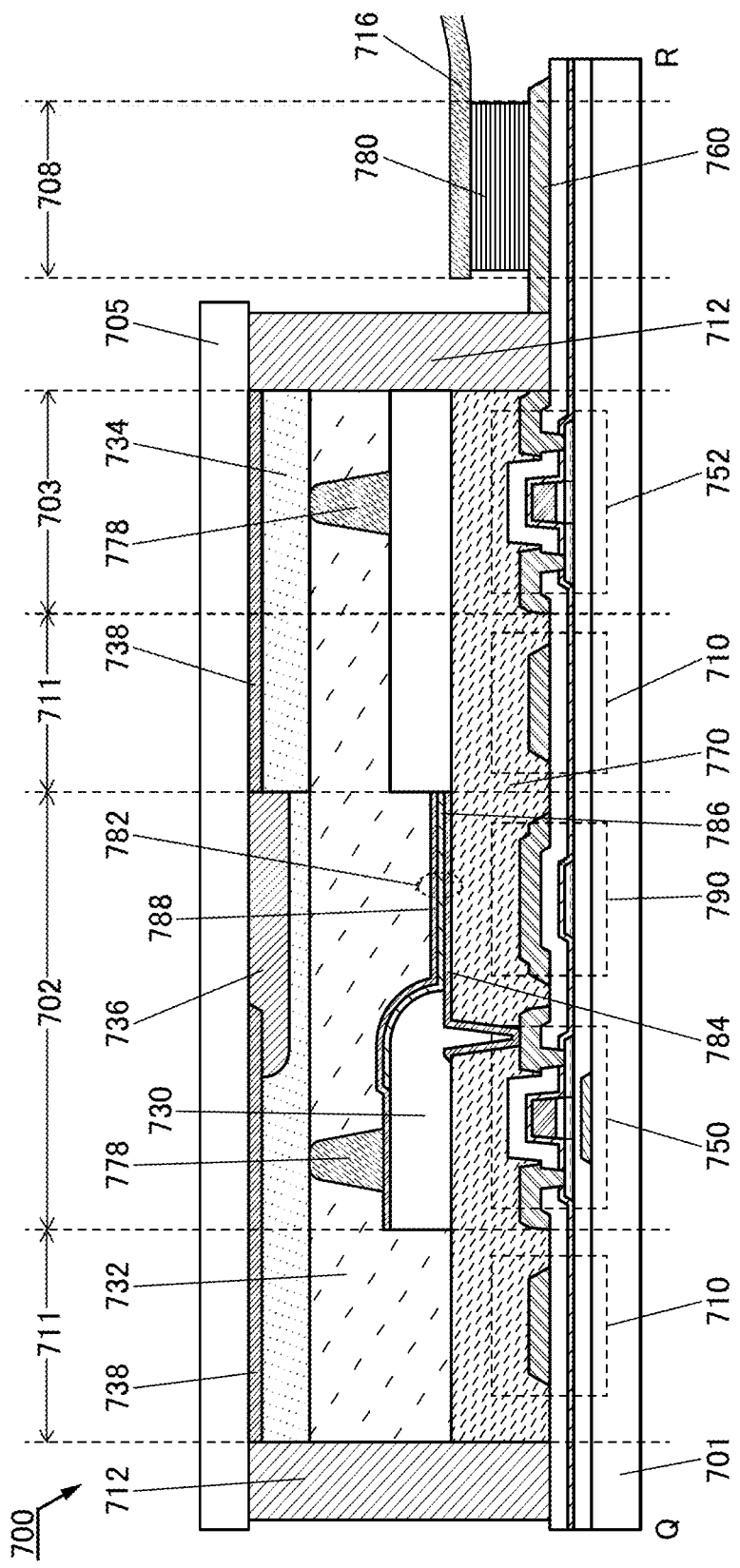
FIG. 40 is a cross-sectional view illustrating one mode of a display device.

The display device 700 illustrated in FIG. 39 and FIG. 40 includes a lead wiring portion 711, the pixel portion 702, the demultiplexer 703, and the FPC terminal portion 708. Note that the lead wiring portion 711 includes the signal line 710. The pixel portion 702 includes a transistor 750 and a capacitor 790. The demultiplexer 703 includes a transistor 752.

The transistor 750 and the transistor 752 each have a structure similar to that of the transistor 100 described above. Note that the transistors 750 and 752 may each have a structure of any of the other transistors described in the above embodiment.

The transistors used in this embodiment each include an oxide semiconductor film which is highly purified and in which formation of oxygen vacancies is suppressed. In the transistor, the off-state current can be made small. Accordingly, an electrical signal such as an image signal can be held for a longer period, and a writing interval can be set longer in an on state. Accordingly, frequency of refresh operation can be reduced, which leads to an effect of suppressing power consumption.

The capacitor 790 includes a lower electrode and an upper electrode. The lower electrode is formed through a step of processing the same oxide semiconductor film as a first oxide semiconductor film of the transistor 750. The upper electrode is formed through a step of processing the same conductive film as a conductive film functioning as source and drain electrodes of the transistor 750. Between the lower electrode and the upper electrode, insulating films formed through steps of forming the same insulating films as the insulating film functioning as a second insulating film and the insulating film functioning as a third insulating film of the transistor 750 are provided. That is, the capacitor 790 has a stacked-layer structure in which the insulating films functioning as a dielectric are positioned between a pair of electrodes.

In FIG. 39 and FIG. 40, a planarization insulating film 770 is provided over the transistors 750 and 752 and the capacitor 790.

The planarization insulating film 770 can be formed using a heat-resistant organic material, such as a polyimide resin, an acrylic resin, a polyimide amide resin, a benzocyclobutene resin, a polyamide resin, or an epoxy resin. Note that the planarization insulating film 770 may be formed by stacking a plurality of insulating films formed from these materials. Alternatively, a structure without the planarization insulating film 770 may be employed.

The signal line 710 is formed through the same process as conductive films functioning as source and drain electrodes of the transistors 750 and 752. Note that the signal line 710 may be formed using a conductive film which is formed through a different process from the source and drain electrodes of the transistors 750 and 752, for example, an oxide semiconductor film formed through the same process as an oxide semiconductor film functioning as a gate electrode. In the case where the signal line 710 is formed using a material containing a copper element, for example, signal delay or the like due to wiring resistance is reduced, which enables display on a large screen.

The FPC terminal portion 708 includes a connection electrode 760, an anisotropic conductive film 780, and the FPC 716. Note that the connection electrode 760 is formed through the same process as conductive films functioning as the source and drain electrodes of the transistors 750 and 752. The connection electrode 760 is electrically connected to a terminal included in the FPC 716 through the anisotropic conductive film 780.

For example, a glass substrate can be used as the first substrate 701 and the second substrate 705. A flexible substrate may be used as the first substrate 701 and the second substrate 705. Examples of the flexible substrate include a plastic substrate.

A structure 778 is provided between the first substrate 701 and the second substrate 705. The structure 778 is a columnar spacer obtained by selective etching of an insulating film and is provided to control the thickness (cell gap) between the first substrate 701 and the second substrate 705. Alternatively, a spherical spacer may be used as the structure 778.

Furthermore, a light-blocking film 738 functioning as a black matrix, a coloring film 736 functioning as a color filter, and an insulating film 734 in contact with the light-blocking film 738 and the coloring film 736 are provided on the second substrate 705 side.

3-2. Structure Example of Display Device Using Liquid Crystal Element

The display device 700 illustrated in FIG. 39 includes a liquid crystal element 775. The liquid crystal element 775 includes a conductive film 772, a conductive film 774, and a liquid crystal layer 776. The conductive film 774 is provided on the second substrate 705 side and functions as a counter electrode. The display device 700 in FIG. 39 is capable of displaying an image in such a manner that transmission or non-transmission is controlled by change in the alignment state of the liquid crystal layer 776 depending on a voltage applied between the conductive film 772 and the conductive film 774.

The conductive film 772 is connected to the conductive film functioning as the source and drain electrodes of the transistor 750. The conductive film 772 is formed over the planarization insulating film 770 to function as a pixel electrode, i.e., one electrode of the display element. The conductive film 772 has a function of a reflective electrode. The display device 700 in FIG. 39 is what is called a reflective color liquid crystal display device in which external light is reflected by the conductive film 772 to display an image through the coloring film 736.

A conductive film that transmits visible light or a conductive film that reflects visible light can be used for the conductive film 772. For example, a material including one kind selected from indium (In), zinc (Zn), and tin (Sn) is preferably used for the conductive film that transmits visible light. For example, a material including aluminum or silver is preferably used for the conductive film that reflects visible light. In this embodiment, the conductive film that reflects visible light is used for the conductive film 772.

Note that projections and depressions are provided in part of the planarization insulating film 770 of the pixel portion 702 in the display device 700 in FIG. 39. The projections and depressions can be formed in such a manner that the planarization insulating film 770 is formed using a resin film, and projections and depressions are formed on the surface of the resin film. The conductive film 772 functioning as a reflective electrode is formed along the projections and depressions. Therefore, when external light is incident on the conductive film 772, the light is reflected diffusely at the surface of the conductive film 772, whereby visibility can be improved.

Note that the display device 700 in FIG. 39 is a reflective color liquid crystal display device given as an example, but a display type is not limited thereto. For example, a transmissive color liquid crystal display device in which the conductive film 772 is a conductive film that transmits visible light may be used. In the case of a transmissive color liquid crystal display device, projections and depressions are not necessarily provided on the planarization insulating film 770.

Although not illustrated in FIG. 39, an alignment film may be provided on a side of the conductive film 772 in contact with the liquid crystal layer 776 and on a side of the conductive film 774 in contact with the liquid crystal layer 776. Although not illustrated in FIG. 39, an optical member (an optical substrate) and the like such as a polarizing member, a retardation member, or an anti-reflection member may be provided as appropriate. For example, circular polarization may be employed by using a polarizing substrate and a retardation substrate. In addition, a backlight, a sidelight, or the like may be used as a light source.

In the case where a liquid crystal element is used as the display element, a thermotropic liquid crystal, a low-molecular liquid crystal, a high-molecular liquid crystal, a polymer-dispersed liquid crystal, a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition containing a liquid crystal showing a blue phase and a chiral material has a short response time and optical isotropy, which eliminates the need for an alignment process. An alignment film does not need to be provided and rubbing treatment is thus not necessary; accordingly, electrostatic discharge damage caused by the rubbing treatment can be prevented and defects and damage of the liquid crystal display device in the manufacturing process can be reduced. Moreover, the liquid crystal material which exhibits a blue phase has a small viewing angle dependence.

In the case where a liquid crystal element is used as the display element, a twisted nematic (TN) mode, an in-plane-switching (IPS) mode, a fringe field switching (FFS) mode, an axially symmetric aligned micro-cell (ASM) mode, an optical compensated birefringence (OCB) mode, a ferroelectric liquid crystal (FLC) mode, an antiferroelectric liquid crystal (AFLC) mode, or the like can be used.

Furthermore, a normally black liquid crystal display device such as a transmissive liquid crystal display device utilizing a vertical alignment (VA) mode may also be used. There are some examples of a vertical alignment mode; for example, a multi-domain vertical alignment (MVA) mode, a patterned vertical alignment (PVA) mode, an ASV mode, or the like can be employed.

3-3. Display Device Using Light-Emitting Element

The display device 700 illustrated in FIG. 40 includes a light-emitting element 782. The light-emitting element 782 includes a conductive film 784, an EL layer 786, and a conductive film 788. The display device 700 in FIG. 40 is capable of displaying an image by light emission from the EL layer 786 included in the light-emitting element 782.

The conductive film 784 is connected to the conductive film functioning as the source and drain electrodes of the transistor 750. The conductive film 784 is formed over the planarization insulating film 770 to function as a pixel electrode, i.e., one electrode of the display element. A conductive film which transmits visible light or a conductive film which reflects visible light can be used for the conductive film 784. For example, a material including one kind selected from indium (In), zinc (Zn), and tin (Sn) is preferably used for the conductive film that transmits visible light. For example, a material including aluminum or silver is preferably used for the conductive film that reflects visible light.

In the display device 700 in FIG. 40, an insulating film 730 is provided over the planarization insulating film 770 and the conductive film 784. The insulating film 730 covers part of the conductive film 784. Note that the light-emitting element 782 has a top emission structure. Therefore, the conductive film 788 has a light-transmitting property and transmits light emitted from the EL layer 786. Although the top-emission structure is described as an example in this embodiment, one embodiment of the present invention is not limited thereto. A bottom-emission structure in which light is emitted to the conductive film 784 side, or a dual-emission structure in which light is emitted to both the conductive film 784 side and the conductive film 788 side may be employed.

The coloring film 736 is provided to overlap with the light-emitting element 782, and the light-blocking film 738 is provided to overlap with the insulating film 730 and to be included in the lead wiring portion 711 and in the source driver 704. The coloring film 736 and the light-blocking film 738 are covered with the insulating film 734. A space between the light-emitting element 782 and the insulating film 734 is filled with a sealing film 732. Note that the structure is not limited to the example in which the coloring film 736 is provided in the display device 700 in FIG. 40; for example, in the case where the EL layer 786 is formed by a separate coloring method, the coloring film 736 is not necessarily provided.

The structure described in this embodiment can be combined as appropriate with any of the other structures described in the other embodiments.

Embodiment 4

In this embodiment, a display module and electronic devices that include a display device of one embodiment of the present invention will be described with reference to FIG. 41 and FIGS. 42A to 42G.

4-1. Display Module

Figure 41:
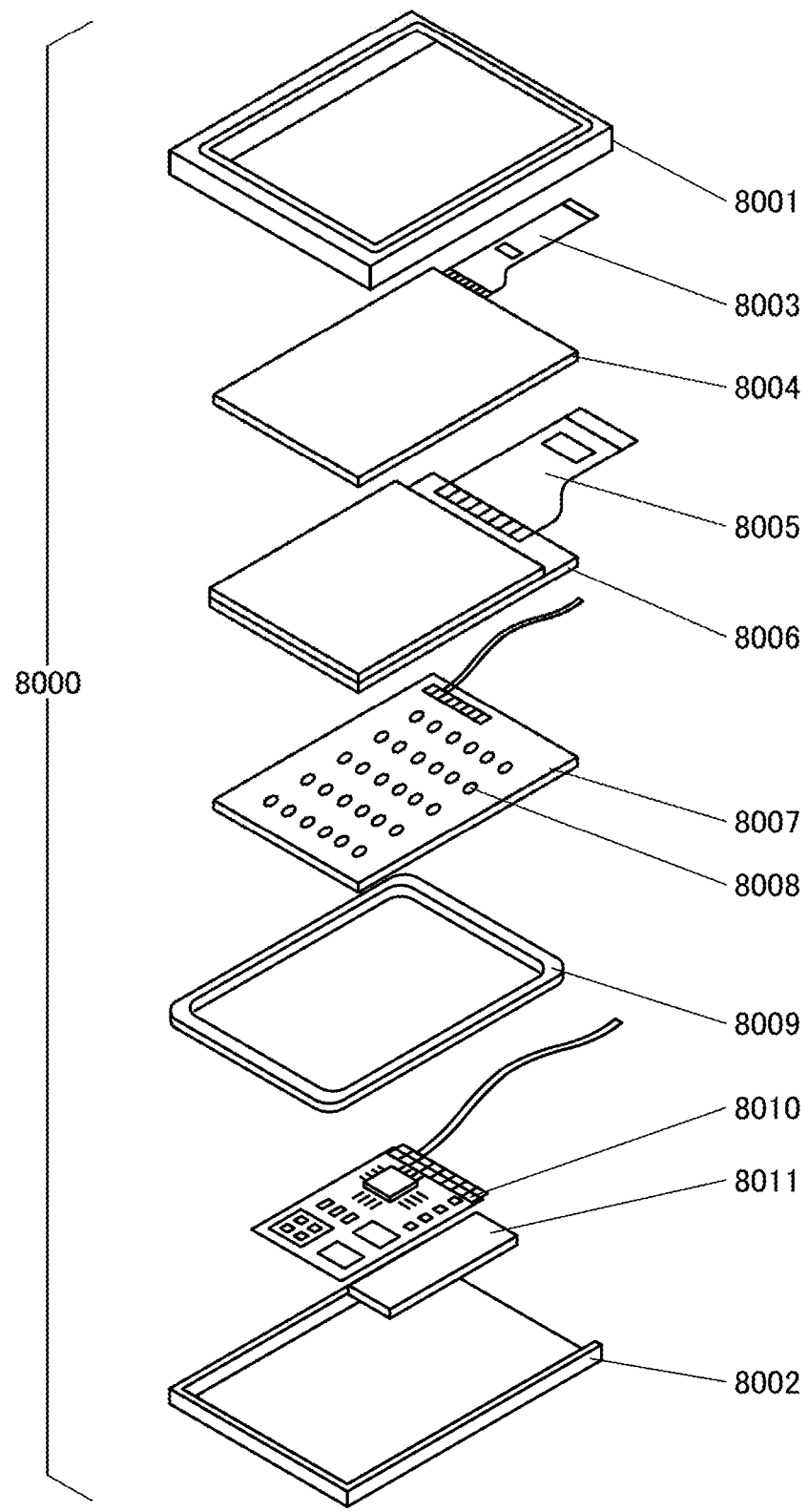
FIG. 41 illustrates a display module.

In a display module 8000 illustrated in FIG. 41, a touch panel 8004 connected to an FPC 8003, a display panel 8006 connected to an FPC 8005, a backlight 8007, a frame 8009, a printed circuit board 8010, and a battery 8011 are provided between an upper cover 8001 and a lower cover 8002.

The display device of one embodiment of the present invention can be used for, for example, the display panel 8006.

The shapes and sizes of the upper cover 8001 and the lower cover 8002 can be changed as appropriate in accordance with the sizes of the touch panel 8004 and the display panel 8006.

The touch panel 8004 can be a resistive touch panel or a capacitive touch panel and can be formed to overlap with the display panel 8006. A counter substrate (sealing substrate) of the display panel 8006 can have a touch panel function. A photosensor may be provided in each pixel of the display panel 8006 to form an optical touch panel.

The backlight 8007 includes a light source 8008. Note that the structure is not limited to the example in FIG. 41, in which the light sources 8008 are provided over the backlight 8007. For example, a structure in which the light source 8008 is provided at an end portion of the backlight 8007 and a light diffusion plate is further provided may be employed. Note that the backlight 8007 need not be provided in the case where a self-luminous light-emitting element such as an organic EL element is used or in the case where a reflective panel or the like is employed.

The frame 8009 protects the display panel 8006 and also functions as an electromagnetic shield for blocking electromagnetic waves generated by the operation of the printed circuit board 8010. The frame 8009 may function as a radiator plate.

The printed circuit board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

The display module 8000 may be additionally provided with a member such as a polarizing plate, a retardation plate, or a prism sheet.

4-2. Electronic Device

FIGS. 42A to 42G illustrate electronic devices. These electronic devices can include a housing 9000, a display portion 9001, a speaker 9003, operation keys 9005 (including a power switch or an operation switch), a connection terminal 9006, a sensor 9007 (a sensor having a function of measuring or sensing force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 9008, and the like.

The electronic devices illustrated in FIGS. 42A to 42G can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Note that functions that can be provided for the electronic devices illustrated in FIGS. 42A to 42G are not limited to those described above, and the electronic devices can have a variety of functions. Although not illustrated in FIGS. 42A to 42G, the electronic device may include a plurality of display portions. Furthermore, the electronic device may be provided with a camera and the like and have a function of shooting a still image, a function of shooting a moving image, a function of storing a shot image in a memory medium (an external memory medium or a memory medium incorporated in the camera), a function of displaying a shot image on the display portion, or the like.

The electronic devices illustrated in FIGS. 42A to 42G will be described in detail below.

Figure 42A:
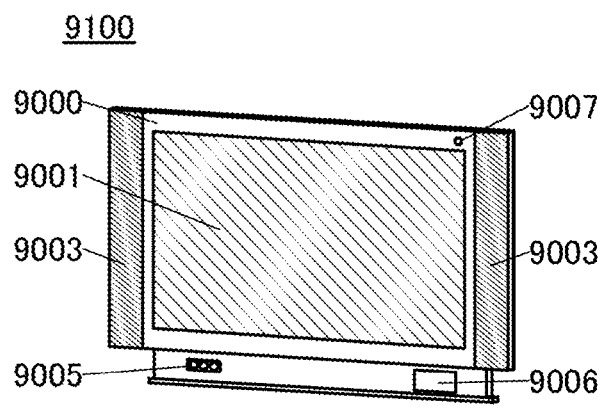
FIGS. 42A to 42G illustrate electronic devices.

FIG. 42A is a perspective view illustrating a television device 9100. The television device 9100 can include the display portion 9001 having a large screen size of, for example, 50 inches or more, or 100 inches or more.

Figure 42D:
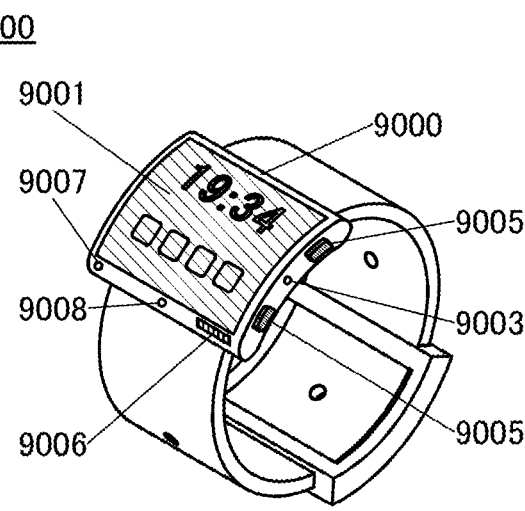
Figure 42B:
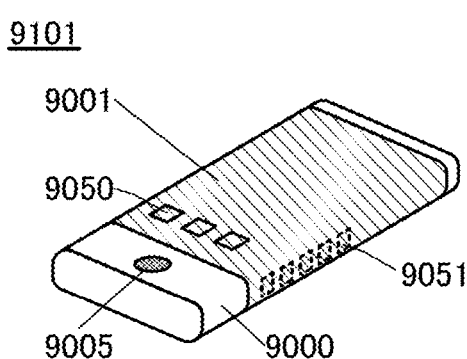

FIG. 42B is a perspective view illustrating a portable information terminal 9101. The portable information terminal 9101 function as, for example, one or more of a telephone set, a notebook, and an information browsing system. Specifically, the portable information terminal 9101 can be used as a smartphone. Note that the portable information terminal 9101 may include the speaker, the connection terminal, the sensor, and the like. The portable information terminal 9101 can display characters and image information on its plurality of surfaces. For example, three operation buttons 9050 (also referred to as operation icons or simply icons) can be displayed on one surface of the display portion 9001. Furthermore, information 9051 indicated by dashed rectangles can be displayed on another surface of the display portion 9001. Examples of the information 9051 include display indicating reception of an incoming email, social networking service (SNS) message, and call; the title and sender of an email and SNS message; the date; the time; remaining battery; and the reception strength of an antenna. Alternatively, the operation buttons 9050 or the like may be displayed in place of the information 9051.

Figure 42E:
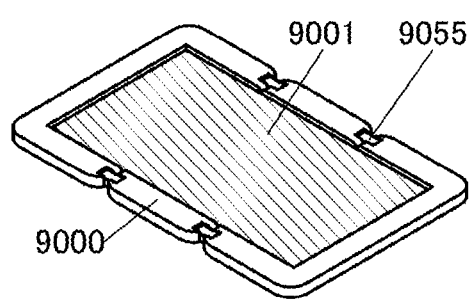
Figure 42C:
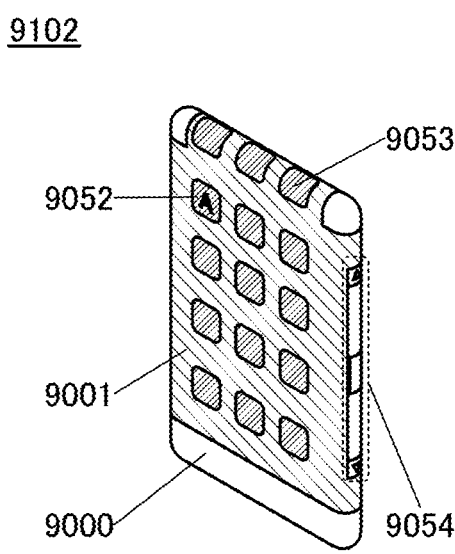

FIG. 42C is a perspective view illustrating a portable information terminal 9102. The portable information terminal 9102 has a function of displaying information, for example, on three or more sides of the display portion 9001. Here, information 9052, information 9053, and information 9054 are displayed on different sides. For example, a user of the portable information terminal 9102 can see the display (here, the information 9053) with the portable information terminal 9102 put in a breast pocket of his/her clothes. Specifically, a caller's phone number, name, or the like of an incoming call is displayed in a position that can be seen from above the portable information terminal 9102. Thus, the user can see the display without taking out the portable information terminal 9102 from the pocket and decide whether to answer the call.

FIG. 42D is a perspective view illustrating a wrist-watch-type portable information terminal 9200. The portable information terminal 9200 is capable of executing a variety of applications such as mobile phone calls, e-mailing, reading and editing texts, music reproduction, Internet communication, and a computer game. The display surface of the display portion 9001 is bent, and images can be displayed on the bent display surface. The portable information terminal 9200 can employ near field communication that is a communication method based on an existing communication standard. In that case, for example, mutual communication between the portable information terminal 9200 and a headset capable of wireless communication can be performed, and thus hands-free calling is possible. Moreover, the portable information terminal 9200 includes the connection terminal 9006, and data can be directly transmitted to and received from another information terminal via a connector. Charging through the connection terminal 9006 is possible.

Note that the charging operation may be performed by wireless power feeding without using the connection terminal 9006.

Figure 42F:
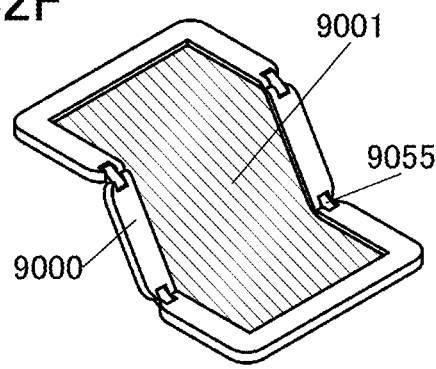
Figure 42G:
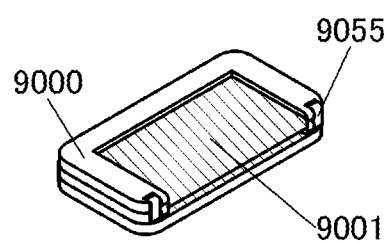

FIGS. 42E, 42F, and 42G are perspective views each illustrating a foldable portable information terminal 9201. FIG. 42E is a perspective view illustrating the portable information terminal 9201 that is opened, FIG. 42F is a perspective view illustrating the portable information terminal 9201 that is being opened or being folded, and FIG. 42G is a perspective view illustrating the portable information terminal 9201 that is folded. The portable information terminal 9201 is highly portable when folded. When the portable information terminal 9201 is opened, a seamless large display region is highly browsable. The display portion 9001 of the portable information terminal 9201 is supported by three housings 9000 joined together by hinges 9055. By folding the portable information terminal 9201 at a connection portion between two housings 9000 with the hinges 9055, the portable information terminal 9201 can be reversibly changed in shape from an opened state to a folded state. For example, the portable information terminal 9201 can be bent with a radius of curvature of greater than or equal to 1 mm and less than or equal to 150 mm.

The structure described in this embodiment can be combined as appropriate with any of the other structures described in the other embodiments.

This application is based on Japanese Patent Application serial no. 2016-053724 filed with Japan Patent Office on Mar. 17, 2016, the entire contents of which are hereby incorporated by reference.

What is claimed is:

1. A display device comprising:
a gate driver; and
a pixel portion,
wherein the pixel portion comprises a plurality of pixels,
wherein the gate driver is configured to output a first scan signal to a first gate line in a first frame period,
wherein the gate driver is configured to output a second scan signal to a second gate line in a second frame period,
wherein the gate driver is configured to output a third scan signal to a third gate line in the first frame period,
wherein the second gate line is a gate line next to the first gate line,
wherein the third gate line is a gate line next to the second gate line,
wherein the plurality of pixels are configured to hold data signals, which are written in the plurality of pixels in the first frame period, in the first frame period and the second frame period,
wherein the plurality of pixels each comprise a transistor,
wherein the transistor comprises an oxide semiconductor in a channel formation region, and
wherein the oxide semiconductor comprises indium and zinc.

2. The display device according to claim 1,
wherein the pixel portion comprises a first display region and a second display region,
wherein the first display region is configured to display a still image at a first frame rate,
wherein the second display region is configured to display a moving image at a second frame rate, and
wherein the first frame rate is different from the second frame rate.

3. The display device according to claim 1,
wherein the second scan signal is not output to the second gate line in the first frame period.

4. A display module comprising:
the display device according to claim 1; and
a touch sensor.

5. An electronic device comprising:
the display module according to claim 4; and
at least one of an operation key and a battery.

6. A display device comprising:
a gate driver; and
a pixel portion comprising:
a plurality of pixels;
a first display region; and
a second display region,
wherein the first display region is a region where a first scan signal is output to a first gate line and a second scan signal is output to a second gate line, and
wherein the second display region is a region where a third scan signal is output to a third gate line and a fourth scan signal is output to a fourth gate line,
wherein the gate driver is configured to output the first scan signal, the third scan signal, and the fourth scan signal in a first frame period,
wherein the gate driver is configured to output the second scan signal, the third scan signal, and the fourth scan signal in a second frame period,
wherein the second gate line is a gate line next to the first gate line,
wherein the third gate line is a gate line next to the second gate line,
wherein the fourth gate line is a gate line next to the third gate line, and
wherein the pixels included in the first display region are configured to hold data signals, which are written in the pixels in the first frame period, in the first frame period and the second frame period.

7. The display device according to claim 6,
wherein the plurality of pixels each comprise a transistor, and
wherein the transistor comprises an oxide semiconductor in a channel formation region.

8. The display device according to claim 6,
wherein the first display region is configured to display a still image at a first frame rate,
wherein the second display region is configured to display a moving image at a second frame rate, and
wherein the first frame rate is different from the second frame rate.

9. The display device according to claim 6,
wherein the second scan signal is not output to the second gate line in the first frame period.

10. A display module comprising:
the display device according to claim 6; and
a touch sensor.

11. An electronic device comprising:
the display module according to claim 10; and
at least one of an operation key and a battery.

12. A display device comprising:
a gate driver;
a source driver;
a pixel portion comprising a first pixel, a second pixel, and a third pixel;
a data line electrically connected to the first pixel, the second pixel, and the third pixel;
a first gate line electrically connected to the first pixel;
a second gate line electrically connected to the second pixel; and
a third gate line electrically connected to the third pixel, wherein the gate driver is configured to output a first scan signal to the first gate line in a first frame period,
wherein the gate driver is configured to output a second scan signal to the second gate line in a second frame period,
wherein the gate driver is configured to output a third scan signal to the third gate line in the first frame period,
wherein the second gate line is a gate line next to the first gate line,
wherein the third gate line is a gate line next to the second gate line,
wherein the source driver is configured to output a data signal to the data line in the first frame period,
wherein the first pixel is configured to hold the data signal in the first frame period and the second frame period,
wherein the first pixel the second pixel, and the third pixel each comprise a transistor,
wherein the transistor comprises an oxide semiconductor in a channel formation region, and
wherein the oxide semiconductor comprises indium and zinc.

13. The display device according to claim 12,
wherein the pixel portion comprises a first display region and a second display region,
wherein the first display region is configured to display a still image at a first frame rate,
wherein the second display region is configured to display a moving image at a second frame rate, and
wherein the first frame rate is different from the second frame rate.

14. The display device according to claim 12,
wherein the second scan signal is not output to the second gate line in the first frame period.

15. A display module comprising:
the display device according to claim 12; and
a touch sensor.

16. An electronic device comprising:
the display module according to claim 15; and
at least one of an operation key and a battery.

17. The display device according to claim 1,
wherein the gate driver comprises a first gate driver and a second gate driver,
wherein the first gate driver is configured to output the first scan signal and the third scan signal, and
wherein the second gate driver is configured to output the second scan signal.

18. The display device according to claim 12,
wherein the gate driver comprises a first gate driver and a second gate driver,
wherein the first gate driver is configured to output the first scan signal and the third scan signal, and
wherein the second gate driver is configured to output the second scan signal.

* * * * *